United States Patent [19]

Wakefield et al.

[11] Patent Number: 5,285,963
[45] Date of Patent: Feb. 15, 1994

[54] INTELLIGENT CONTROLLER FOR EQUIPMENT HEATER

[75] Inventors: Thomas L. Wakefield; George R. Plunkett, both of Anchorage, Ak.

[73] Assignee: LLR Technologies, Inc., Anchorage, Ak.

[21] Appl. No.: 55,034

[22] Filed: Apr. 29, 1993

[51] Int. Cl.$^5$ ............................................. G05D 23/00
[52] U.S. Cl. ............................ 237/2 A; 123/142.5 R; 165/43
[58] Field of Search ............ 237/2 A, 12.3 A, 12.3 B, 237/12.3 C; 236/46 R, 49.3; 123/179.2, 179.21, 142.5 R, 142.5 E; 165/43; 219/205

[56] References Cited

U.S. PATENT DOCUMENTS

| | | | |
|---|---|---|---|
| 3,877,639 | 4/1975 | Wilson et al. | 237/12.3 C |
| 4,773,588 | 9/1988 | Okada | 237/2 A |
| 4,897,798 | 1/1990 | Cler | 236/46 R X |
| 5,048,753 | 9/1991 | Kellie | 237/12.3 C |
| 5,222,661 | 6/1993 | Wenhart | 237/2 A X |

Primary Examiner—Henry A. Bennet
Attorney, Agent, or Firm—Arnold, White & Durkee

[57] ABSTRACT

A control system for heating or cooling equipment prior to startup. A temperature sensor senses the temperature of equipment whose temperature is to be controlled. Using an input device, the user of the invention may provide input parameters such as the equipment's expected start time, the size of the equipment, and the rating of the heating or cooling device(s) to be used. A computer utilizes the input parameters and the temperature of the equipment to calculate an activation time at which the heating or cooling device(s) should begin heating or cooling the equipment to provide the equipment with a desired temperature at the expected start time. At the activation time, the computer provides an initiation signal, which causes the heating or cooling device(s) to begin heating or cooling the equipment. In a more specific embodiment, the invention may be utilized to efficiently preheat an engine in frigid conditions by selectively applying power to one or more heaters.

42 Claims, 9 Drawing Sheets

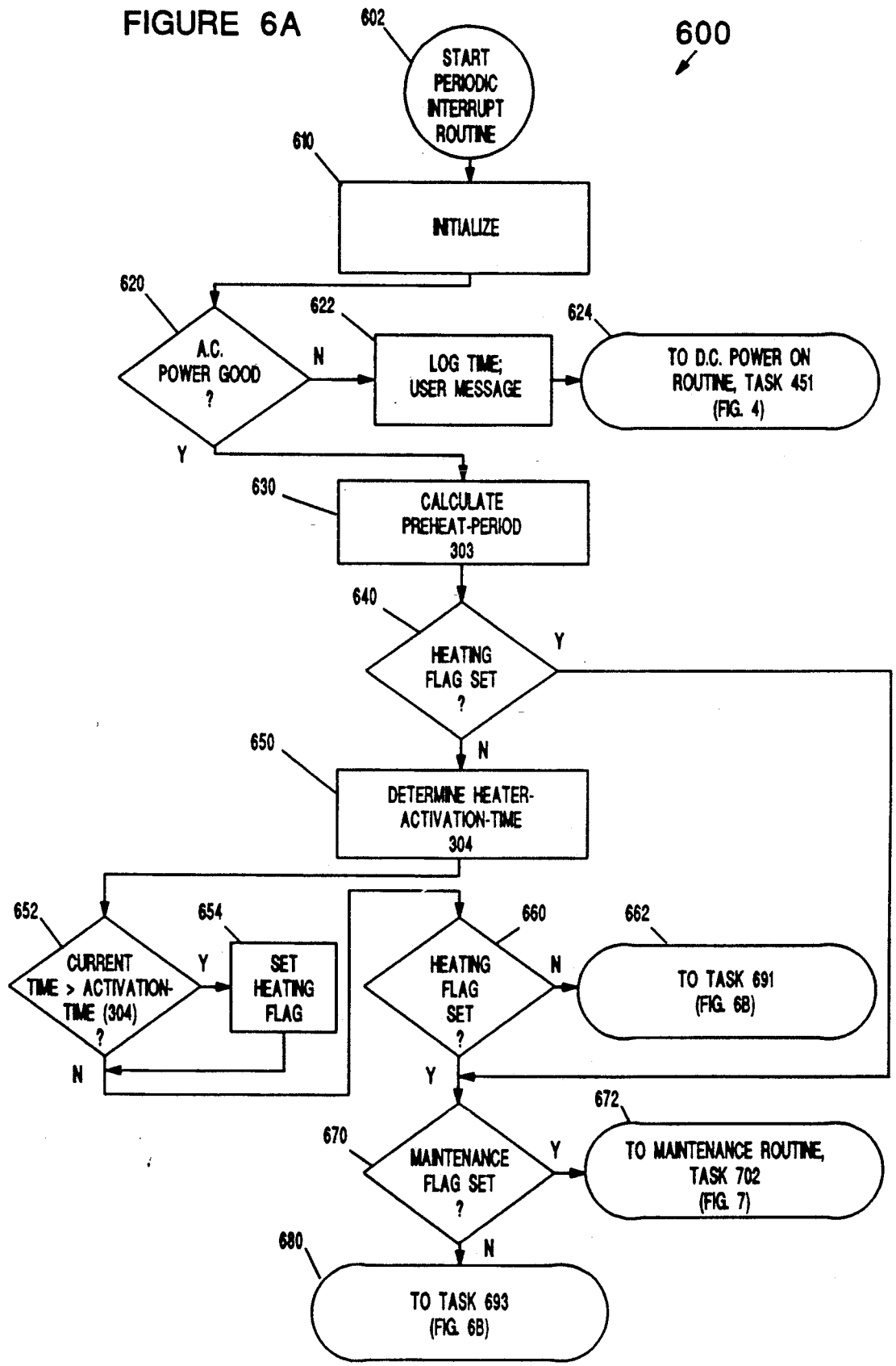

INTELLIGENT CONTROLLER FOR EQUIPMENT HEATER

BACKGROUND OF INVENTION

1. Field of Invention

The present invention relates to a control system for heating or cooling equipment. More particularly, the invention concerns an intelligent system for efficiently heating or cooling an item of equipment such as a gasoline combustion engine, by selectively applying power to one or more heating or cooling devices, in response to certain input parameters.

2. Description of Related Art

Most gasoline combustion engines become more and more difficult to start with lower and lower ambient temperatures. This presents a formidable problem in cold climates, where automobile engines can be especially difficult to start during the winter season. Even if a cold engine can be started, starting the engine at a less-than-optimum temperature significantly increases the wear and stress experienced by the engine.

A common solution to this problem is to pre-heat the engine before starting it. Engines have been pre-heated with a variety of known heaters. Such heaters are typically used to heat the engine's circulating coolant or the engine's lubricant. These heaters usually require some modification to the engine. For example, some circulating coolant heaters require a heating element to be connected in the circulating water system, and others require a freeze plug to be attached to the engine block. With another type of heater, a device is placed into the dip stick column of the lubricant well. A more primitive approach is to simply place a heat generating device such as a flood lamp or a space heater under the engine to directly heat the engine by convection.

Although some of the above-mentioned heaters burn liquid or gaseous fuel, many utilize an electric heating element that operates on alternating current (a.c.) power from a source such as a wall outlet. In many cases, the vehicle's user leaves the heater running continuously throughout the night. Alternatively, the user may manually connect the heater to electrical power a sufficient time before starting the engine; another option is for the owner to use a timer switch to connect the heater to electrical power at a selected time.

A number of automobile engine heaters are discussed in various patents, such as U.S. Pat. No. 5,048,753 ('753), entitled "Portable Engine Preheating System," issued on Sep. 17, 1991 to Michael Kellie. The '753 patent concerns a portable engine preheating system with a timer-operated heating cycle, where a thermostat overload protection system operates if the temperature of the engine rises above a predetermined critical value. Another example of an automobile engine heating system is U.S. Pat. No. 3,877,639 ('639), entitled "Auxiliary Automobile Heater," issued on Apr. 15, 1975 to Charles Wilson and George Wilson. The '639 patent involves an automobile heating system in which a gasoline-fueled heater operates for a heating cycle of adjustably predetermined duration. The duration of the heating cycle is selectively determined either by a timer or by remote radio control. The heating cycle may be automatically activated when the ambient temperature drops below a predetermined value. If this occurs, the heating cycle will then terminate once the engine temperature reaches a second predetermined value. The '639 patent utilizes a battery heater in addition to the engine heater.

Since electricity rates for many consumers today are higher than ever, many people reduce their electricity consumption to save money. Additionally, many people conserve electricity for environmental reasons, since they realize that most electrical power plants generate electricity by burning fossil fuels. In this context, the previously-mentioned heating systems are not as advantageous as some might like, although such devices may be useful for certain applications. In particular, these devices are limited, since their engine heating cycles may be longer than the minimum time necessary. Arrangements that use timers are optimally efficient only if the user knows in advance how much heat will be required to safely start the vehicle's engine; this quantity depends upon the engine's size, the ambient temperature, the heater's power rating, and other related factors. For most drivers, such calculations are inconvenient or even impossible. Even if the user is capable of making such calculations, mistakes may lead to an inadequate preheating cycle, and an engine that will not start. Therefore, the previously-discussed methods are limited, and, as a result, they waste electrical power or they are unreliable.

Furthermore, these types of devices are not as beneficial as some might require, since they do not enable simultaneous operation of diverse types of heaters such as auxiliary engine heaters, vehicle interior heaters, battery heaters, and transmission heaters. Additionally, these systems do not accommodate a user who decides not to start his/her vehicle, since these systems permit the engine heaters to run indefinitely.

BRIEF SUMMARY OF INVENTION

The present invention is directed at the problems set forth above, and in a general sense comprises a control system for heating or cooling equipment prior to startup. The invention includes a temperature sensor for sensing the temperature of equipment whose temperature is to be controlled. Using an input device, the user of the invention may provide input parameters such as the expected start time of the equipment, the size of the equipment, and the rating of the heating or cooling device(s) to be used. A computer utilizes the input parameters and the temperature of the equipment to calculate an activation time at which the heating or cooling device should begin heating or cooling the equipment to provide the equipment with a desired temperature at the expected start time. At the activation time, the computer provides an initiation signal, which causes the heating or cooling device to begin heating or cooling the equipment.

In a more specific embodiment, the invention comprises a system for efficiently preheating an engine under frigid conditions by selectively applying power to one or more heaters. The system receives a.c. power from a wall outlet and selectively provides a.c. power to one or more heaters, such as engine heaters, fuel heaters, battery blankets, transmission heaters, vehicle interior heaters, and the like. The operation of multiple heaters may be multiplexed to avoid exceeding the maximum current capacity of the a.c. power supply and "tripping" a circuit breaker. The system of the invention additionally includes a power converter to convert a.c. input power to a direct current (d.c.) voltage for charging the vehicle's battery. Remote communication components may be provided for remotely operating the invention. The invention also provides for fail-safe operation under certain conditions such as a.c. power loss, and improper power supply wiring.

DESCRIPTION OF DRAWINGS

The nature, objects, and advantages of the invention will become more apparent to those skilled in the art after considering the following detailed description in connection with the accompanying drawings, in which like reference numerals designate like parts throughout, wherein:

FIG. 6A is a flowchart of a first part of the periodic interrupt routine of the invention;

DESCRIPTION OF A PREFERRED EMBODIMENT

1. Exemplary Application of Invention

Figure 1:
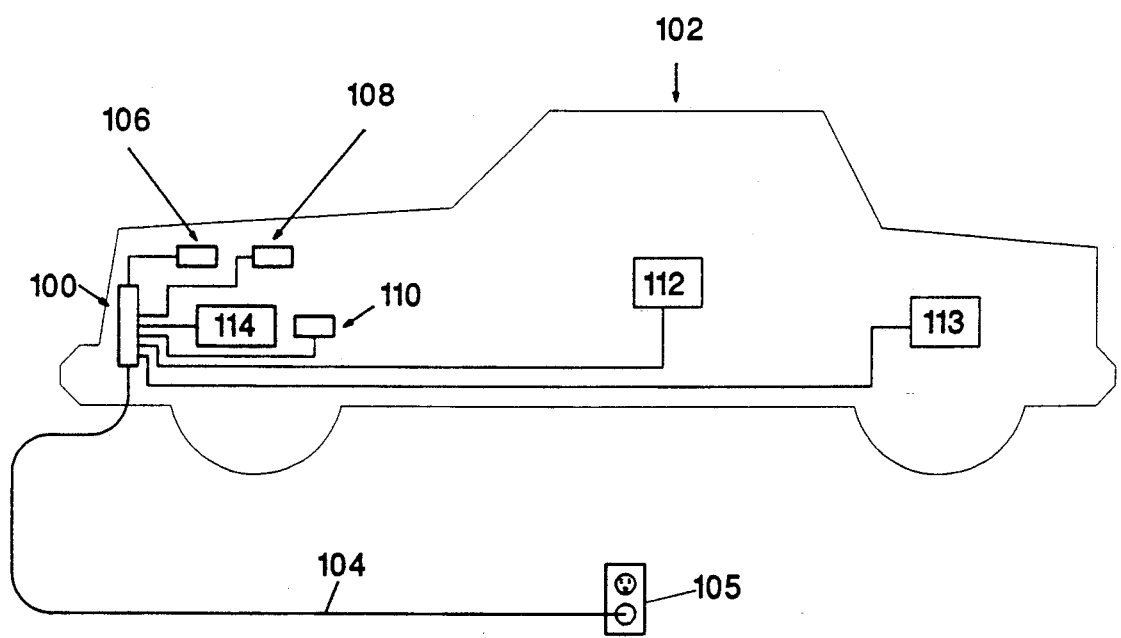
FIG. 1 is a diagram illustrating an exemplary use of the invention to pre-heat a vehicle engine.

In an exemplary implementation (FIG. 1), the invention is used during frigid weather to heat the components of a vehicle 102 prior to the anticipated use of the vehicle 102, by selectively applying power to one or more heaters. Energy efficiency is realized by applying power to the heater(s) based upon the engine's temperature and various user-specified input parameters. The invention includes a base unit 100, preferably mounted in the engine compartment of the vehicle 102. To avoid damage from engine heat, the base unit 100 may be mounted between the radiator and the radiator grille, or another location substantially distanced from the heat-generating components of the engine.

The base unit 100 may receive a.c. power from an extension cord 104, electrically connected to an a.c. power source via a wall outlet 105. The outlet 105 may be located in a garage or another location where the vehicle 102 is stored when it is dormant. The base unit 100 converts the received a.c. power to another voltage, for charging a battery 114. In a preferred embodiment, the battery 114 comprises the d.c. engine-starting battery of the vehicle 102, and the base unit 100 converts received a.c. power to a d.c. voltage such as 12 V. In this embodiment, the battery 114 provides d.c. power to the electronic circuitry of the base unit 100 through a number of interconnections that, for ease of understanding, are not shown. The base unit 100 is removably connected to one or more conventional heaters, the operation of which is already well known. The present example depicts a primary engine heater 106, an auxiliary engine heater 108, a transmission heater 110, an interior space heater 112, and a fuel heater 113. Operation of other heaters (not shown) is also contemplated.

2. Hardware Components and Interconnections

Figure 2A:
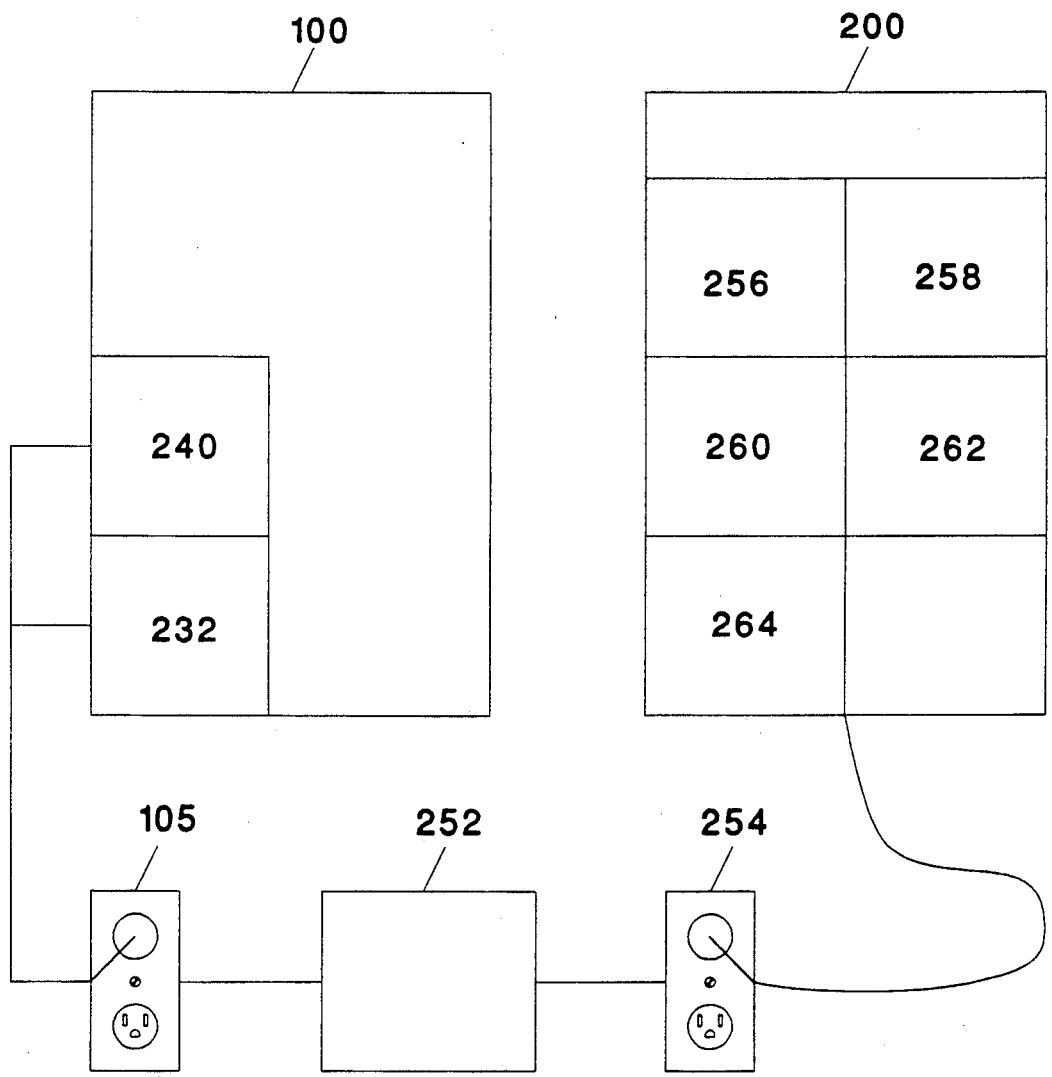
FIG. 2A is a block diagram illustrating the electrical hardware components and interconnections of a base unit 100 and a remote unit 200 of the invention.

Referring to FIG. 2A, the electrical hardware components of the invention include the base unit 100 and a remote unit 200. As mentioned above, the electronic circuitry of the base unit 100 receives d.c. electrical power from the battery 114, through a number of interconnections that, for ease of understanding, are not shown. In addition to d.c. power, the base unit 100, as mentioned previously, receives a.c. electrical power from an outlet 105; in an illustrative example, the received a.c. electrical power comprises a 60 Hz voltage waveform having an amplitude of about 120 V. The outlet 105 is electrically connected to building wiring 252, which is electrically connected to other wall outlets, such as a second wall outlet 254. In the present example, the outlet 254 is located inside the same building as the outlet 105, and the outlet 254 provides a.c. electrical power to the remote unit 200. In an exemplary embodiment of the invention, the outlet 254 may be located in the user's kitchen, bedroom, or another location from which the user may conveniently and remotely operate the base unit 100.

In a preferred embodiment, communications between the base unit 100 and the remote unit 200 are conducted through the building wiring 252 in accordance with one or more known communications protocols, such as one of the National Electrical Association (NEA) standards. Such protocols involve the transmission of information by superimposing radio frequency (R.F.) data upon the 120 V a.c. power supply waveform carried by building wiring. Alternatively, communication between the base unit 100 and the remote unit 200 is also contemplated via radio transceivers, hardwired connections, or another known method for data communications.

As discussed in greater detail below, the remote unit 200 provides the user with status reports and receives commands from the user. The remote unit 200 includes a remote transmitter 256, a remote receiver 258, a remote input device 260, a display 262, and an acoustic annunciator 264. As described more fully below, the remote transmitter 256 and the remote receiver 258 function to exchange signals over the building wiring 252 with a base receiver 232 (FIG. 2B) and a base transmitter 240 of the base unit 100.

The remote input device 260 may comprise a keypad, one or more buttons, a number of rotatable wheels bearing imprinted alphanumeric digits, or another suitable device for the user to select data and input the data to the base unit 100. The display 262 may comprise a liquid crystal display (L.C.D.), electro-luminescent (E.L.) display, an array of light emitting diodes (L.E.D.s), or another suitable device for the remote unit 200 to provide information to the user. Likewise, the acoustic annunciator 264 comprises a beeper, vibrating reed, speaker, or another suitable device to provide the user with audible feedback.

Figure 2B:
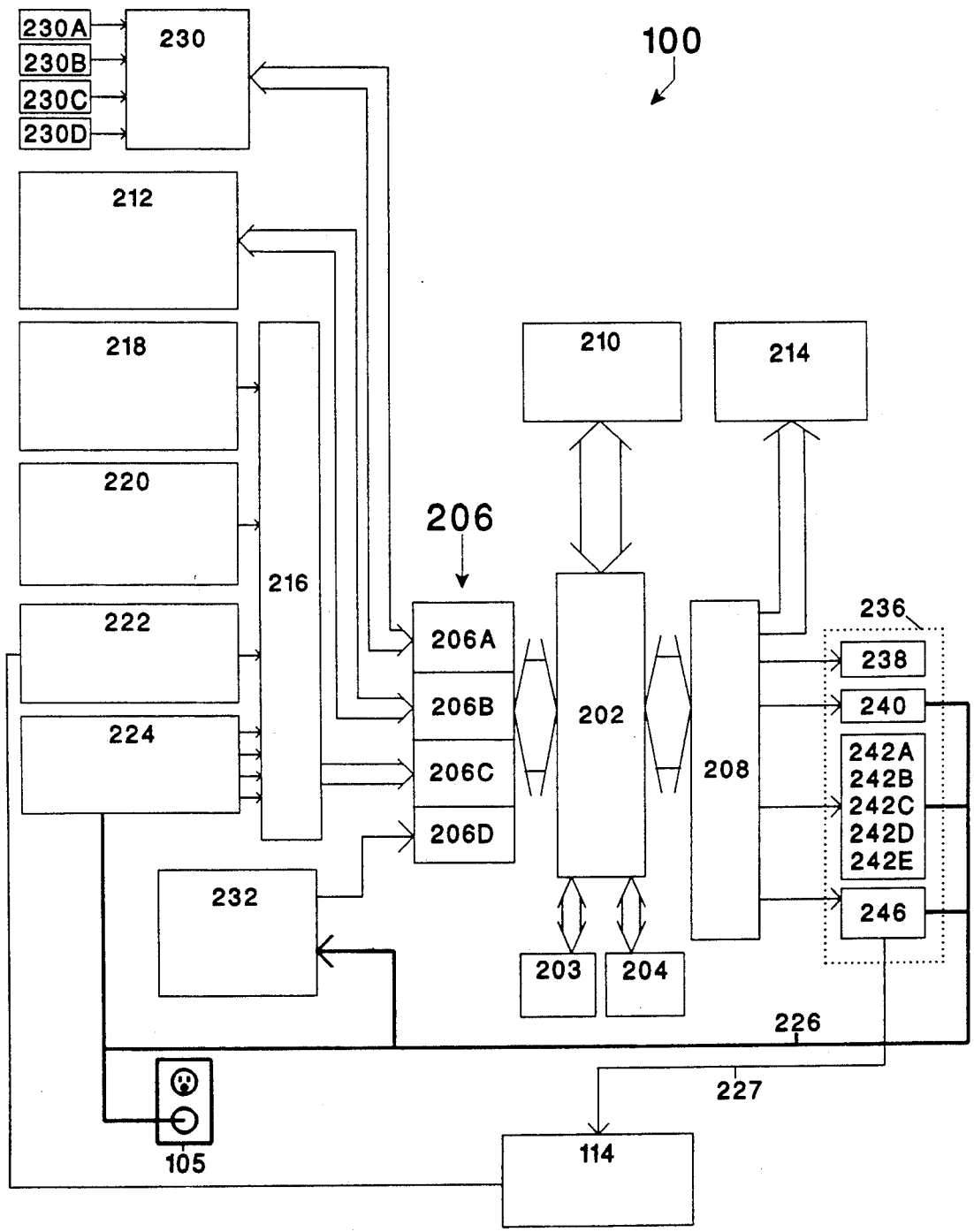
FIG. 2B is a block diagram of the electrical hardware components and interconnections of the base unit 100 of the invention.

Referring now to FIG. 2B along with FIG. 2A, the base unit 100 includes a microprocessor 202 to manage operations of the base unit 100. In an exemplary embodiment, the microprocessor 202 comprises an Intel ® 8051 or 8031 microprocessor. The microprocessor 202 is electrically connected to a read only memory (ROM) 204, which may comprise an erasable programmable read only memory (E.P.R.O.M.). The ROM 204 may be a component that is independent from the microprocessor 202, or the ROM 204 may be built into the microprocessor 202. The microprocessor 202 additionally includes a random access memory (RAM) 203, which may be independent from the microprocessor 202, or incorporated therein. An input buffer 206 and an output buffer 208 are also electrically connected to the microprocessor 202. For ease of explanation, the input buffer 206 is divided into first, second, third, and fourth address groups, referred to as regions 206a, 206b, 206c, and 206d. In an illustrative embodiment, the input buffer 206 and the output buffer 208 are incorporated into the microprocessor 202. The output buffer 208 may also include an output latch (not shown), such as a National Semiconductor model MM74C374N circuit. The microprocessor 202 is also electrically connected to a combination clock-calendar 210, which may comprise a model ICM7170IPC circuit manufactured by Harris Semiconductor.

The base unit 100 also includes a number of user interface components, including a display 214 and a local input device 212. The local input device 212 may comprise a keypad, one or more buttons, a number of rotatable wheels bearing imprinted alphanumeric digits, or another suitable device for a user to enter data into the base unit 100. The local input device is electrically connected to the region 206b of the input buffer 206. The display 214 may comprise an L.C.D., E.L. display, an array of L.E.D.s, or another suitable device by which the base unit 100 provides information to the user. The display 214 is electrically connected to the output buffer 208.

The base unit 100 also includes an analog input module 216. In an exemplary embodiment, the analog input module 216 may comprise an analog-to-digital converter such as a model ADC0808CCN circuit manufactured by National Semiconductor. The analog input module 216 receives analog signals from a number of analog components, and provides the input buffer 206 with digital representations of the analog signals. These analog components include an ambient temperature sensor 218, a d.c. voltage sensor 222, and an a.c. sensing array 224. The analog components may also include an optional engine temperature sensor 220. The ambient temperature sensor 218 may comprise a thermistor, thermocouple, semiconductor temperature sensor, or another component capable of accurately sensing the temperature of the air near the vehicle 102. The ambient temperature sensor 218 may be located with the components of the base unit 100, or at another location, for accurately sensing ambient air temperature.

The engine temperature sensor 220 may comprise a thermistor, thermocouple, semiconductor temperature sensor, or another component capable of accurately sensing the temperature of the engine (not shown) of the vehicle 102. The engine temperature sensor 220 may be affixed to or placed near the engine block, the engine cooling system, the oil circulation system, or another switchable location for accurately sensing engine temperature. The d.c. voltage sensor 222 is electrically connected to the battery 114, and functions to sense the voltage of the battery 114. The a.c. sensing array 224, which is electrically connected to the a.c. power source via the outlet 105, senses the voltage and current provided by the outlet 105.

The base unit 100 also includes a digital input module 230, which is electrically connected to the region 206a of the input buffer 206. The module 230 receives signals from one or more alarm devices 230a, 230b, 230c, and 230d that are installed on the vehicle 102. The alarm devices 230a-230d may comprise known alarm units such as tamper alarms, door-open detectors, motion detectors, or other conventional alarm devices that produce digital output signals indicative of their status. The operation of the digital input module 230 and the related alarm devices 230a-230d is described in greater detail below.

The base unit 100 also includes the base receiver 232, which is electrically connected to the region 206d of the input buffer 206. The base receiver 232, which operates on a.c. electrical power from the outlet 105, receives signals transmitted by the remote unit 200 over the building wiring 252. Operation of the base receiver 232 is discussed in greater detail below.

The base unit 100 also includes an output module 236, which is electrically connected to the output buffer 208. The output module 236 includes an acoustic annunciator 238, a base transmitter 240, five heater outlets 242a-242e, and a trickle charge unit 246. The acoustic annunciator 238 comprises a beeper, vibrating reed, speaker, or another suitable device to provide the user of the invention with audible feedback. The base transmitter 240, which receives a.c. electrical power from the outlet 105 via a line 226, operates to transmit data to the remote unit 200, as explained in greater detail below. In an illustrative embodiment, the heater outlets 242a-242e comprise switched electrical outlets for receiving two-prong or three-prong plugs of the electrical heaters to be used with the invention. The microprocessor 202 selectively provides the heaters with a.c. electrical power from the outlet 105 by selectively enabling and disabling the heater outlets 242a-242e.

The trickle charge unit 246 comprises a system to convert a.c. power received from the outlet 105 into d.c. power, for the purpose of charging the battery 114, via a line 227. A bus (not shown) interconnects the trickle charge unit 246 with the microprocessor 202, the input buffer 206, and the output buffer 208. In a preferred embodiment, the trickle charge unit 246 comprises a system such as that disclosed in U.S. patent application Ser. No. 07/913,598 ('598) entitled "Intelligent System for Transferring Energy From a Power Source to a Load," filed on Jul. 14, 1992 in the names of Thomas Logan Wakefield and George Rex Plunkett. The '598 application is hereby incorporated herein by reference. The '598 application concerns a microprocessor system utilizing multiple electrical switching units to selectively transfer power from a power source to a load via an energy accumulator. One of the distinct advantages of the '598 device is that it completely isolates the a.c. power source from the components receiving d.c. power, without the power loss, expense, weight, and other disadvantages associated with transformer-based power supplies.

In the '598 application, the microprocessor provides d.c. power by executing an interrupt routine at certain times. Although the microprocessor component of the trickle charge unit 246 may be separate from the microprocessor 202, the microprocessor 202 is preferably programmed to perform the functions required for the trickle charge unit. This arrangement is contemplated in FIG. 2B, and has the advantage of avoiding the need for two microprocessors with overlapping functions.

3. General Operation

Figure 3:
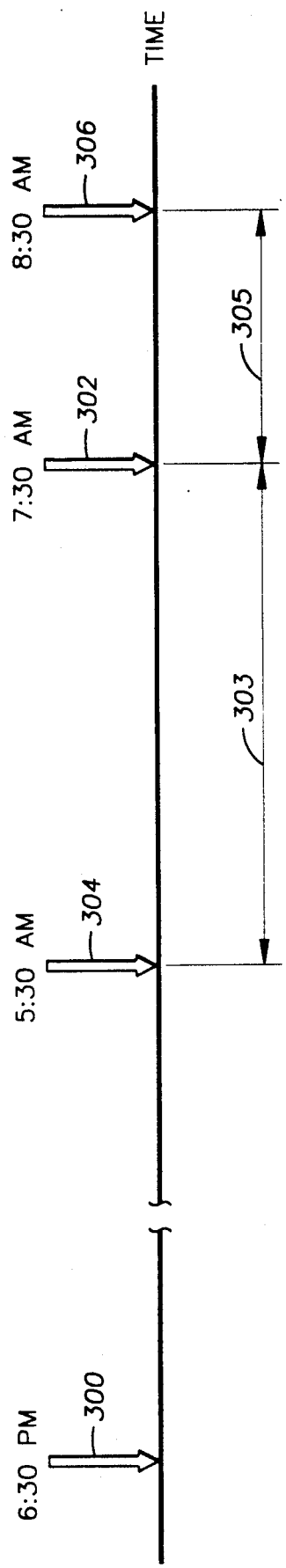
FIG. 3 is a timing diagram of a typical operating sequence of the invention.

A typical operating sequence of the invention is shown in FIG. 3. After leaving work, the user returns home and "plugs" the base unit 100 into the outlet 105 at 6:30 p.m. This event marks a time 300, when a.c. power is restored to the base unit 100. In this example, the user expects to start the vehicle again at an expected-engine-start-time 302 of 7:30 a.m., so the user enters this time into the base unit 100 using the local input device 212. The user also enters various other parameters, such as the size of the engine, the engine heater's ratings, the maximum current capacity of the outlet 105, and other related data.

The parameters input by the user are stored by the base unit 100 in the RAM 203 and need not be entered again, unless there is an interruption in d.c. power received by the unit 100, or unless the user desires to change the parameters. Using the parameters entered by the user and the engine temperature measurement provided by the engine temperature sensor 220, the base unit 100 calculates the minimum preheat-period 303. To bring the engine to a safe-starting temperature at the start-time 302, a.c. power should be applied to the engine heaters 106, 108 for a length of time equal to the preheat-period 303. Subtracting the preheat-period 303 from the start-time 302 yields a heater-activation-time 304, i.e. the time at which a.c. power should be applied to the engine heaters 106, 108 to enable safe starting of the engine at the start-time 302. When the time indicated by the clockcalendar 210 matches the heater-activation-time 304, the base unit 100 connects a.c. power to the heater outlets 242a-e to begin operating the heaters.

At the start-time 302, if the base unit 100 is still plugged into the outlet 105, this indicates that the vehicle 102 has not departed, and it is therefore assumed that the vehicle has not been started. In this case, the base unit 100 begins an engine-heating-maintenance-mode 305 to keep the engine warm until the user starts the vehicle 102, or until the maintenance-mode 305 ends at an end-maintenance-time 306. In an illustrative embodiment, the engine-heating-maintenance-mode 305 lasts for one hour. During this period, a.c. power is intermittently applied to the heaters to maintain engine warmth sufficiently for safe starting. It has been found that, even after engine heating completely ceases at the time 306, an average engine will typically remain warm enough to be safely started for about three hours.

The invention is operated according to a number of software routines, including a d.c. power on routine, a main program, and a periodic interrupt routine. The periodic interrupt routine includes a maintenance routine, described separately. The d.c. power on routine is executed when the base unit 100 is connected to the battery 114, i.e. when the base unit 100 first receives d.c. power. The d.c. power on routine operates primarily to (1) receive and store user input concerning the engine heating process, (2) determine the preheat-period 303, the heater-activation-time 304, and a heater multiplexing schedule to accomplish the user's objectives, and (3) begin the main program when the base unit 100 receives a.c. power.

The main program continuously detects certain operational conditions, and responds to such conditions appropriately. These conditions include, for example, the base unit 100 being disconnected from a.c. power, the base unit 100 receiving user input, and the base unit 100 receiving communications from the remote unit 200. The main program additionally controls operation of the trickle charge unit 246.

The periodic interrupt routine is performed on a microprocessor interrupt basis, preferably once each minute. The periodic interrupt routine resets all heaters and the trickle charge unit 246 by momentarily shutting them down. The periodic interrupt routine also implements, based upon the parameters input by the user, the desired method of heating. In the periodic interrupt routine, the engine is generally heated from the heater-activation-time 304 to the expected-engine-start-time 302. The maintenance routine is performed when the base unit 100 is not unplugged from the outlet 105 soon after the start-time 302. The communications routine is performed when data is received from the remote unit 200.

4. Detailed Description of Operation

FIGS. 4–7 illustrate the software routines of the invention in greater detail. These routines are embodied in a number of software programming lines written in Intel ® 8051 microprocessor code, shown in order of execution in the attached Appendix, which is incorporated herein.

In an exemplary embodiment of the invention, various interrupts, variables, and flags are used, as shown in Table 1 (below).

TABLE 1

| Flags, Variables, Interrupts | |
|---|---|
| MAINTENANCE FLAG | indicates arrival of the start-time 302, when the maintenance-mode 305 begins. |
| HEATING FLAG | is set when engine heating is to begin. |
| MANUAL START FLAG | is set when user selects manual starting of heaters. |
| TIME-ON VARIABLE | keeps track of length of time that heaters are operated during preheat and maintenance modes. |
| STAGE VARIABLE | monitors the heating cycle, to help coordinate heater multiplexing. |
| PERIODIC INTERRUPT | initiates the periodic interrupt routine; preferably triggered once each minute. |
| POWER-SUPPLY INTERRUPT | triggered periodically in response to the a.c. signal from the outlet 105, to coordinate charging of the battery 114. |

These flags, variables, and interrupts are described in detail in conjunction with FIGS. 4–7. However, a brief introductory description follows. The MAINTENANCE FLAG is a software variable that is set when the start-time 302 arrives if the base unit 100 has not been unplugged from the wall outlet 105; under these circumstances, it is assumed that the vehicle has not been started. In this case, the base unit 100 enters the maintenance-mode to keep the engine warm for possible later use.

The HEATING FLAG is a software variable utilized to indicate that, due to a given event, it is time to apply heat to the equipment. Such an event may occur, for example, when the activation-time 304 arrives, when the user selects a "continuous mode" of operation, when the user triggers manual starting, or when the maintenance mode 305 begins.

The MANUAL START FLAG is a software variable that indicates whether the user has opted to manually start the heaters. This option is selected by repeatedly plugging and unplugging the base unit 100 into/from the outlet 105. In an exemplary embodiment, two disconnections within five seconds initiates a manual start. In this case, the planned pre-heating schedule is abandoned in favor of immediate pre-heating.

The TIME-ON variable is utilized to keep track of the length of time that the heaters have been operating. When TIME-ON exceeds the preheat-period 303, this indicates that the start-time 302 has arrived, and the maintenance-mode 305 should begin.

The STAGE variable monitors the advancement of TIME-ON, to coordinate multiplexing of the heaters, as described in greater detail below. STAGE is incremented along with TIME-ON, and in an exemplary embodiment STAGE continuously counts from 1 to 6. As described more specifically below, STAGE indexes a heater multiplexing table to determine which heater(s) should be turned on at any given time.

The PERIODIC INTERRUPT is an interrupt of the microprocessor 202 that occurs once each minute. Each time the microprocessor 202 experiences the PERIODIC INTERRUPT, the microprocessor 202 automatically performs the periodic interrupt routine.

The POWER-SUPPLY INTERRUPT is an interrupt of the microprocessor 202 that occurs when the a.c. signal from the wall outlet 105 reaches selected voltage levels, as described in detail in the '589 application. When this interrupt occurs, power from the wall outlet 105 is transferred to the battery 114 via an energy accumulator (not shown), as described in the '598 application.

Having described the primary interrupts, variables, and flags of the invention, the software routines will now be explained. The d.c. power on routine (FIG. 4) comprises a number of tasks 400, which are initiated in task 402 when the base unit 100 is connected to the battery 114, thereby providing d.c. power to the electronic circuitry of the base unit 100. The d.c. power on routine is contained in the ROM 204, and is executed automatically when the microprocessor 202 receives d.c. power. The microprocessor 202 initializes the base unit 100 in task 410. Specifically, in task 410 the microprocessor 202 configures the base unit 100 for operation by (1) disabling PERIODIC INTERRUPT; (2) retrieving one or more default parameters from the ROM 204, such as default selections for engine size, heater ratings, presence or absence of auxiliary heaters, start-time 302, time of day, and the like; (3) retrieving default flags and variables from the ROM 204; and (4) verifying that the clock-calendar 210 is present and properly operating. Also in task 410, the microprocessor 202 performs various other steps to help ensure proper operation of the base unit 100, such as resetting the output buffer 208, initializing the local input device 212, and initializing other components of the base unit 100 as necessary.

Figure 4:
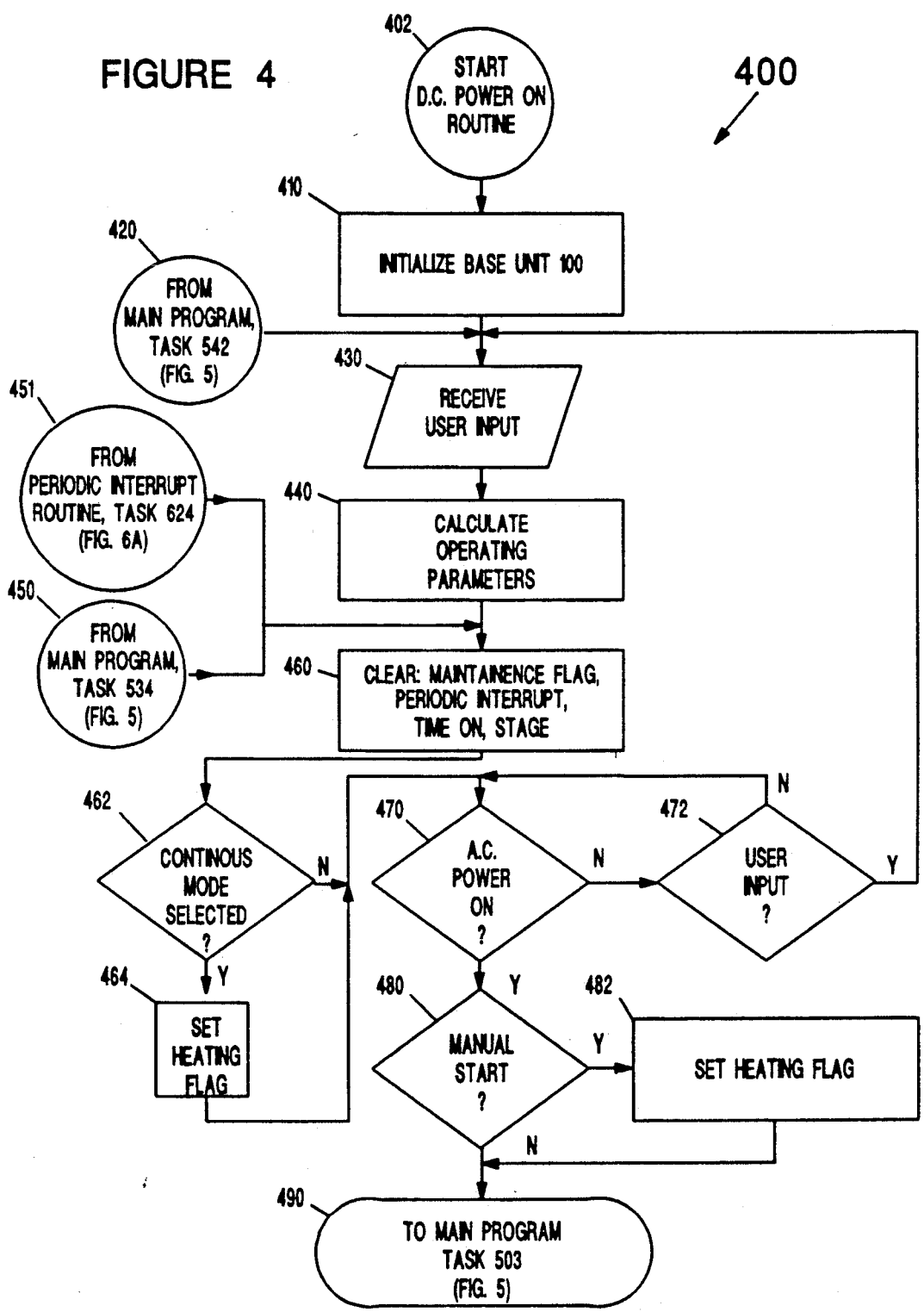
FIG. 4 is a flowchart of the d.c. power on routine of the invention.

The routine of FIG. 4 then proceeds to task 430, in which the display 214 presents messages requesting input from the user. In an illustrative embodiment, task 430 may request and receive various user specified parameters related to the heating cycle, such as: the size of the engine to be heated; the ratings of any engine heaters to be used; the maximum current capacity of the outlet 105; the start-time 302; and whether the user desires to enter the continuous mode to immediately begin heating the engine. In an illustrative embodiment, the user inputs the engine size by selecting from small, medium, large, and extra-large engine sizes. Likewise, the user enters the rating of each heater by selecting from low, medium, medium-high, or a high heater ratings. Preferably, the user is provided with an owners' manual that crossindexes the different engine sizes and heater ratings with specific sizes and ratings, as shown in Table 2 (below).

TABLE 2

| Cross-Referenced Engine Sizes and Heater Ratings | | | |
|---|---|---|---|
| ENGINE SIZE | | HEATER RATING | |
| SMALL | <2.0 L | LOW | <500 W |
| MEDIUM | 2.1–4.0 L | MEDIUM | 500–1000 W |
| LARGE | 4.1–6.0 L | MEDIUM-HIGH | 1000–1500 W |
| EXTRA-LARGE | >6.1 L | HIGH | >1500 W |

In one embodiment of the invention, where the display 214 comprises an L.C.D., the user may enter the desired parameters by advancing through a software menu using the local input device 212. The specific software of such a menu system is not discussed further, since menu systems are well known, and an ordinarily skilled computer programmer with the benefit of this disclosure is capable of generating the required software. As an alternative arrangement to the menu system, the display 214 may comprise a number of L.E.D.s (not shown), and the local input device 212 may comprise one or more Wheels that bear alphanumeric digits about their circumference. In this embodiment, different patterns of illuminated L.E.D.s serve as prompts for different items of data. For example, when a specific pattern of L.E.D.s is illuminate as a prompt for "engine size," the user may rotate the wheel(s) until it displays one or more alphanumeric digits representative of a "large" engine size.

After task 430 determines that the user has finished entering the parameters, task 440 proceeds to utilize the parameters in establishing a schedule for operating the heaters. Task 440 first performs various error checking algorithms on the entered parameters, and then stores the error-checked parameters in the RAM 203. Task 440 also resets the clock-calendar 210 based upon the user's input. Task 440 then performs a number of computations. For example, task 440 calculates a "heating coefficient" by crossreferencing heater size and engine size using a lookup table such as Table 3 (below).

TABLE 3

| | Heating Coefficients | | | |
|---|---|---|---|---|
| | ENGINE SIZE | | | |
| | small | medium | large | extra-large |
| HEATER SIZE | | | | |
| small | 9 | 11 | 15 | 24 |
| medium | 6 | 8 | 10 | 14 |
| large | 5 | 6 | 7 | 12 |
| extra-large | 3 | 4 | 5 | 7 |

As explained in greater detail below (task 630, FIG. 6A), the heating coefficient of Table 3 is utilized in calculating the preheat-period 303.

After the heating coefficient is determined, if multiple engine heaters are being used, the heating coefficient is adjusted according to the number of engine heaters present. This adjustment is performed because the preheat-period 303 will be shorter when multiple heaters are used. The heating coefficient is adjusted as follows: one adjustment constant is subtracted from the heating coefficient for each auxiliary heater used, i.e., each heater used in excess of one. In any case, the adjusted heating coefficient may never be less than one. The adjustment constant may obtained from a lookup table, such as Table 4 (below). As an example, if small and large auxiliary heaters are employed, the heating coefficient would be reduced by four. However, if the non-adjusted heating coefficient was three, the adjusted heating coefficient would be one.

TABLE 4

Adjustment Constants

| engine-size | adjustment constant |
|---|---|
| small | 1 |
| medium | 2 |
| large | 3 |
| extra-large | 4 |

Alternatively, instead of the additive adjustment constant of Table 4, a multiplicative constant may be used. Under this arrangement, if a single engine heater is present, the heating coefficient is simply multiplied by 1. If multiple heaters are present, the heating coefficient will be multiplied by a factor less than one, such as 0.9, 0.8, 0.75, etc., to compensate for the decreased preheat-period 303 needed when multiple engine heaters are used. Such factors would be provided in an appropriate lookup table (not shown). After calculating the adjusted heating coefficient using the appropriate additive or multiplicative adjustment constant, the adjusted heating coefficient is stored in the RAM 203.

In addition to calculating the heating coefficient, task 440 selects a multiplexing schedule from a number of tables stored in the ROM 204, to prevent the heaters from drawing excessive current from the outlet 105. The various multiplexing tables correspond to different maximum current capacities of the outlet 105, and different numbers and ratings of heaters. Task 440 selects a multiplexing table that most nearly corresponds to the maximum current capacity input by the user in task 430, considering the power consumption of each heater, as entered by the user in task 430. Adding in a safety factor, the heaters are considered to exceed the maximum current capacity of the outlet 105 if all heaters operating together would draw within about 350 W of the maximum current capacity selected in task 430.

An exemplary multiplexing table is shown in Table 5 (below), wherein three high-current heaters are used along with one or more low-current auxiliary heaters. In Table 5, a "1" indicates that the respective heater is on during a particular stage, and a "0" indicates that the respective heater is off during that stage. In the schedule of Table 5, the heaters of the invention are operated on a time sharing basis, such that one or more different heaters are rotatably activated.

TABLE 5

Exemplary Multiplexing Schedule

| HEATER | STAGE | | | | | |
|---|---|---|---|---|---|---|
| | 1 | 2 | 3 | 4 | 5 | 6 |
| Heater No. 1 | 1 | 0 | 1 | 0 | 0 | 0 |
| Heater No. 2 | 0 | 1 | 0 | 0 | 1 | 0 |
| Heater No. 3 | 0 | 0 | 0 | 1 | 0 | 0 |
| Auxiliary Heaters | 0 | 0 | 0 | 0 | 0 | 1 |

From Table 5, it may be seen that the heaters are operated according to the following schedule; during STAGE 1, heater no. 1 is on; during STAGE 2, heater no. 2 is on; during STAGE 3, heater no. 1 is on; during STAGE 4, heater no. 3 is on; during STAGE 5, heater no. 2 is on; and during STAGE 6, all auxiliary heaters are on. Table 5 would be appropriate when heater nos. 1, 2, and 3 each draw a substantial current, since this schedule ensures that heater nos. 1, 2, and 3 are never operated simultaneously.

However, if all heaters are low-current heaters, or if the outlet 105 has a large current capacity, task 440 would choose a table such as Table 6 (below), instead of Table 5. With Table 6, all heaters are operated together.

TABLE 6

Exemplary Multiplexing Schedule

| HEATER | STAGE | | | | | |
|---|---|---|---|---|---|---|
| | 1 | 2 | 3 | 4 | 5 | 6 |
| Heater No. 1 | 1 | 1 | 1 | 1 | 1 | 1 |
| Heater No. 2 | 1 | 1 | 1 | 1 | 1 | 1 |
| Heater No. 3 | 1 | 1 | 1 | 1 | 1 | 1 |
| Auxiliary Heaters | 1 | 1 | 1 | 1 | 1 | 1 |

If some, but not all, heaters may be safely operated together, a table such as Table 7 (below) may be utilized.

TABLE 7

Exemplary Multiplexing Schedule

| HEATER | STAGE | | | | | |
|---|---|---|---|---|---|---|
| | 1 | 2 | 3 | 4 | 5 | 6 |
| Heater No. 1 | 1 | 0 | 1 | 1 | 0 | 1 |
| Heater No. 2 | 1 | 0 | 1 | 1 | 0 | 1 |
| Heater No. 3 | 0 | 1 | 0 | 0 | 1 | 0 |
| Auxiliary Heaters | 0 | 1 | 0 | 0 | 1 | 0 |

After task 440, task 460 clears all program flags and interrupts to prepare the base unit 100 for normal operation. For example, task 440 clears the MAINTENANCE FLAG, TIME-ON, PERIODIC INTERRUPT, and STAGE. Then, query 462 determines whether the user in task 430 requested operation in the continuous mode. As explained in detail below, when the continuous mode is initiated, the base unit 100 immediately enters the preheat-mode; if the base unit 100 has not been disengaged from a.c. power at the start-time 302, the base unit 100 then initiates the maintenance-mode 305, and thereafter continues in the maintenance-mode 305 indefinitely. Thus, if the continuous mode is selected, task 464 sets the HEATING FLAG and advances to query 470. If the user did not request the continuous mode, control simply passes from query 462 to query 470.

Query 470 asks whether the base unit 100 is receiving a.c. power from the outlet 105. Query 470 also verifies, using the a.c. sensing array 224, whether the a.c. waveform from the outlet 105 is sufficiently close to 60 Hz, 120 V. If query 470 determines that adequate a.c. power is present, control passes to query 480. However, if a.c. power is missing or inadequate, control passes to query 472, which checks for any user input at the local input device 212. When the local input device 212 is utilized, it triggers a flag (not shown) of the microprocessor 202. If query 472 determines that this flag is set, query 472 returns to task 430 to receive the user's parameters, store the parameters in the RAM 203, and process the parameters. However, if no user input has been attempted, query 472 returns control to query 470. Thus, so long as the base unit 100 is without adequate a.c.

power, and the user does not attempt to enter any parameters, the d.c. power on routine continuously cycles through queries 470 and 472. By continuously monitoring any attempts of the user to enter new parameters, the d.c. power on routine helps ensure that equipment heating will be conducted according to the user's most recent specifications.

Figure 5:
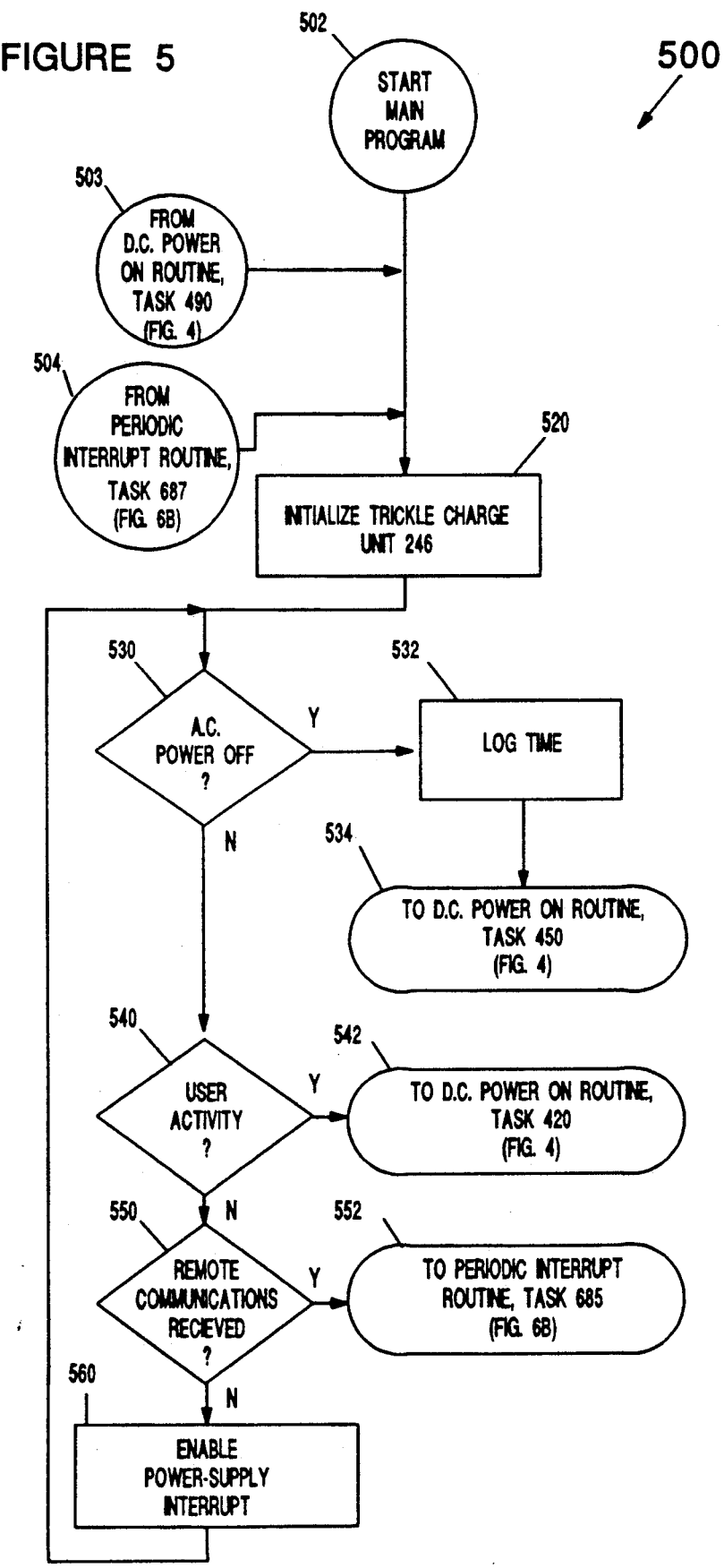
FIG. 5 is a flowchart of the main program of the invention.

When query 470 detects adequate a.c. power, query 480 asks whether the MANUAL START FLAG is set, which would indicate that the user has requested manual starting. As explained above, manual starting occurs when the user directs that heating should begin immediately, even though the activation-time 304 has not arrived. The user initiates manual starting by repeatedly plugging and unplugging the base unit 100 into/from the outlet 105. In an exemplary embodiment, two disconnections and connections within 5 seconds initiates a manual start. If this condition occurs, task 482 establishes the necessary flags of the microprocessor 202 to immediately begin continuous heating. Then, whether the user has requested a manual start or not, the d.c. power on routine ends in task 490 by advancing to the main program (FIG. 5).

The main program (FIG. 5) includes a number of tasks 500, which generally function to oversee operation of the invention by: (1) detecting a.c. power loss, receipt of user input, and communications from the remote unit 200, and (2) initiating the appropriate software routine. After the main program commences in task 502, task 520 initializes the trickle charge unit 246. The operation of the trickle charge unit 246 is not described in further detail, as operation of the preferred trickle charge unit 246 is described in detail in the '598 application, which is discussed above and previously incorporated by reference. However, if a different trickle charging device is employed, or such charging is not performed at all, tasks 520 and 560 are omitted.

After task 520, a series of queries 530, 540, and 550 are performed. First, query 530 ascertains whether the base unit 100 is receiving adequate a.c. power. If so, task 532 records the time indicated by the clock-calendar 210, and task 534 advances to task 450 of the d.c. power on routine (FIG. 4); as discussed above, the d.c. power on routine waits for a.c. power to return in query 470.

If adequate a.c. power is being received, query 540 determines whether the user has started to input any parameters via the local input device 212. If so, task 542 advances to task 420 of the d.c. power on routine (FIG. 4) to receive the user's input in task 430.

If no new user input has been received, query 550 asks whether any data are present in the regions 206a or 206d of the input buffer 206. The presence of data in these regions indicates the receipt of communications from the base receiver 232 or an alarm condition from the digital input module 230. If such data are present, task 552 advances to task 685 of the periodic interrupt routine (FIG. 6B) to perform certain communications handling tasks.

However, if query 550 answers in the negative, then task 560 enables POWER-SUPPLY INTERRUPT, thereby enabling the trickle charge unit 246 to charge the battery 114. The series of queries 530, 540, and 550 repeats continuously, subject to being interrupted periodically by the periodic interrupt routine or a loss of adequate a.c. power.

The periodic interrupt routine (FIGS. 6A, 6B) includes a number of tasks 600 that generally function to verify that adequate a.c. power is being received, and to commence engine heating at the proper time. As mentioned previously, the periodic interrupt routine, in an exemplary embodiment, is executed once per minute on a microprocessor interrupt basis. After the periodic interrupt routine commences in task 602, task 610 initializes the equipment of the invention by disabling all interrupts, turning off all heaters, and turning off the trickle charge unit 246. By shutting down all heaters every minute, this guarantees that no heater will be operated unintentionally—only the desired heaters are turned back on again, as described below (task 684, FIG. 6B).

After initialization, query 620 ascertains whether the a.c. power received from the outlet 105 is adequate. In particular, in query 620 the microprocessor 202 receives input from the a.c. sensing array 224 via the analog input block 216 and input buffer 206, and analyzes that input. For example, query 620 determines whether the magnitude and frequency of the a.c. power is adequate, e.g., approximately 120 V, 60 Hz. If query 620 establishes that the a.c. power is inadequate, task 622 records the current time indicated by the clock-calendar 210, and generates one or more appropriate warning messages using the display 214 and the acoustic annunciator 238. Then, task 624 advances to the d.c. power on routine, and waits for a.c. power to be restored (query 470, FIG. 4).

However, if query 620 identifies an adequate a.c. power signal, task 630 calculates the preheat-period 303. The preheat-period 303 is the heating period needed to raise the engine temperature to the safe starting temperature using the heaters previously selected by the user in task 430. The safe starting temperature is stored in the ROM 204, and, in an illustrative embodiment, is about 30° F. To calculate the preheat-period 303, the microprocessor 202 first obtains the time from the clockcalendar 210. Then, the microprocessor 202 obtains the engine temperature from the engine temperature sensor 220, and stores the measured engine temperature in the RAM 203. Then, task 630 calculates the necessary temperature change by subtracting the present engine temperature from the safe starting engine temperature. Alternatively, if an engine temperature sensor 220 is not provided, the ambient temperature sensor 218 may be utilized to provide the engine temperature, under the assumption that the engine has cooled to the ambient temperature. Then, task 630 utilizes a lookup table such as an exemplary Table 8 (below) to determine the average heating time for the desired temperature change.

TABLE 8

| Average Heating Times | | | | | | | | |
|---|---|---|---|---|---|---|---|---|
| TEMPERATURE INCREASE (degrees) | 35 | 30 | 25 | 20 | 15 | 10 | 5 | 0 |
| AVERAGE HEATING (TIME) (minutes) | 1 | 3 | 4 | 5 | 7 | 8 | 9 | 10 |

Then, task 630 multiplies the adjusted heating coefficient calculated in task 440 by the average heating time found in Table 8. The product of these two values provides the desired preheat period 303, i.e. the amount of time that will be required to heat the engine to the safe starting temperature.

After task 630, query 640 asks whether the HEATING FLAG is set. If the HEATING FLAG is set, control advances to query 670. Otherwise, task 650 subtracts the preheat-period 303 from the start-time 302 to obtain the activation-time 304. Then, query 652 determines whether the present time (obtained in task 630) is later than the activation-time 304; if so, it is time to start heating the Vehicle 102, and task 654 sets the HEATING FLAG.

Figure 6B:
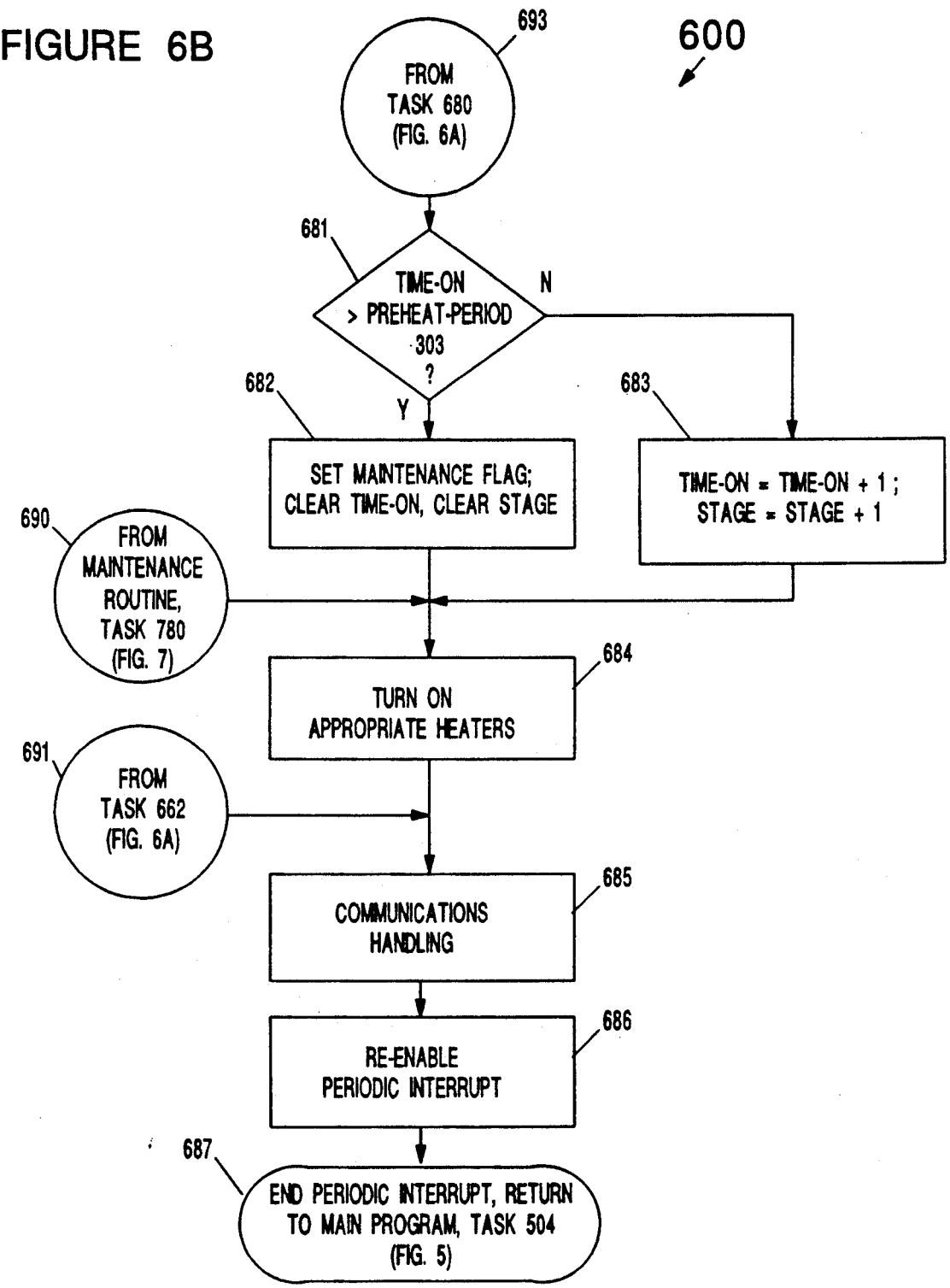
FIG. 6B is a flowchart of a second part of the periodic interrupt routine of the invention.
Figure 7:
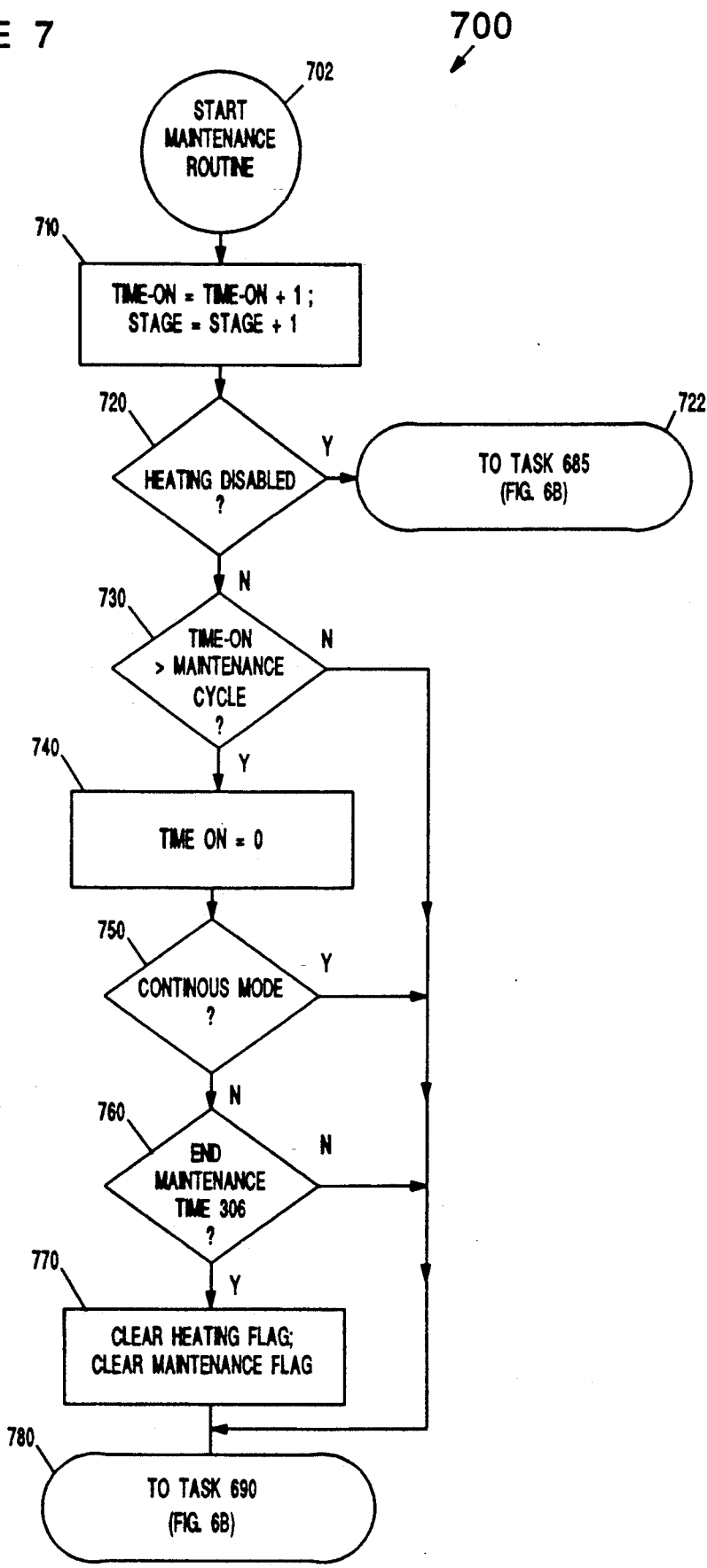
FIG. 7 is a flowchart of the maintenance routine of the invention.

After task 654, or after a negative answer to query 652, query 660 determines whether the HEATING FLAG is set. If the HEATING FLAG is not set, then it is unnecessary to execute the remainder of the periodic interrupt routine, since no heating is to be performed. However, to monitor possible messages received from the remote unit 200 or the digital input module 230, task 662 advances control to task 691 (FIG. 6B) to attend to communications handling. However, if query 660 establishes that the HEATING FLAG is set, query 670 asks whether the MAINTENANCE FLAG is set. The MAINTENANCE FLAG, which is discussed in greater detail hereinbelow, indicates whether the start-time 302 has arrived. If the MAINTENANCE FLAG is set, task 672 advances to the maintenance routine (FIG. 7), the operation of which is explained in greater detail below. However, if query 670 determines that the MAINTENANCE FLAG is not set, task 680 advances to query 681 (FIG. 6B).

Query 681 asks whether TIME-ON is greater than the preheat-period 303. This condition would indicate that the preheat-period 303 has ended, and that the start-time 302 has passed without the vehicle 102 being started. If the vehicle had been started, then it is assumed that the base unit 100 would have been unplugged from the outlet 105; under such circumstances, an a.c. power loss would have been detected, and control would have advanced to query 470 (FIG. 4) to await a.c. power restoration. Therefore, after an affirmative answer to query 681, it is assumed that the start-time 302 has passed without the vehicle being started, and task 682 thus prepares the base unit 100 to end the pre-heating mode and enter the maintenance-mode. Specifically, task 682 sets the MAINTENANCE FLAG, clears TIME-ON, and clears STAGE.

Additionally, if the base unit is equipped with an engine temperature sensor 220, query 681 may ask whether the engine temperature has already reached the safe starting temperature. If so, control would advance to task 682.

However, if query 681 establishes that TIME-ON has not exceeded the preheat-period 303, and that the engine temperature has not reached the safe starting temperature, then task 683 increments TIME-ON and STAGE. Since TIME-ON is increased by task 683 throughout the preheat-period 303, and the periodic interrupt routine is preferably performed once each minute, TIME-ON represents the number of minutes that any one or more of the heaters have been operating.

After tasks 682 or 683, task 684 turns on the appropriate heaters in accordance with the selected multiplexing table (i.e. Tables 5-7). In particular, task 684 utilizes the present value of STAGE to turn on the appropriate heaters in accordance with the multiplexing table that was selected in task 440.

After task 684, task 685 disables POWER-SUPPLY INTERRUPT, and performs certain communications handling. Additionally, various other functions are performed to facilitate remote communications with the remote unit 200. Generally, when the base receiver 232 receives data from the remote unit over the building wiring 252, the data are directed into the region 206d of the buffer 206. In an illustrative embodiment of the invention, each data signal exchanged over the building wiring 252 includes an address, a command, and associated data. If multiple base units (not shown) are connected to the building wiring 252, each base unit will be assigned a unique address, enabling each base unit to ignore commands and data prefaced by another base unit's address. In this way, communications may be conducted between multiple base units and remote units over common building wiring 252.

Accordingly, if data have been received and stored in the region 206d of the buffer 206, the microprocessor 202 in task 685 fetches the address from the region 206d and asks whether this address corresponds to the unique address of the base unit 100. If not, the routine proceeds with task 686. However, if the address contained in the region 206d matches the unique address of the base unit 100, the microprocessor 202 in task 685 fetches the command and data bytes from the region 206d and executes the fetched command. This command, for example, may require the base unit 100 to send the remote unit 200 a status report including data such as the engine temperature, the time remaining before the start-time 302, the status of the alarm devices 230a-d, whether adequate a.c. power is being received, and the like. Additionally, the commands received from the remote unit 200 may require the base unit 100 to alter previous user input stored in the RAM 203, such as the engine size, heater ratings, start-time 302, or other parameters.

If data have been received and stored in the region 206a of the buffer 206, this indicates receipt of data from one of the alarm devices 230a-230d. As mentioned above, the alarm devices 230a-230d may comprise, for example, tamper alarms, door-open detectors, motion detectors, or other alarm devices that produce a digital output signal indicative of their status. Generally, the presence of data in the region 206a from an alarm device 230a-d will trigger the microprocessor 202 to formulate a status report, transmit the report to the remote unit 200 via the base transmitter 240, and sound the acoustic annunciator 264 with a noise such as a "beep".

After completing the communications handling of task 685, task 686 re-enables PERIODIC INTERRUPT, which was previously disabled in task 610 (FIG. 6A). Task 687 then exits from the periodic interrupt routine and returns to the main program.

The maintenance routine (FIG. 7) is performed each time the periodic interrupt routine determines that the MAINTENANCE FLAG is set (task 670, FIG. 6A). In the maintenance-mode 305, power is applied to one or more heaters according to the multiplexing table selected in task 440 (FIG. 4), but only during certain periods. These selected periods are arranged so that the heaters supply the minimum amount of heat needed to keep the engine ready for safe starting. To accomplish this, heating according to the selected multiplexing table is enabled during certain periods, and completely disabled during the remaining periods. TIME-ON is utilized to keep track of one minute intervals during the maintenance mode 305.

The maintenance routine includes a number of tasks 700, which are initiated in task 702. Task 710 increments TIME-ON and STAGE by one, and then query 720 determines whether heating is enabled or disabled. In an exemplary implementation, one complete sequence of enabling and disabling the heaters, called a "maintenance cycle", lasts 30 minutes: the heaters are enabled for a period equal to [0.1·(the preheat-period 303)], and disabled for [30−0.1·(the preheat-period 303)]. In other words, the heaters are enabled for one tenth of the preheat-period 303, and disabled for the remainder of the 30-minute "maintenance cycle". If query 720 determines that heating should be disabled, task 722 advances to task 685 (FIG. 6B) to attend to communications. Otherwise, query 730 asks whether the maintenance cycle has ended (this period is 30 minutes in the present example). If the maintenance cycle has not concluded, then query 730 advances to task 780, where control is advanced to task 690 (FIG. 6B) to turn on the appropriate heaters. However, if the maintenance period has ended, TIME-ON is reset to 0 in task 740. Then, query 750 asks whether the continuous mode has been selected. If the continuous mode has not been selected, query 760 asks whether the time indicated by the clock-calendar 210 is equal to the end-maintenance-time 306. If the maintenance-mode 305 has not ended, control advances to task 780. However, if the time 306 has arrived, indicating the end of the maintenance-mode 305, task 770 clears the HEATING FLAG and the MAINTENANCE FLAG, and progresses to task 780.

If query 750 determines that the continuous mode has been selected, query 750 jumps to task 780 to immediately apply power to the appropriate heaters in task 690 (FIG. 6B). It can thus be seen that selecting the continuous mode causes the maintenance routine to bypass query 760 and task 770, foregoing the possibility of terminating the maintenance-mode 305. As a result of selecting the continuous mode, then, the invention operates in the maintenance-mode 305 indefinitely.

5. Conclusion

The present invention provides a number of advantages to its users. For instance, the invention advantageously employs engine heaters to expand a cooled engine to its normal size, and to warm the coolant and lubricants of the engine. Accordingly, the invention reduces stress on the engine, decreases engine maintenance, and extends the engine's life. In addition, the invention facilitates the use of interior heaters to increase driver and passenger comfort, battery heaters to increase battery cranking power, fuel heaters to achieve the proper fuel viscosity, and transmission heaters to ensure proper transmission operation.

The invention automatically performs calculations to facilitate the most efficient pre-heating of automotive components prior to starting the vehicle. Moreover, the invention automatically stops increasing the temperature of the vehicle components when a selected time is reached, or when a safe starting temperature is reached.

The invention additionally maintains a minimum starting temperature for a designated period of time.

A user may fully operate the invention from the remote unit 200. For example, the invention enables a user to effectively begin heating various components of his/her vehicle, or to control the time of such heating, from a remote location. Additionally, the invention supports various types of vehicle alarms, by forwarding alarm signals to the user via the remote unit 200.

While there have been shown what are presently considered to be preferred embodiments of the invention, it will be apparent to those skilled in the art that various changes and modifications can be made herein without departing from the scope of the invention as defined by the appended claims. For example, in an alternative embodiment, the present invention is contemplated to include a base unit (not shown) configured to heat components of multiple vehicles (not shown), such as a fleet of vehicles. Such a base unit is preferably located apart from the vehicles, and is preferably placed in a fixed central location near an a.c. power supply. This base unit provides a sufficient number of outlets to accommodate the heaters of each vehicle in the fleet. In this embodiment, since there are multiple vehicles to heat, the maintenance-mode 305 may be commenced if any vehicle of the fleet still has not been started at the expected-engine-start-time 302. However, loss of a.c. power is not useful to determine when any of the vehicles is started since the base unit's location is fixed, and it is connected to a.c. power irrespective of its connection to any of the vehicles. In this embodiment, the base unit determines whether a vehicle has been started, not by detecting a.c. power loss, but by another method, such as detecting disconnection of a vehicle's battery from the base unit. In this embodiment, the electronic components of the invention may receive d.c. power from a battery (not shown) that is separate from any of the vehicles' batteries, to avoid shutting down the base unit when all vehicles are disconnected from the base unit.

Furthermore, although the invention is explained in the context of a motor vehicle, the application of the invention is not limited to motor vehicles. The invention may be used in conjunction with a variety of equipment, such as shipboard power plants, pallet equipment such as pumps, stationary generator sets, and the like. Moreover, the invention is not limited to heating items, since it may be utilized in an analogous fashion to cool items. Such a cooling technique would be apparent to a person of ordinary skill in the art equipped with this disclosure.

APPENDIX

The Cybernetic Micro Systems 8051 Family Assembler, Version 3.09

```
;
;              © COPYRIGHT  1992, 1993   LLR TECHNOLOGIES INC,
;              All Rights Reserved
;***************************************************************;
;                                                                ;
; APTSTA05.ASM - SHOWS CURRENT TIME, LEAD TIME, AND CURRENT      ;
; TEMP; CHARGES THE BATTERY; UPDATE THE TIME AND TEMP EVERY      ;
; 1 MIN.; ALLOWS USER TO SET CURRENT TIME AND START TIME;        ;
; ALLOWS USER TO SET ENGINE SIZE AND HEATER SIZE; ALLOWS         ;
; USER TO HAVE EITHER CONTINUOUS OPERATION OR TO HAVE ENGINE     ;
; READY AT THE TIME ENTERED;TURNS ON HEATER RELAY WHEN CLOCK     ;
; TIME > START TIME - LEAD; TRICKLE CHARGES THE BATTERY          ;
; ADD AC OFF MODE
; TESTING DISPLAYS OF POWER ON TIME, BATTERY VOLTAGE
; CHANGED TO CURRENT BSID SOFTWARE
; NOP ALL LCD DISPLAY EXCEPT MENU
```

```
;*************************************************************;
;                                                             ;
;              ARCTIC PAK                                     ;
;              02-08-92       LAST EDIT:01-10-93              ;
;              INTERRUPT VERSION                              ;
;              JEFF DUFF                                      ;
;              RICHARD MARTIN                                 ;
;              BILL POLLARD                                   ;
;              LOGAN WAKEFIELD                                ;
;              SEUNG-BAEK YI                                  ;
;*************************************************************;
;
;=============================================================;
;                    CONSTANTS  EQUATES                       ;
;=============================================================;
;
FFF0 =        SPACE       EQU      -10H       ;30H+(-10H) = ASCII SPACE
000A =        COLON       EQU      0AH        ;30H+AH = ASCII COLON
FFFF =        SLASH       EQU      -1H        ;30H+(-1H) = ASCII SLASH
0000 =        COMGRND     EQU      00H        ;COMM/GROUND SENSOR
0001 =        HOTGRND     EQU      01H        ;HOT/GROUND SENSOR
0002 =        HOTCOM      EQU      02H        ;HOT/COMMON SENSOR
0003 =        TEMPPROBE   EQU      03H        ;TEMPERATURE PROBE
0004 =        VLINE       EQU      04H        ;LINE VOLTAGE
0014 =        DWIDTH      EQU      20         ;DISPLAY WIDTH IN CHARACTERS
001C =        COUNT       EQU      1CH        ;BLANK TIME
0080 =        DLN1        EQU      80H        ;DISPLAY LINE 1 START ADDRESS
00C0 =        DLN2        EQU      0C0H       ;DISPLAY LINE 2 START ADDRESS
4000 =        LCDAD       EQU      4000H      ;LCD ADDRESS BASE
2000 =        ADCAD       EQU      2000H      ;A/D CONVERTER ADDRESS BASE
1000 =        LATCH       EQU      1000H      ;POWER CONTROL LATCH
8000 =        CLOCK       EQU      8000H      ;CLOCK 1/100 SEC.
8001 =        CLKHOURS    EQU      8001H      ;HOURS COUNTER
8002 =        CLKMINS     EQU      8002H      ;MINUTES COUNTER
8003 =        CLKSECS     EQU      8003H      ;SECONDS
8010 =        STATUS      EQU      8010H      ;CLOCK CALENDER STATUS REG.
8011 =        COMMAND     EQU      8011H      ;CLOCK CALENDER COMMAND REG.
0099 =        VOLTVAL     EQU      99H        ;VOLTAGE COMPARATOR VALUE
00FF =        STARTUP     EQU      11111111B  ;HEATER ENGINE SIZE DEFAULTS
0000 =        CLRLATCH    EQU      00000000B
              ;
;=============================================================;
;                 VARIABLE STORAGE  EQUATES                   ;
;=============================================================;
;
0090 =        DREAD       BIT      P1.0       ;DISPLAY READ/WRITE*
0091 =        DDAT        BIT      P1.1       ;DISPLAY DATA/COMM* SELECT
00B2 =        POLAR       BIT      P3.2       ;POLARITY INDICATOR
0093 =        BEEPER      BIT      P1.3       ;BEEPERS' CONTROL LINE
0094 =        CONVRDY     BIT      P1.4       ;END OF A/D CONVERT
0094 =        CLOCKLED    BIT      P1.4       ;TOGGLE FOR THE CLOCK INT.
0095 =        PLUS        BIT      P1.5       ;'+' KEY
0096 =        MINUS       BIT      P1.6       ;'-' KEY
0097 =        SELECT      BIT      P1.7       ;'S' SET/SELECT KEY
0092 =        MENU        BIT      P1.2       ;"M" MENU KEY
00B3 =        CLKINT      BIT      P3.3       ;CLOCKS' INTERRUPT

0020 =        RELCONT     EQU      20H        ;POWER RELAY CONTROL BYTE
0000 =        HEATER1     BIT      00H        ;IF SET, HEATER 1 ON
0001 =        HEATER2     BIT      01H        ;IF SET, HEATER 2 ON
0002 =        AUX1        BIT      02H        ;IF SET, AUX. 1 ON
0007 =        BATCHRG     BIT      07H        ;IF SET, BAT CHARGE ON
0006 =        CAPCHRG     BIT      06H        ;IF SET, CAP CHARGE ON
              ;
0008 =        VOLTOK      BIT      08H        ;IF SET, CORRECT VOLTAGE
0009 =        ZPOSBIT     BIT      09H        ;IF SET, ADC CHECK OK
000A =        TIMER1FLAG  BIT      0AH        ;TIMER1 CONTROL BIT
000B =        LCDBIT      BIT      0BH        ;OFF - NO LCD DISPLAYS
              ;
0022 =        GFSTATUS    EQU      22H        ;GROUND FAULT REGISTER
0010 =        COMBIT0     BIT      10H        ;STATUS BIT LINE 0
0011 =        COMBIT1     BIT      11H        ;STATUS BIT LINE 1
0012 =        COMBIT2     BIT      12H        ;STATUS BIT LINE 2

001D =        AUXONBIT    BIT      1DH        ;AUX HEATER NO/YES (SET)
001E =        MODE        BIT      1EH        ;IF SET,TIME START
001F =        HTRNUM      BIT      1FH        ;IF SET, TWO HEATERS

0020 =        STARTCONT   BIT      20H        ;START CONTIN MODE
              ;
0050 =        DCOMFLG     BIT      50H        ;IF SET, STRINGS TO COMM PORT
0051 =        DRAMFLG     BIT      51H        ;IF SET, STRINGS FROM RAM
0052 =        SPACFLG     BIT      52H        ;IF SET, DISPLAY SPACE ELSE 0
```

```
0053 =          COLNFLG       BIT      53H        ;IF SET, DISPLAY A COLON
0054 =          SLSHFLG       BIT      54H        ;IF SET, DISPLAY A F. SLASH
0056 =          CHRGSTAT      BIT      56H        ;IF SET, IN BAT CHARGE MODE
0057 =          AMPMFLG       BIT      57H        ;IF SET, TIME IS PM
0058 =          MAINTFLG      BIT      58H        ;IF SET, IN MAINTENANCE MODE
0059 =          VOLTBIT       BIT      59H        ;FOUND GOOD VOLT RANGE
005A =          WBIT          BIT      5AH        ;SAVE BIT
005B =          MANSTART      BIT      5BH        ;MANUAL START BIT
                ;
0010 =          DSLEN         EQU      10H        ;DISPLAY STRING LENGTH
0011 =          DSPTR         EQU      11H        ;DISPLAY STRING POINTER
0012 =          DSPC          EQU      12H        ;DISPLAY SPACE COUNT
0013 =          BITCOUNT      EQU      13H        ;BIT COUNT FOR BYTETOBIT
0014 =          DIGITEMP      EQU      14H        ;DIGITAL VALUE OF TEMPERATURE
0015 =          TEMPPTR       EQU      15H        ;OFFSET ADDRESS OF TEMP TABLE
0016 =          TDPL          EQU      16H        ;TEMP. STORAGE FOR DPL
0017 =          TDPH          EQU      17H        ;TEMP. STORAGE FOR DPH
001B =          DELCNT        EQU      1BH        ;DELAY COUNT
001A =          ADCONT        EQU      1AH        ;A/D CONTROL;
                ;
0030 =          HUNDS         EQU      30H        ;1/100 SEC. CLOCK STORAGE
                ;
0031 =          HOURS         EQU      31H        ;HOURS STORAGE
0032 =          MINUTES       EQU      32H        ;MINUTES STORAGE
0033 =          STHOURS       EQU      33H        ;STARTING HOUR TIME
0034 =          STMINUTES     EQU      34H        ;STARTING MINUTE TIME
0035 =          OFFSET        EQU      35H        ;DATA ADDRESS OFFSET STORAGE
                ;
0036 =          WATCHIN       EQU      36H        ;WATCHDOG COUNTDOWN TIMERS
0037 =          WATCHOUT      EQU      37H        ;
                ;
0038 =          P1COUNTH      EQU      38H        ;BATTERY CHARGER TEMP STORAGE
0039 =          P1COUNTL      EQU      39H        ;REGISTER COUNTERS
003A =          P2COUNTH      EQU      3AH        ;
003B =          P2COUNTL      EQU      3BH        ;
003C =          FRQH          EQU      3CH        ;
003D =          FRQL          EQU      3DH        ;
003E =          TARGETSET     EQU      3EH        ;
003F =          SAFECAP       EQU      3FH        ;SAFETY CAP CHARGE LIMITOR
0040 =          VLINESTRHUNS  EQU      40H        ;VOLTAGE HUNDREDS COUNT
0041 =          VLINESTRTENS  EQU      41H        ;VOLTAGE TENS COUNT
0042 =          VLINESTRONES  EQU      42H        ;VOLTAGE ONES COUNT
0043 =          LTIME         EQU      43H        ;LEAD TIME
0044 =          LTIMEHRS      EQU      44H        ;LEAD TIME HOURS
0045 =          LTIMEMN       EQU      45H        ;LEAD TIME MINUETS
                ;
0048 =          LCDHOURS      EQU      48H        ;LCD TIME HOURS
0049 =          LCDMINS       EQU      49H        ;LCD TIME MINUTES
                ;
004A =          CYCTYPE       EQU      4AH        ;CYCLE HEATER TYPE
004B =          CYCCNT        EQU      4BH        ;CYCLE HEATER COUNT
004C =          HEATFACTOR    EQU      4CH        ;HEATER VS ENGINE FACTOR
004D =          SIZECONT      EQU      4DH        ;ENGINE/HEATER SIZE REGISTER
004E =          STARTCNT      EQU      4EH        :NUMBER OF MAINT CYCLES SINCE START
                ;
0050 =          LOOPCNT       EQU      50H        ;LOOP COUNTER
0051 =          ZCOUNT1       EQU      51H        ;TEMP LOW TIMER COUNTER
0052 =          ZCOUNT2       EQU      52H        ;TEMP HIGH TIMER COUNTER
0053 =          MAINTMIN      EQU      53H        ;MAINTENANCE MINUTES OUT OF 30
0054 =          POWERMIN      EQU      54H        ;POWER TIME IN MINUTES
0055 =          POWERHR       EQU      55H        ;POWER TIME IN HOURS
0056 =          LEADT         EQU      56H        ;SAVE LEAD TIME
0057 =          TRIGTEMP      EQU      57H        ;TRIGER TEMP POINTER
0058 =          LOWTEMP       EQU      58H        ;LOWEST TEMP
0059 =          BATVOLTL      EQU      59H        ;BATTERY VOLTAGE LOW
005A =          BATVOLTH      EQU      5AH        ;BATTERY VOLTAGE HIGH
005B =          ADCVALUE1     EQU      5BH
005C =          ADCVALUE2     EQU      5CH
005D =          ACHOUR        EQU      5DH        ;AC TIME ON
005E =          ACMINUTE      EQU      5EH
                ;;
0060 =          SPINT         EQU      60H        ;INIT. STACK POINTER LOCATION
                ;
000F =          HRMASK        EQU      00001111B  ;HOURS MASK
                ;
0000                          ORG      00H        ;RESET VECTOR FOR 80C31 PC
0000 0130                     AJMP     30H        ;JUMP PAST INTERRUPT VECTORS

;************************************************************
                ;         ZEROCROSS INTERRUPT
                ;************************************************************
0003                          ORG      0003H      ;EXTERNAL INT0 VECTOR
```

```
0003 C2AF               CLR     EA              ;TURN OFF ALL INT
0005 0209D7             LJMP    ZEROINT         ;INTERRUPT HANDLER
;****************************************************************
;          WATCHDOG TIMER INTERRRUPT
;****************************************************************
000B                    ORG     000BH           ;WATCHDOG TIMER INT VECTOR
000B C2AF               CLR     EA
000D 020E1B             LJMP    WATCHDOG
;****************************************************************
;          CLOCK INTERRUPT                                       ;
;****************************************************************
0013                    ORG     0013H           ;EXTERNAL INT1 VECTOR
0013 C2AF               CLR     EA              ;TURN OFF ALL INTERRUPTS
0015 020DC5             LJMP    SERVICE1        ;INTERRUPT HANDLER

;****************************************************************
;          TIMER 1 INTERRUPT      (POS BACKSLOPE TIMER)
;
;****************************************************************
001B                    ORG     001BH           ;EXTERNAL INT1 VECTOR
001B C2AF               CLR     EA              ;TURN OFF ALL INTERRUPTS
001D 0209F8             LJMP    T1INTERRUPT     ;TIMER 1 INTERRUPT HANDLER

;****************************************************************
;                                                                ;
0030                    ORG     30H             ;CODE STARTS HERE AT 0030H
;****************************************************************
;          DC STARTUP DEFAULTS  (SET TO MAX DEFAULTS)
;****************************************************************
0030 758160             MOV     SP,#SPINT       ;INIT THE STACK POINTER
0033 7400               MOV     A,#00H          ;SET ACC TO ZERO
0035 901000             MOV     DPTR,#LATCH     ;SET ADDRESS TO CONTROL LATCH
0038 F0                 MOVX    @DPTR,A         ;SEND ZEROS (OFFS) TO LATCH
0039 758911             MOV     TMOD,#11H       ;SET TIMER TO 16-BITS
003C 754DFF             MOV     SIZECONT,#STARTUP ;SET SIZE OF HEATER1 HEATER2
                                                ;AND ENGINE TO MAX
003F D21D               SETB    AUXONBIT        ;SET AUX ON
0041 D21F               SETB    HTRNUM          ;SET NUMBER OF HEATERS TO 2
0043 C21E               CLR     MODE            ;SET CONTINUES OPERATION MODE
0045 753306             MOV     STHOURS,#06     ;SET START TIME HOURS
0048 753400             MOV     STMINUTES,#0    ;SET START TIME MINUTES
004B 755400             MOV     POWERMIN,#00
004E 755500             MOV     POWERHR,#00
0051 C25B               CLR     MANSTART        ;NO MANUAL START OPTION
0053 C251               CLR     DRAMFLG         ;$S FROM ROM (NOT RAM)
0055 12067E             LCALL   CLOCKINIT       ;INIT CLOCK TIME
0058 753101             MOV     HOURS,#01
005B 753200             MOV     MINUTES,#00
005E 12065F             LCALL   UPDATECLOCK     ;SET DEFAULT TIME
0061 D20B               SETB    LCDBIT
0063 120811             LCALL   DINIT           ;INIT LCD
0066 01E8               AJMP    MAIN2           ;BYPASS MENU
;****************************************************************
;          MAIN LOOP                                             ;
;****************************************************************
            MAIN:
0068 D20B               SETB    LCDBIT
006A 90103D             MOV     DPTR,#CLEARLN
006D 12076D             LCALL   DLINE1
0070 90103D             MOV     DPTR,#CLEARLN
0073 120774             LCALL   DLINE2
0076 7480               MOV     A,#DLN1
0078 1207D1             LCALL   DCSEND
007B E55D               MOV     A,ACHOUR
007D 540F               ANL     A,#HRMASK
007F D253               SETB    COLNFLG
0081 1206CE             LCALL   BYTETOVALUE
0084 E55E               MOV     A,ACMINUTE
0086 1206CE             LCALL   BYTETOVALUE
0089 748A               MOV     A,#DLN1+10      ;DISPLAY LOW/HIGH BATTERY VOLTAGE
008B 1207D1             LCALL   DCSEND
008E E559               MOV     A,BATVOLTL
0090 D254               SETB    SLSHFLG
0092 1206CE             LCALL   BYTETOVALUE
0095 E55A               MOV     A,BATVOLTH
0097 1206CE             LCALL   BYTETOVALUE
009A 74C1               MOV     A,#DLN2+1       ;CURSOR POSITION
009C 1207D1             LCALL   DCSEND          ;POSITION CURSOR
009F E558               MOV     A,LOWTEMP       ;DISPLAY TRIGGER TEMP
00A1 120CB0             LCALL   TEMPFIND
00A4 74C5               MOV     A,#DLN2+5       ;CURSOR POSITION
00A6 1207D1             LCALL   DCSEND          ;POSITION CURSOR
```

```
00A9 E557              MOV     A,TRIGTEMP          ;DISPLAY LOW TEMP
00AB 120CB0            LCALL   TEMPFIND
00AE 74CD              MOV     A,#DLN2+13          ;DISPLAY HEATER TIME
00B0 1207D1            LCALL   DCSEND
00B3 E555              MOV     A,POWERHR
00B5 D253              SETB    COLNFLG
00B7 1206CE            LCALL   BYTETOVALUE
00BA E554              MOV     A,POWERMIN
00BC 1206CE            LCALL   BYTETOVALUE
00BF 751B40            MOV     DELCNT,#64          ;Hold for 2.5 seconds
00C2 120853            LCALL   DELAYBLINK          ;Delay
               MAIN1:
00C5 755D00            MOV     ACHOUR,#00
00C8 755E00            MOV     ACMINUTE,#00
00CB 755A00            MOV     BATVOLTH,#00
00CE 755900            MOV     BATVOLTL,#00
00D1 755400            MOV     POWERMIN,#00
00D4 755500            MOV     POWERHR,#00
00D7 755700            MOV     TRIGTEMP,#00
00DA 755800            MOV     LOWTEMP,#00
00DD 309708            JNB     SELECT,MAIN2
00E0 2092E2            JB      MENU,MAIN1
00E3 D20B              SETB    LCDBIT
00E5 1201EA            LCALL   MENULOOP            ;USER INPUT ROUTINES MAIN2:
00E8 C2AF              CLR     EA
00EA C20B              CLR     LCDBIT
00EC 751BC8            MOV     DELCNT,#200
               MAIN3:
00EF C2AF              CLR     EA
00F1 C2A9              CLR     ET0                 ;TURN OFF WATCHER
00F3 C28C              CLR     TR0                 ;TURN OFF TIMER
00F5 30B253            JNB     POLAR,MENUX
00F8 D51BF4            DJNZ    DELCNT,MAIN3
00FB 120807            LCALL   DCURSOFF            ;TURN OFF LCD CURSOR
00FE C25B              CLR     MANSTART
0100 C220              CLR     STARTCONT           ;CLEAR STARTUP CONTIN MODE
               ;*************************
               ;NO AC POWER   GO TO SLEEP
               ;*************************
               MENU4:
0102 90103D            MOV     DPTR,#CLEARLN
0105 12076D            LCALL   DLINE1
0108 90103D            MOV     DPTR,#CLEARLN
010B 120774            LCALL   DLINE2
010E 120644            LCALL   READCLOCK           ;READ CLOCK
0111 908003            MOV     DPTR,#CLKSECS
0114 E0                MOVX    A,@DPTR
0115 F530              MOV     HUNDS,A             ;SAVE SECONDS
0117 853148            MOV     LCDHOURS,HOURS
011A 853249            MOV     LCDMINS,MINUTES
011D 74C1              MOV     A,#DLN2+1
011F C251              CLR     DRAMFLG
0121 C250              CLR     DCOMFLG
0123 1207D1            LCALL   DCSEND
0126 E548              MOV     A,LCDHOURS
0128 540F              ANL     A,#HRMASK
012A D252              SETB    SPACFLG
012C D253              SETB    COLNFLG
012E 1206CE            LCALL   BYTETOVALUE
0131 E549              MOV     A,LCDMINS
0133 D253              SETB    COLNFLG
0135 1206CE            LCALL   BYTETOVALUE
0138 E530              MOV     A,HUNDS
013A 1206CE            LCALL   BYTETOVALUE
013D 1204D8            LCALL   CLOCKAMPM
0140 309205            JNB     MENU,MENU5          ;IF MENU BUTTON
0143 20B2BC            JB      POLAR,MENU4
                      ;;;LCALL   DINIT             ;INIT LCD
0146 214B              AJMP    MENUX               ;IF AC POWER
               MENU5:
0148 020068            LJMP    MAIN
               ;************
               ;AC POWER ON
               ;************
               MENUX:
014B 85315D            MOV     ACHOUR,HOURS        ;SAVE AC TIME
014E 85325E            MOV     ACMINUTE,MINUTES
0151 305B14            JNB     MANSTART,MENUX2     ;IF NOT MANUAL START
               ;********************
               ;MANUAL START OPTION
               ;********************
0154 90105F            MOV     DPTR,#MANUALMSG
```

```
0157 120774            LCALL    DLINE2
015A D220              SETB     STARTCONT
015C 120736            LCALL    BEEPBEEP
015F 751B78            MOV      DELCNT, #120        ;Hold for 5 seconds
0162 120853            LCALL    DELAYBLINK
0165 0201BA            LJMP     MENUX6

;*****************************************
;WAIT FOR LOSS OF AC(MANUAL START TEST)
;*****************************************
        MENUX2:
0168 D25B              SETB     MANSTART
016A 90103D            MOV      DPTR,#CLEARLN
016D 12076D            LCALL    DLINE1
0170 90106C            MOV      DPTR,#MANUALMSG2
0173 120774            LCALL    DLINE2
0176 120718            LCALL    BEEP
0179 751B0A            MOV      DELCNT, #10
017C 120853            LCALL    DELAYBLINK          ;Delay
017F 120718            LCALL    BEEP
0182 751B78            MOV      DELCNT, #120        ;Hold for 5 seconds
0185 120853            LCALL    DELAYBLINK          ;Delay
0188 30922A            JNB      MENU,MENUXM
018B 7551FF            MOV      ZCOUNT1,#255
018E 755232            MOV      ZCOUNT2,#50         ;AC TIMEOUT COUNT MENUX3:                                     ;NOW TEST FOR AC POWER
0191 309221            JNB      MENU,MENUXM
0194 20B20C            JB       POLAR,MENUX4
0197 D551F7            DJNZ     ZCOUNT1,MENUX3
019A 7551FF            MOV      ZCOUNT1,#255
019D D552F1            DJNZ     ZCOUNT2,MENUX3
01A0 020102            LJMP     MENU4

MENUX4:
01A3 30920F            JNB      MENU,MENUXM
01A6 30B20F            JNB      POLAR,MENUX5
01A9 D551F7            DJNZ     ZCOUNT1,MENUX4
01AC 7551FF            MOV      ZCOUNT1,#255
01AF D552F1            DJNZ     ZCOUNT2,MENUX4
01B2 020102            LJMP     MENU4
        MENUXM:
01B5 020068            LJMP     MAIN                ;MENU BUTTON JUMP

;*****************************************
;END OF MANUAL START TEST  AC POWER ON
;*****************************************
        MENUX5:
01B8 C25B              CLR      MANSTART            ;NO MANUAL START OPTION
        MENUX6:
01BA 90103D            MOV      DPTR,#CLEARLN
01BD 120774            LCALL    DLINE2
01C0 1203A6            LCALL    FCYCTYPE            ;FIND CYCLE HEATER SIZE
01C3 120419            LCALL    FHEATFACTOR         ;FIND HEATER VS ENGINE FACTOR
01C6 120A9F            LCALL    READADC2            ;READ BATTERY VOLTAGE
01C9 F559              MOV      BATVOLTL,A
01CB 755300            MOV      MAINTMIN,#00        ;SETUP MAINTENANCE MINUTES
01CE C200              CLR      HEATER1
01D0 C201              CLR      HEATER2
01D2 C208              CLR      VOLTOK
01D4 C258              CLR      MAINTFLG
01D6 C2B9              CLR      PT0
01D8 D2BA              SETB     PX1                 ;SET INT-1 AS HIGH PRIORITY
01DA D2AA              SETB     EX1                 ;ENABLE X-INT1
01DC D2AF              SETB     EA                  ;ENABLE INTERRUPTS
01DE 90103F            MOV      DPTR,#TEMPLABEL
01E1 120774            LCALL    DLINE2
01E4 120DD0            LCALL    PRELIM              ;PRELIM RETURN TO CHARGER
01E7 02089E            LJMP     CHARGER

;*************************************************************;
;             MENU INPUT LOOP                                  ;
;*************************************************************;

MENULOOP:
01EA 120DAE            LCALL    WATCHER             ;SET WATCHDOG TIMER
01ED 12020B            LCALL    INTRO               ;ARCTIC PAK MESSAGE AND TIME
01F0 1204EA            LCALL    CLOCKSET            ;UPDATE TIME (UPDATE TEMP)
01F3 12021E            LCALL    ENGINESIZE          ;SELECT ENGINE SIZE
01F6 12023C            LCALL    ONEORTWO
01F9 120DAE            LCALL    WATCHER             ;RESET WATCHER
01FC 12028D            LCALL    HEATERONE           ;SET HEATER ONE SIZE
01FF 1202AF            LCALL    HEATERTWO           ;SET HEATER TWO SIZE
0202 1202D8            LCALL    AUXMENU             ;SET AUX ON/OFF AND SIZE
0205 120352            LCALL    RUNOPTION           ;CONT/SET TIME MODE
```

```
0208 C2A9              CLR     ET0                 ;TURN OFF WATCHER
020A 22                RET

;****************************************************************
                INTRO:
020B 90101C             MOV     DPTR,#INTRO1M       ;DEFAULT MSG FOR LINE 1
020E 12076D             LCALL   DLINE1              ;SEND TO LCD
0211 901028             MOV     DPTR,#INTRO2M
0214 120774             LCALL   DLINE2
0217 751B78             MOV     DELCNT,#120         ;Hold for 5 seconds
021A 120853             LCALL   DELAYBLINK          ;Delay
021D 22                 RET ;                                                   ;************************
                ENGINESIZE:                         ;SET ENGINE SIZE
021E 90109A             MOV     DPTR,#ENG1A
0221 12076D             LCALL   DLINE1
0224 E54D               MOV     A,SIZECONT
0226 5403               ANL     A,#00000011B
0228 F538               MOV     P1COUNTH,A
022A E54D               MOV     A,SIZECONT
022C C2E0               CLR     ACC.0
022E C2E1               CLR     ACC.1
0230 F54D               MOV     SIZECONT,A
0232 120456             LCALL   SIZESELECT
0235 E538               MOV     A,P1COUNTH
0237 454D               ORL     A,SIZECONT
0239 F54D               MOV     SIZECONT,A
023B 22                 RET ;                                                   ;***************************
                ONEORTWO:                           ;1 VS 2 HEATERS AND SIZE
023C 201F25             JB      HTRNUM,HTWOX
023F 4144               AJMP    HONEX
                HONE:
0241 12072C             LCALL   BEEPBUTTON
                HONEX:
0244 9010C5             MOV     DPTR,#ONEHEATER
0247 12076D             LCALL   DLINE1
024A 751B0F             MOV     DELCNT,#15
024D 12082C             LCALL   DELAY
                HONE2:
0250 751B14             MOV     DELCNT,#20
0253 120853             LCALL   DELAYBLINK
0256 309508             JNB     PLUS,HTWO
0259 309605             JNB     MINUS,HTWO
025C 309722             JNB     SELECT,SETNUM1
025F 80EF               SJMP    HONE2
                HTWO:
0261 12072C             LCALL   BEEPBUTTON
                HTWOX:
0264 9010D0             MOV     DPTR,#TWOHEATER
0267 12076D             LCALL   DLINE1
026A 751B0F             MOV     DELCNT,#15
026D 12082C             LCALL   DELAY
                HTWO2:
0270 751B14             MOV     DELCNT,#20
0273 120853             LCALL   DELAYBLINK
0276 3095C8             JNB     PLUS,HONE
0279 3096C5             JNB     MINUS,HONE
027C 309708             JNB     SELECT,SETNUM2
027F 80EF               SJMP    HTWO2
                SETNUM1:
0281 12072C             LCALL   BEEPBUTTON
0284 C21F               CLR     HTRNUM
0286 22                 RET
                SETNUM2:
0287 12072C             LCALL   BEEPBUTTON
028A D21F               SETB    HTRNUM
028C 22                 RET HEATERONE:
028D 9010DC             MOV     DPTR,#HEAT1A
0290 12076D             LCALL   DLINE1
0293 E54D               MOV     A,SIZECONT
0295 540C               ANL     A,#00001100B
0297 03                 RR      A
0298 03                 RR      A
0299 F538               MOV     P1COUNTH,A
029B E54D               MOV     A,SIZECONT
029D C2E2               CLR     ACC.2
029F C2E3               CLR     ACC.3
02A1 F54D               MOV     SIZECONT,A
```

```
02A3 120456          LCALL   SIZESELECT
02A6 E538            MOV     A,P1COUNTH
02A8 23              RL      A
02A9 23              RL      A
02AA 454D            ORL     A,SIZECONT
02AC F54D            MOV     SIZECONT,A
02AE 22              RET

HEATERTWO:
02AF 301F25          JNB     HTRNUM,NOTWO
02B2 9010E9          MOV     DPTR,#HEAT2A
02B5 12076D          LCALL   DLINE1
02B8 E54D            MOV     A,SIZECONT
02BA 5430            ANL     A,#00110000B
02BC 03              RR      A
02BD 03              RR      A
02BE 03              RR      A
02BF 03              RR      A
02C0 F538            MOV     P1COUNTH,A
02C2 E54D            MOV     A,SIZECONT
02C4 C2E4            CLR     ACC.4
02C6 C2E5            CLR     ACC.5
02C8 F54D            MOV     SIZECONT,A
02CA 120456          LCALL   SIZESELECT
02CD E538            MOV     A,P1COUNTH
02CF 23              RL      A
02D0 23              RL      A
02D1 23              RL      A
02D2 23              RL      A
02D3 454D            ORL     A,SIZECONT
02D5 F54D            MOV     SIZECONT,A
            NOTWO:
02D7 22              RET
            ;
            AUXMENU:                                ;****************************
02D8 201D25          JB      AUXONBIT,AUXONX       ; SET AUX ON/OFF AND SIZE
02DB 41E0            AJMP    AUXOFFX
            AUXOFF:
02DD 12072C          LCALL   BEEPBUTTON
            AUXOFFX:
02E0 9010F6          MOV     DPTR,#AUXOFFMSG
02E3 12076D          LCALL   DLINE1
02E6 751B0F          MOV     DELCNT,#15
02E9 12082C          LCALL   DELAY
            AUXOFF2:
02EC 751B14          MOV     DELCNT,#20
02EF 120853          LCALL   DELAYBLINK
02F2 309508          JNB     PLUS,AUXON
02F5 309605          JNB     MINUS,AUXON
02F8 309722          JNB     SELECT,SETAUXOFF
02FB 80EF            SJMP    AUXOFF2
            AUXON:
02FD 12072C          LCALL   BEEPBUTTON
            AUXONX:
0300 901104          MOV     DPTR,#AUXONMSG
0303 12076D          LCALL   DLINE1
0306 751B0F          MOV     DELCNT,#15
0309 12082C          LCALL   DELAY
            AUXON2:
030C 751B14          MOV     DELCNT,#20
030F 120853          LCALL   DELAYBLINK
0312 3095C8          JNB     PLUS,AUXOFF
0315 3096C5          JNB     MINUS,AUXOFF
0318 309708          JNB     SELECT,SETAUXON
031B 80EF            SJMP    AUXON2
            SETAUXOFF:
031D 12072C          LCALL   BEEPBUTTON
0320 C21D            CLR     AUXONBIT
0322 22              RET
            SETAUXON:
0323 12072C          LCALL   BEEPBUTTON
0326 D21D            SETB    AUXONBIT
0328 90110F          MOV     DPTR,#AUXSIZEMSG
032B 12076D          LCALL   DLINE1
032E E54D            MOV     A,SIZECONT
0330 54C0            ANL     A,#11000000B
0332 03              RR      A
0333 03              RR      A
0334 03              RR      A
0335 03              RR      A
0336 03              RR      A
0337 03              RR      A
0338 F538            MOV     P1COUNTH,A
033A E54D            MOV     A,SIZECONT
```

```
033C C2E6              CLR     ACC.6
033E C2E7              CLR     ACC.7
0340 F54D              MOV     SIZECONT,A
0342 120456            LCALL   SIZESELECT              ;GET AUX SIZE
0345 E538              MOV     A,P1COUNTH
0347 23                RL      A
0348 23                RL      A
0349 23                RL      A
034A 23                RL      A
034B 23                RL      A
034C 23                RL      A
034D 454D              ORL     A,SIZECONT
034F F54D              MOV     SIZECONT,A 0351 22                RET
                                                       ;***************************
        RUNOPTION:                                     ;SET CONTINOUS VS STARTUP
0352 201E25            JB      MODE,RSTARTX
0355 615A              AJMP    RCONTX
        RCONT:
0357 12072C            LCALL   BEEPBUTTON
        RCONTX:
035A 901118            MOV     DPTR,#CONTIN
035D 12076D            LCALL   DLINE1
0360 751B0F            MOV     DELCNT,#15
0363 12082C            LCALL   DELAY
        RCONT2:
0366 751B14            MOV     DELCNT,#20
0369 120853            LCALL   DELAYBLINK
036C 309508            JNB     PLUS,RSTART
036F 309605            JNB     MINUS,RSTART
0372 309722            JNB     SELECT,SETMODE1
0375 80EF              SJMP    RCONT2
        RSTART:
0377 12072C            LCALL   BEEPBUTTON
        RSTARTX:
037A 901128            MOV     DPTR,#TIMEMODE
037D 12076D            LCALL   DLINE1
0380 751B0F            MOV     DELCNT,#15
0383 12082C            LCALL   DELAY
        RSTART2:
0386 751B14            MOV     DELCNT,#20
0389 120853            LCALL   DELAYBLINK
038C 3095C8            JNB     PLUS,RCONT
038F 3096C5            JNB     MINUS,RCONT
0392 309708            JNB     SELECT,SETMODE2
0395 80EF              SJMP    RSTART2
        SETMODE1:
0397 12072C            LCALL   BEEPBUTTON
039A C21E              CLR     MODE
039C 22                RET
        SETMODE2:
039D 12072C            LCALL   BEEPBUTTON
03A0 12061F            LCALL   STIMESET
03A3 D21E              SETB    MODE
03A5 22                RET
;*********************************************************
;               FIND HEATER CYCLE TYPE
;
;                       HEATER1     HEATER 2    AUX
;       CYCLE 1         ON          ON          ON
;
;       CYCLE 2         ON          ON          OFF
;                       OFF         OFF         ON    (IF NO AUX BYPASS)
;                       ON          ON          OFF
;
;
;       CYCLE 3         ON          OFF         OFF
;                       OFF         ON          OFF
;                       ON          OFF         OFF
;                       OFF         OFF         ON    (IF NO AUX BYPASS)
;                       OFF         ON          OFF
;
;*********************************************************
        FCYCTYPE:
03A6 754B00            MOV     CYCCNT,#00
03A9 301F0A            JNB     HTRNUM,FCYCTST1         ;IF NO HEATER2
03AC E54D              MOV     A,SIZECONT
03AE 5430              ANL     A,#00110000B            ;MASK OUT HEATER 2 BITS
03B0 03                RR      A
03B1 03                RR      A
03B2 03                RR      A
03B3 03                RR      A
03B4 71F4              ACALL   CYCSIZE
```

```
                FCYCTST1:
03B6 E54D          MOV     A,SIZECONT
03B8 540C          ANL     A,#00001100B      ;MASK OUT HEATER 1 BITS
03BA 03            RR      A
03BB 03            RR      A
03BC 71F4          ACALL   CYCSIZE
03BE E54B          MOV     A,CYCCNT
03C0 C3            CLR     C
03C1 9415          SUBB    A,#21             ;COMPARE TO 20 (2000 W)
03C3 5026          JNC     FTYPE3            ;GTR 2000W  TYPE 3
03C5 301D0C        JNB     AUXONBIT,FCYCTST2 ;IF NO AUX HEATER
03C8 E54D          MOV     A,SIZECONT
03CA 54C0          ANL     A,#11000000B      ;MASK OUT AUX BITS
03CC 03            RR      A
03CD 03            RR      A
03CE 03            RR      A
03CF 03            RR      A
03D0 03            RR      A
03D1 03            RR      A
03D2 71F4          ACALL   CYCSIZE
                FCYCTST2:
03D4 E54B          MOV     A,CYCCNT
03D6 C3            CLR     C
03D7 9415          SUBB    A,#21             ;COMPARE TO 2000 W
03D9 5008          JNC     FTYPE2
                FTYPE1:                                ;SET CYCLE TYPE 1
03DB 754B04        MOV     CYCCNT,#04
03DE 754A01        MOV     CYCTYPE,#01
03E1 61F3          AJMP    CYCEND
                FTYPE2:                                ;SET CYCLE TYPE 2
03E3 754B04        MOV     CYCCNT,#04
03E6 754A02        MOV     CYCTYPE,#02
03E9 61F3          AJMP    CYCEND
                FTYPE3:                                ;SET CYCLE TYPE 3
03EB 754B04        MOV     CYCCNT,#04
03EE 754A03        MOV     CYCTYPE,#03
03F1 61F3          AJMP    CYCEND
                CYCEND:                                ;END OF CYCLE TYPE
                   ;;MOV    A,#DLN1
                   ;;LCALL  DCSEND
                   ;;MOV    A,CYCTYPE
                   ;;LCALL  BYTETOVALUE
                   ;;MOV    DELCNT,#100
                   ;;LCALL  DELAY
03F3 22            RET

CYCSIZE:
03F4 B40007        CJNE    A,#00,CYC1        ;IF NOT SMALL SIZE
03F7 E54B          MOV     A,CYCCNT
03F9 2405          ADD     A,#5
03FB F54B          MOV     CYCCNT,A
03FD 22            RET
                CYC1:
03FE B40107        CJNE    A,#01,CYC2        ;IF NOT MEDIUM SIZE
0401 E54B          MOV     A,CYCCNT
0403 240A          ADD     A,#10
0405 F54B          MOV     CYCCNT,A
0407 22            RET
                CYC2:
0408 B40207        CJNE    A,#02,CYC3        ;IF NOT LARGE SIZE
040B E54B          MOV     A,CYCCNT
040D 240F          ADD     A,#15
040F F54B          MOV     CYCCNT,A
0411 22            RET
                CYC3:
0412 E54B          MOV     A,CYCCNT          ;  XLARGE SIZE
0414 2414          ADD     A,#20
0416 F54B          MOV     CYCCNT,A
0418 22            RET

;****************************************************
; HEATER SIZE VS ENGINE SIZE FOR HEATER FACTOR
;****************************************************

FHEATFACTOR:
0419 753D00        MOV     FRQL,#00
041C 90135E        MOV     DPTR,#MULTIPLIER
                ENGINE:
041F C3            CLR     C
0420 E54D          MOV     A,SIZECONT
0422 5403          ANL     A,#00000011B      ;MASK OUT HEATER DESIGNATION BITS
0424 75F004        MOV     B,#04
0427 A4            MUL     AB
0428 C3            CLR     C
0429 2582          ADD     A,DPL
```

```
042B F582           MOV    DPL,A
042D 5002           JNC    NOINDEX
042F 0583           INC    DPH
              NOINDEX:                          ;HEATER ONE SIZE
0431 C3             CLR    C
0432 E54D           MOV    A,SIZECONT           ;GET VALUE FROM 2D TABLE
0434 540C           ANL    A,#00001100B         ;MASK OUT HEATER2 AND ENGINE
0436 03             RR     A                    ;ROTATE RIGHT TWICE TO GET A
0437 03             RR     A                    ;VALUE OF 0-3
0438 93             MOVC   A,@A+DPTR            ;GET THE MULTIPLIER FROM TABLE
0439 F53C           MOV    FRQH,A               ;SAVE TO TEMPORARY
043B 301F15         JNB    HTRNUM,NOTOV         ;IF WE HAVE TWO HEATERS THEN
043E E54D           MOV    A,SIZECONT           ;GET THE VALUE
0440 5430           ANL    A,#00110000B         ;MASKIT
0442 03             RR     A
0443 03             RR     A
0444 03             RR     A
0445 03             RR     A
0446 2401           ADD    A,#01
0448 F5F0           MOV    B,A                  ;SAVE HEATER2
044A E53C           MOV    A,FRQH               ;HEATER1 VS ENGINE SIZE
044C C3             CLR    C
044D 95F0           SUBB   A,B                  ;ON OVERFLOW MAKE IT 255
044F 5002           JNC    NOTOV
0451 7401           MOV    A,#01
              NOTOV:
0453 F54C           MOV    HEATFACTOR,A
                    ;;MOV    A,#DLN1
                    ;;LCALL    DCSEND
                    ;;MOV     A,HEATFACTOR
                    ;;SETB    COLNFLG
                    ;;LCALL    BYTETOVALUE
                    ;;MOV     A,FRQH
                    ;;LCALL   BYTETOVALUE
                    ;;MOV    DELCNT,#140
                    ;;LCALL    DELAY
0455 22             RET

;****************************************************************
;       sizeselect gives a menu to chose a small, med, larg ;
;       or extra larg size and leAves a number ZERO though     ;
;       three in the varable Pcount.                           ;
;****************************************************************

SIZESELECT:
0456 C250           CLR    DCOMFLG              ;CLEAR COMMAND FLAG
0458 9010B2         MOV    DPTR,#SIZER2         ;NAVIGATION MESSAGES
045B 120774         LCALL  DLINE2               ;PRINT ON LINE 2 OF LCD
045E 8160           AJMP   NEXTCHOCE

NEXTCHOCE:
0460 748E           MOV    A, #DLN1+14          ;LOAD ADDRESS LCD LINE1
0462 1207D1         LCALL  DCSEND               ;SEND TO LCD COMMAND RESISTOR
0465 E538           MOV    A,P1COUNTH
0467 75F003         MOV    B,#03
046A A4             MUL    AB
046B F51C           MOV    COUNT,A              ;TABLE OFFSET
046D 2403           ADD    A,#03
046F F53A           MOV    P2COUNTH,A           ;TABLE ENTRY ENDING ADDRESS

NEXTCHAR:
0471 C250           CLR    DCOMFLG
0473 9010A6         MOV    DPTR,#SIZER          ;MOVE BASE ADDRESS TO DATA POINTER
0476 E51C           MOV    A,COUNT              ;MOVE OF SET TO ACC
0478 93             MOVC   A,@A+DPTR            ;MOVE CHARATOR TO ACC
0479 1207BA         LCALL  DSEND                ;SEND TO LCD
047C 051C           INC    COUNT                ;INC COUNT FOR IN SIDE LOOP
047E E53A           MOV    A,P2COUNTH           ;
0480 651C           XRL    A,COUNT              ; CHECK IF SIZE SENT
0482 70ED           JNZ    NEXTCHAR             ; SEND NEXT LETTER
0484 751B0F         MOV    DELCNT,#15
0487 12082C         LCALL  DELAY
              CHOCE:
048A 751B14         MOV    DELCNT,#20
048D 120853         LCALL  DELAYBLINK
0490 309508         JNB    PLUS,SIZEPLUS        ;CHECK PLUSE KEY
0493 309614         JNB    MINUS,SIZEMINUS      ;CHECK MINUS KEY
0496 309720         JNB    SELECT,CHCKSEL       ;CHECK SELECT KEY
0499 818A           AJMP   CHOCE

SIZEPLUS:
049B 12072C         LCALL  BEEPBUTTON           ; DELAY
049E 0538           INC    P1COUNTH             ; INC COUNTER
04A0 E538           MOV    A,P1COUNTH
04A2 B404BB         CJNE   A,#04,NEXTCHOCE
```

```
04A5 753800            MOV      P1COUNTH,#00
04A8 8160              AJMP     NEXTCHOCE

SIZEMINUS:
04AA 12072C            LCALL    BEEPBUTTON              ; DELAY
04AD 1538              DEC      P1COUNTH                ; DEC COUNTER
04AF E538              MOV      A,P1COUNTH
04B1 B4FFAC            CJNE     A,#0FFH,NEXTCHOCE
04B4 753803            MOV      P1COUNTH,#03
04B7 8160              AJMP     NEXTCHOCE

CHCKSEL:
04B9 12072C            LCALL    BEEPBUTTON              ; DELAY
04BC 22                RET
;*********************************************************************
;        LCDTIME - SENDS TIME TO THE LCD
;*********************************************************************

LCDTIME:
04BD C251              CLR      DRAMFLG
04BF C250              CLR      DCOMFLG
04C1 1207D1            LCALL    DCSEND
04C4 E548              MOV      A,LCDHOURS
04C6 540F              ANL      A,#HRMASK
04C8 D252              SETB     SPACFLG
04CA D253              SETB     COLNFLG
04CC 1206CE            LCALL    BYTETOVALUE
04CF E549              MOV      A,LCDMINS
04D1 1206CE            LCALL    BYTETOVALUE
04D4 1204D8            LCALL    CLOCKAMPM
04D7 22                RET
;*********************************************************************
;        CLOCKAMPM - DECIDES WHETHER IT IS MORNING OR NIGHT    ;
;        AND WRITES THE APPROPRIATE 'A' OR 'P' AFTER THE SEC.S;
;*********************************************************************

CLOCKAMPM:
04D8 C3                CLR      C                       ;CLEAR THE CARRY
04D9 C250              CLR      DCOMFLG                 ;CLEAR COMMAND FLAG
04DB E548              MOV      A,LCDHOURS
04DD 20E704            JB       ACC.7,PM                ;IF CY, THEN GOTO PM
04E0 7441              MOV      A,#'A'                  ;LOAD AN 'A'
04E2 81E6              AJMP     AMPM1                   ;JUMP OVER PM

04E4 7450    PM:       MOV      A,#'P'                  ;LOAD A 'P'

04E6 1207BA  AMPM1:    LCALL    DSEND

04E9 22                RET

;*********************************************************************
;        CLOCKSET - USES '+','-',& 'S' TO ALLOW A USER TO SET ;
;        THE CURRENT TIME AND DATE                            ;
;*********************************************************************

CLOCKSET:
04EA 901079            MOV      DPTR,#CLKSET1           ;PNT TO LINE 1 $
04ED 12076D            LCALL    DLINE1                  ;SEND TO LCD
04F0 901087            MOV      DPTR,#CLKSET2           ;PNT TO LINE 2 $
04F3 120774            LCALL    DLINE2                  ;SEND TO LCD
04F6 120644            LCALL    READCLOCK               ;STORE/DISPLAY CURRENT TIME
04F9 12057B            LCALL    SSLCDTIME2
04FC 12050C            LCALL    SSHOUR                  ;INPUT HOURS USING + - S
04FF 1205AB            LCALL    SSMINUTE                ;INPUT MINUTES USING + - S
                       ;;;LCALL SSAMPM                  ;INPUT AM VS PM
0502 854831            MOV      HOURS,LCDHOURS
0505 854932            MOV      MINUTES,LCDMINS
0508 12065F            LCALL    UPDATECLOCK             :UPDATE CLOCK WITH NEW TIME
050B 22                RET                              ;RETURN
            ;SSHOUR:
050C 748E              MOV      A,#DLN1+14              ;PNT TO BLINK
050E 120599            LCALL    SSBLINK2                ;BLINK EXITS KEY PRESSED
0511 309518            JNB      PLUS,SSPLUSH            ;PLUS KEY PRESSED?
0514 309639            JNB      MINUS,SSMINUSH          ;MINUS KEY PRESSED?
0517 30970E            JNB      SELECT,SSHOUREND        ;SELECT KEY PRESSED?
051A 12056F            LCALL    SSLCDTIME               ;BLINK EXITS KEY PRESSED
051D 30950C            JNB      PLUS,SSPLUSH            ;PLUS KEY PRESSED?
0520 30962D            JNB      MINUS,SSMINUSH          ;MINUS KEY PRESSED?
0523 309702            JNB      SELECT,SSHOUREND        ;SELECT KEY PRESSED?
0526 A10C              AJMP     SSHOUR
            SSHOUREND:
0528 12072C            LCALL    BEEPBUTTON              ;AUDIO BEEP
052B 22                RET                              ;RETURN END OF SSHOUR
```

```
                SSPLUSH:
052C 12072C             LCALL   BEEPBUTTON              ;AUDIO BEEP
052F E548               MOV     A,LCDHOURS              ;LOAD CLOCK HOUR
0531 05E0               INC     ACC                     ;LOAD CURRENT HOUR
0533 B40D02             CJNE    A,#13,SSPLUSH2          ;NO GO UPDATE LCD
0536 7401               MOV     A,#1                    ;13AM CHANGES TO 1AM

SSPLUSH2:
0538 B48D02             CJNE    A,#141,SSPLUSH3         ;   ;
053B 7481               MOV     A,#129                  ;13PM CHANGES TO 1PM

SSPLUSH3:
053D B40C04             CJNE    A,#12,SSPLUSH4          ;IF 12 AM
0540 748C               MOV     A,#140                  ;MOVE 12 PM
0542 A149               AJMP    CHANGEEND
                SSPLUSH4:
0544 B48C02             CJNE    A,#140,CHANGEEND        ;IF 12 PM
0547 740C               MOV     A,#12                   ;MOVE 12 AM
                CHANGEEND:
0549 F548               MOV     LCDHOURS,A
054B 12057B             LCALL   SSLCDTIME2
054E A10C               AJMP    SSHOUR
                SSMINUSH:
0550 12072C             LCALL   BEEPBUTTON              ;AUDIO BEEP
0553 E548               MOV     A,LCDHOURS              ;LOAD CURRENT HOUR
0555 15E0               DEC     ACC                     ;YES, SUB ONE HOUR
0557 B40002             CJNE    A,#0,SSMINUSH2          ;YES, GO UPDATE LCD
055A 740C               MOV     A,#12                   ;0AM CHANGES TO 12AM

SSMINUSH2:
055C B48002             CJNE    A,#128,SSMINUSH3        ;YES, GO UPDATE LCD
055F 748C               MOV     A,#140                  ;0PM CHANGES TO 12PM
                SSMINUSH3:
0561 B40B04             CJNE    A,#11,SSMINUSH4         ;IF 12 AM
0564 748B               MOV     A,#139                  ;MOVE 12 PM
0566 A149               AJMP    CHANGEEND
                SSMINUSH4:
0568 B48BDE             CJNE    A,#139,CHANGEEND        ;IF 12 PM
056B 740B               MOV     A,#11                   ;MOVE 12 AM
056D A149               AJMP    CHANGEEND
                SSLCDTIME:
056F 748E               MOV     A,#DLN1+14
0571 1204BD             LCALL   LCDTIME
0574 751B14             MOV     DELCNT,#20              ;ALLOW TIME TO VIEW NEW TIME
0577 120853             LCALL   DELAYBLINK              ;EXITS DELAY IF KEY PRESSED
057A 22                 RET
                SSLCDTIME2:
057B 748E               MOV     A,#DLN1+14
057D 1204BD             LCALL   LCDTIME
0580 751B0F             MOV     DELCNT,#15              ;ALLOW TIME TO VIEW NEW TIME
0583 12082C             LCALL   DELAY                   ;EXITS DELAY IF KEY PRESSED
0586 22                 RET
                SSBLINK1:
0587 1207D1             LCALL   DCSEND                  ;SEND COMMAND TO LCD
058A 742D               MOV     A,#'-'                  ;LOAD A MINUS SIGN
058C 1207BA             LCALL   DSEND                   ;SEND TO LCD
058F 1207BA             LCALL   DSEND                   ;SEND TO LCD
0592 751B0F             MOV     DELCNT,#15              ;SETUP DELAY LOOP COUNT
0595 120853             LCALL   DELAYBLINK              ;EXITS DELAY IF KEY PRESSED
0598 22                 RET
                SSBLINK2:
0599 1207D1             LCALL   DCSEND                  ;SEND COMMAND TO LCD
059C 742D               MOV     A,#'-'                  ;LOAD A MINUS SIGN
059E 1207BA             LCALL   DSEND                   ;SEND TO LCD
05A1 1207BA             LCALL   DSEND                   ;SEND TO LCD
05A4 751B0F             MOV     DELCNT,#15              ;SETUP DELAY LOOP COUNT
05A7 120853             LCALL   DELAYBLINK              ;EXITS DELAY IF KEY PRESSED
05AA 22                 RET

SSMINUTE:
05AB 7491               MOV     A,#DLN1+17              ;PNT TO BEGGING BLINK
05AD 120599             LCALL   SSBLINK2                ;BLINK EXITS ON KEY PRESS
05B0 309514             JNB     PLUS,SSPLUSM            ;PLUS KEY PRESSED?
05B3 309624             JNB     MINUS,SSMINUSM          ;MINUS KEY PRESSED?
05B6 309733             JNB     SELECT,SSMINEND         ;SELECT KEY PRESSED?
05B9 12056F             LCALL   SSLCDTIME               ;BLINK EXITS ON KEY PRESS
05BC 309508             JNB     PLUS,SSPLUSM            ;PLUS KEY PRESSED?
05BF 309618             JNB     MINUS,SSMINUSM
05C2 309727             JNB     SELECT,SSMINEND
05C5 A1AB               AJMP    SSMINUTE

SSPLUSM:
05C7 12072C             LCALL   BEEPBUTTON
05CA E549               MOV     A,LCDMINS
```

```
05CC 05E0               INC     ACC
05CE B43C02             CJNE    A,#60,NOTSIXTY    ;60 CLOCK ROLLOVER
05D1 7400               MOV     A,#00

NOTSIXTY:
05D3 F549               MOV     LCDMINS,A
05D5 12057B             LCALL   SSLCDTIME2
05D8 A1AB               AJMP    SSMINUTE

SSMINUSM:
05DA 12072C             LCALL   BEEPBUTTON
05DD E549               MOV     A,LCDMINS
05DF 14                 DEC     A
05E0 B4FF02             CJNE    A,#0FFH,MINUP     ;ROLLOVER
05E3 743B               MOV     A,#59

MINUP:
05E5 F549               MOV     LCDMINS,A
05E7 12057B             LCALL   SSLCDTIME2
05EA A1AB               AJMP    SSMINUTE

SSMINEND:
05EC 12072C             LCALL   BEEPBUTTON
05EF 22                 RET                       ;END OF SSMINUTES
                SSAMPM:
05F0 7493               MOV     A,#DLN1+19        ;PNT TO BLINK
05F2 120587             LCALL   SSBLINK1          ;BLINK EXITS KEY PRESSED
05F5 309514             JNB     PLUS,AMTOPM       ;'+' PRESSED SWITCH ZONE
05F8 309611             JNB     MINUS,AMTOPM      ;'-' PRESSED SWITCH ZONE
05FB 30971C             JNB     SELECT,SSAMEND    ;GO SET NEW TIME
05FE 12056F             LCALL   SSLCDTIME         ;BLINK EXITS KEY PRESSED
0601 309508             JNB     PLUS,AMTOPM       ;'+' PRESSED SWITCH ZONE
0604 309605             JNB     MINUS,AMTOPM      ;'-' PRESSED SWITCH ZONE
0607 309710             JNB     SELECT,SSAMEND    ;GO END OF AMPM
060A A1F0               AJMP    SSAMPM            ;SKIP ZONE SWITCHING 060C 12072C     AMTOPM: LCALL   BEEPBUTTON              ;AUDIO BEEP
060F E548               MOV     A,LCDHOURS        ;LOAD CLOCK HOUR
0611 B2E7               CPL     ACC.7             ;CHANGE AM/PM
0613 F548               MOV     LCDHOURS,A
0615 12057B             LCALL   SSLCDTIME2
0618 A1F0                       AJMP    SSAMPM            ;KEEP POLLING KEYS

SSAMEND:
061A 12072C             LCALL   BEEPBUTTON
061D 22                 RET                       ;END OF SSAMPM

STARTDEVICE:
061E 22                 RET
        ;****************************************************************
        ;       STIMESET - ALLOW USER TO SET START TIME (ONLY HOURS  ;
        ;       ARE ADJUSTABLE.                                       ;
        ;****************************************************************
                STIMESET:
061F 901133             MOV     DPTR,#STMSET1     ;PNT TO LINE 1 STRING
0622 12076D             LCALL   DLINE1            ;SEND TO LCD
0625 901087             MOV     DPTR,#CLKSET2     ;PNT TO LINE 2 STRING
0628 120774             LCALL   DLINE2            ;SEND TO LCD
062B 853348             MOV     LCDHOURS,STHOURS  ;GET START HOUR
062E 853449             MOV     LCDMINS,STMINUTES ;GET START MINUTES
0631 12050C             LCALL   SSHOUR            ;INPUT HOURS  + - S
0634 12057B             LCALL   SSLCDTIME2
0637 1205AB             LCALL   SSMINUTE          ;INPUT MINUTES + -
063A 12057B             LCALL   SSLCDTIME2
                ;;;LCALL   SSAMPM                 ;INPUT AMPM   + - S
063D 854833             MOV     STHOURS,LCDHOURS  ;SAVE START HOURS
0640 854934             MOV     STMINUTES,LCDMINS ;SAVE MINUTES
0643 22                 RET

;****************************************************************
        ;       READCLOCK - READS CURRENT TIME FROM CLOCK, STORES    ;
        ;       CURRENT HOUR -> HOURS; CURRENT MINUTE -> MINUTES,    ;
        ;****************************************************************
                READCLOCK:
0644 908010             MOV     DPTR,#STATUS      ;CLEAR THE INTERRUPT
0647 E0                 MOVX    A,@DPTR
0648 908000             MOV     DPTR,#CLOCK
064B E0                 MOVX    A,@DPTR
064C F530               MOV     HUNDS,A
064E 908001             MOV     DPTR,#CLKHOURS
0651 E0                 MOVX    A,@DPTR
```

```
0652 F531              MOV     HOURS,A
0654 F548              MOV     LCDHOURS,A
0656 908002            MOV     DPTR,#CLKMINS
0659 E0                MOVX    A,@DPTR
065A F549              MOV     LCDMINS,A
065C F532              MOV     MINUTES,A
065E 22                RET

;*********************************************************************
; UPDATECLOCK - SENDS HOURS & :00 MINUTES TO CLOCK                    ;
;*********************************************************************

UPDATECLOCK:
065F 908011            MOV     DPTR,#COMMAND   ;PNT TO CLOCK COMAMND
0662 7400              MOV     A,#00           ;LOAD A ZERO
0664 F0                MOVX    @DPTR,A         ;STOP CLOCK
0665 908001            MOV     DPTR,#CLKHOURS  ;PNT TO HOURS REG.
0668 E531              MOV     A,HOURS         ;LOAD USERS HOURS
066A F0                MOVX    @DPTR,A         ;SEND NEW HOUR
066B 908002            MOV     DPTR,#CLKMINS
066E E532              MOV     A,MINUTES
0670 F0                MOVX    @DPTR,A
0671 908010            MOV     DPTR,#STATUS
0674 7410              MOV     A,#10H
0676 F0                MOVX    @DPTR,A
0677 908011            MOV     DPTR,#COMMAND   ;PNT TO CLOCK COMMAND
067A 741B              MOV     A,#1BH          ;4.19MHz CLOCK
067C F0                MOVX    @DPTR,A         ;STARTUP THE CLOCK
067D 22                RET
;*********************************************************************
;*              CLOCK INITIALIZATION                                 *
;*********************************************************************

CLOCKINIT:
067E E4                CLR     A               ;CLEAR THE ACC
067F 901010            MOV     DPTR,#CLOCKSTR  ;PNT TO CLOCK INIT STRING
0682 93                MOVC    A,@A+DPTR       ;LOAD DATA
0683 908011            MOV     DPTR,#COMMAND   ;PNT TO CLK COMMAND REG
0686 F0                MOVX    @DPTR,A         ;SEND DATA
0687 E4                CLR     A               ;CLEAR THE ACC
0688 901011            MOV     DPTR,#CLOCKSTR+1 ;PNT TO 2ND CHAR IN $
068B 93                MOVC    A,@A+DPTR       ;LOAD THAT CHAR
068C 908010            MOV     DPTR,#STATUS    ;PNT TO STATUS REG. ON CLOCK
068F F0                MOVX    @DPTR,A         ;READ CLOCK STATUS
0690 908000            MOV     DPTR,#CLOCK     ;PNT TO CLOCKS' 1/100 SEC.S
0693 C083              PUSH    DPH             ;PUT DATA POINTER ON STACK
0695 C082              PUSH    DPL             ;
0697 901012            MOV     DPTR,#CLOCKSTR+2  ;PNT TO 3RD CHAR IN $

CLKINIT0:
069A E4                CLR     A               ;CLEAR THE ACC
069B 93                MOVC    A,@A+DPTR       ;LOAD THAT CHAR
069C B4FF02            CJNE    A,#0FFH,CLKINIT1 ;IS IT THE END OF $?
069F C1BA              AJMP    CLKINIT2        ;RESTORE CLOCK

CLKINIT1:
06A1 A3                INC     DPTR            ;PNT TO NEXT CHAR OF CLK $
06A2 858216            MOV     TDPL,DPL        ;STORE EPROM POINTER IN RAM
06A5 858317            MOV     TDPH,DPH        ;
06A8 D082              POP     DPL             ;RELOAD CLOCK CHIP POINTER
06AA D083              POP     DPH             ;
06AC F0                MOVX    @DPTR,A         ;SEND DATA TO CLOCK CHIP
06AD A3                INC     DPTR            ;PNT TO NEXT CLOCK ADDRESS
06AE C083              PUSH    DPH             ;PUT CLOCK POINTER ON STACK
06B0 C082              PUSH    DPL             ;
06B2 851783            MOV     DPH,TDPH        ;RELOAD EPROM POINTER
06B5 851682            MOV     DPL,TDPL        ;
06B8 C19A              AJMP    CLKINIT0        ;GO GET ANOTHER CHAR

CLKINIT2:
06BA D083              POP     DPH             ;RESTORE STACK POINTER
06BC D082              POP     DPL             ;
06BE 7408              MOV     A,#08H          ;SELECT PERIODIC CLK INTTERUPT
06C0 F0                MOVX    @DPTR,A         ;SEND TO CLOCK CHIP
06C1 908010            MOV     DPTR,#STATUS
06C4 7410              MOV     A,#10H
06C6 F0                MOVX    @DPTR,A
06C7 908011            MOV     DPTR,#COMMAND   ;PNT TO COMMAND ON CLOCK CHIP
06CA 741B              MOV     A,#1BH          ;SELECT 4.19MHz CLOCK SPEED
06CC F0                MOVX    @DPTR,A         ;128 TIMES NORMAL SPEED
06CD 22                RET

;*********************************************************************
;         BYTETOVALUE CONVERTS THE BYTE IN THE ACC INTO ITS          ;
```

```
                ;                DECIMAL EQUIVALENT                              ;
                ;           .   USES FLAGS SPACFLG - INDICATES IF LEAD ZERO IS   ;
                ;                                 AN ASCII SPACE                 ;
                ;                       COLNFLG - INDICATES A COLON FOLLOWS      ;
                ;                       SLSHFLG - INDICATES A SLASH FOLLOWS      ;
                ;****************************************************************

BYTETOVALUE:
06CE 300B35            JNB     LCDBIT,LVALID7
06D1 75F064            MOV     B,#100          ;CHECK FOR GREATER THAN 99
06D4 84                DIV     AB
06D5 B40002            CJNE    A,#00,BYTE100   ;IF GREATER THAN 99 DISPLAY
06D8 C1DD              AJMP    BYTE10
                   BYTE100:
06DA 1207B8            LCALL   DASCII
                   BYTE10:
06DD E5F0              MOV     A,B             ;MOVE REMAINDER
06DF 75F00A            MOV     B,#10           ;MOVE 10
06E2 84                DIV     AB
06E3 305205            JNB     SPACFLG,LVALID4 ;IS A SPACE REQUESTED?
06E6 B40002            CJNE    A,#00H,LVALID4  ;IS COUNT = 0?
06E9 74F0              MOV     A,#SPACE        ;YES, MAKE IT A SPACE(-30H)

LVALID4:
06EB 1207B8            LCALL   DASCII
06EE E5F0              MOV     A,B
06F0 1207B8            LCALL   DASCII
06F3 305305            JNB     COLNFLG,LVALID5 ;IS COLON REQUESTED?
06F6 740A              MOV     A,#COLON        ;ASCII(COLON-30H)
06F8 1207B8            LCALL   DASCII

LVALID5:
06FB 305405            JNB     SLSHFLG,LVALID6 ;IS F. SLASH REQUESTED?
06FE 74FF              MOV     A,#SLASH        ;YES, ASCII(SLASH-30H)
0700 1207B8            LCALL   DASCII

LVALID6:
0703 120807            LCALL   DCURSOFF        ;TURN CURSOR OFF
                   LVALID7:
0706 C252              CLR     SPACFLG         ;CLEAR SPACE REQUEST
0708 C253              CLR     COLNFLG         ;CLEAR COLON REQUEST
070A C254              CLR     SLSHFLG         ;CLEAR SLASH REQUEST
070C 22                RET

;****************************************************************
                ;      BEEPX -    SET BEEPER BIT ON THEN CLEAR
                ;****************************************************************
                ;
                   BEEPX:
070D D293              SETB    BEEPER          ;TURN ON BEEPER
070F 120841            LCALL   DELAY1
0712 C293              CLR     BEEPER          ;TURN BEEPER OFF
0714 120841            LCALL   DELAY1

0717 22                RET
                ;****************************************************************
                ;           BEEP                                ;
                ;****************************************************************
                ;
                   BEEP:
0718 C0F0              PUSH    B
071A 75F090            MOV     B,#144          ;LOOP COUNT
                   BP2A:
071D 12070D            LCALL   BEEPX           ;BEEP FOR .1 mS
0720 120841            LCALL   DELAY1
0723 120841            LCALL   DELAY1
0726 D5F0F4            DJNZ    B,BP2A
                   BP3:
0729 D0F0              POP     B 072B 22                RET
                ;**********************************
                ;BUTTON BEEP BEEP WITH BUTTON DELAY
                ;**********************************
                   BEEPBUTTON:
072C 120718            LCALL   BEEP
072F 751B14            MOV     DELCNT,#20
0732 12082C            LCALL   DELAY
0735 22                RET
                ;
                ;
```

```
;*****************************************************************
;        ERBEEP BEEPS SEVERAL TIMES TO INDICATE AN ERROR          ;
;*****************************************************************
;
                BEEPBEEP:
0736 120718             LCALL   BEEP
0739 751C02             MOV     COUNT,#2
073C 12082C             LCALL   DELAY
073F 120718             LCALL   BEEP
0742 751C06             MOV     COUNT,#6
0745 12082C             LCALL   DELAY
0748 120718             LCALL   BEEP
074B 751C02             MOV     COUNT,#2
074E 12082C             LCALL   DELAY
0751 120718             LCALL   BEEP
0754 751C06             MOV     COUNT,#6
0757 12082C             LCALL   DELAY
075A 120718             LCALL   BEEP
075D 751C02             MOV     COUNT,#2
0760 12082C             LCALL   DELAY
0763 120718             LCALL   BEEP
0766 751C06             MOV     COUNT,#6
0769 12082C             LCALL   DELAY
076C 22                 RET
;
;*****************************************************************
;           LCD DISPLAY DRIVER ROUTINES                           ;
;*****************************************************************
;
;---------------------------------------------------------------;
;         DLINE1&2 CALL DSTRING TO DISPLAY A STRING ON LINES    ;
;         1 OR 2 RESPECTIVELY.  SPACES ARE WRITTEN TO ERASE     ;
;         THE BALANCE OF THE LINE.                              ;
;                 < DPTR - STRING ADDRESS                       ;
;*****************************************************************
;
                DLINE1:
076D 300B23             JNB     LCDBIT,DLBL2
0770 7480               MOV     A,#DLN1             ;LOAD LINE 1 ADDRES
0772 8005               SJMP    DLBL1               ;AND SEND THE LINE
                DLINE2:
0774 300B1C             JNB     LCDBIT,DLBL2
0777 74C0               MOV     A,#DLN2             ;LOAD LINE 2 ADDRESS
                DLBL1:
0779 1207D1             LCALL   DCSEND              ;SEND CURSOR ADDR TO DISPLAY
077C 120794             LCALL   DSTRING             ;DISPLAY THE STRING
077F 1510               DEC     DSLEN               ;SUBTRACT 1 TO GET # OF ...
                                                    ; CHARACTERS DISPLAYE
0781 7414               MOV     A,#DWIDTH           ;DETERMINE # OF SPACES ...
0783 9510               SUBB    A,DSLEN             ; TO COMPLETE THE LINE
0785 600C               JZ      DLBL2               ;IF NONE, OR DISPLAY ...
0787 400A               JC      DLBL2               ; 'OVERWRITTEN', BAIL OUT
0789 F512               MOV     DSPC,A              ;STORE SPACE COUNT
078B 7420               MOV     A,#20H              ;READY A SPACE CHAR
                DLP1:
078D 1207BA             LCALL   DSEND               ;SEND THE SPACE
0790 D512FA             DJNZ    DSPC,DLP1           ;DECREMENT SPACE COUNT & LOOP
                DLBL2:
0793 22                 RET                         ;RETURN FROM DLINE1 OR DLINE2
;
;*****************************************************************
;         DSTRING WRITES A STRING TO DISPLAY.  IF BIT DCOMFLG   ;
;         IS SET, THE STRING WILL BE SENT TO THE COMMAND PORT.  ;
;         IF  DCOMFLG IS CLEAR, THE STRING WILL BE DISPLAYED,   ;
;         STARTING AT THE CURRENT CURSOR POSITION.              ;
;         IF BIT DRAMFLG IS SET THE STRING COMES FROM RAM, IF   ;
;         CLEAR, FROM ROM.                                      ;
;         THE FIRST BYTE OF THE STRING IS THE NUMBER OF BYTES   ;
;         IN THE STRING, INCLUDING ITSELF.                      ;
;                 < DPTR - STRING ADDR WHEN STRING IS IN ROM    ;
;                 < DCOMFLG                                     ;
;                 < DRAMFLG                                     ;
;*****************************************************************
;
                DSTRING:
0794 300BFC             JNB     LCDBIT,DLBL2
0797 751100             MOV     DSPTR,#0            ;POINT TO STRING LENGTH BYTE
079A 1207AB             LCALL   DGETC               ;GET LENGTH BYTE
079D F510               MOV     DSLEN,A             ;STORE IT
                DLP2:
079F 1207AB             LCALL   DGETC               ;GET A CHAR
07A2 1207BA             LCALL   DSEND               ;WRITE THE CHAR TO DISPLAY
07A5 E511               MOV     A,DSPTR             ;SET UP STRING PTR TO DETECT
07A7 B510F5             CJNE    A,DSLEN,DLP2        ; WHEN LAST CHAR JUST SENT
```

```
07AA 22                    RET

;***********************************************************
;        DGETC GETS A CHARACTER TO DISPLAY                  ;
;        IF BIT DRAMFLG IS SET THE CHAR COMES FROM RAM,     ;
;        IF CLEAR, FROM ROM.                                ;
;                < DSPTR - STRING PTR                       ;
;                < DPTR - STRING ADDRESS                    ;
;                < DRAMFLG                                  ;
;***********************************************************
;
              DGETC:
07AB 305104           JNB     DRAMFLG,DLBL3   ;JUMP IF STRING IS IN ROM
07AE E0               MOVX    A,@DPTR         ;GET THE CHAR FROM RAM
07AF A3               INC     DPTR            ;POINT TO THE NEXT CHAR
07B0 8003             SJMP    DLBL4
              DLBL3:
07B2 E511             MOV     A,DSPTR         ;GET STRING POINTER
07B4 93               MOVC    A,@A+DPTR       ;FETCH THE BYTE FROM ROM
              DLBL4:
07B5 0511             INC     DSPTR           ;INC THE STRING POINTER

07B7 22               RET

;***********************************************************
;       DASCII -- ADJUSTS THE DIGIT IN ACC TO ITS ASCII     ;
;       EQUIVALENT AND THEN FLOWS INTO DSEND.               ;
;***********************************************************
;
              DASCII:
07B8 2430             ADD     A,#30H
;
;***********************************************************
;       DSEND WRITES A SINGLE CHAR TO THE DISPLAY DATA PORT. ;
;       IF  BIT DCOMFLG IS SET, DCSEND IS USED INSTEAD (WHEN ;
;       WRITING COMMAND STRINGS)                            ;
;                < ACC - CHAR TO SEND                       ;
;                < DCOMFLG                                  ;
;***********************************************************
;
              DSEND:
07BA 300BD6           JNB     LCDBIT,DLBL2
07BD 205011           JB      DCOMFLG,DCSEND  ;CHECK FOR 'SEND COMMAND' FLAG
07C0 F1E3             ACALL   DSTAT           ;WAIT UNTIL DISPLAY NOT BUSY
07C2 D291             SETB    DDAT            ;POINT TO DISPLAY DATA PORT
07C4 C082             PUSH    DPL
07C6 C083             PUSH    DPH
07C8 904000           MOV     DPTR,#LCDAD     ;SET LCD MEM LOCATION
07CB F0               MOVX    @DPTR,A         ;MOV TO LCD BUFFER
07CC D083             POP     DPH
07CE D082             POP     DPL

07D0 22               RET

;***********************************************************
;       DCSEND WRITES A SINGLE CHAR TO THE DISPLAY COMMAND  ;
;       PORT.                                               ;
;                < ACC - COMMAND BYTE TO SEND               ;
;***********************************************************
;
              DCSEND:
07D1 300BBF           JNB     LCDBIT,DLBL2
07D4 F1E3             ACALL   DSTAT           ;WAIT UNTIL DISPLAY NOT BUSY
07D6 C082             PUSH    DPL
07D8 C083             PUSH    DPH
07DA 904000           MOV     DPTR,#LCDAD     ;SET LCD ADDRESS POINTER
07DD F0               MOVX    @DPTR,A         ;MOVE TO LCD BUFFER
07DE D083             POP     DPH
07E0 D082             POP     DPL

07E2 22               RET

;***********************************************************
;       DSTAT - LOOPS UNTIL THE DISPLAY IS NOT BUSY EXITS   ;
;       WITH DISPLAY IN WRITE COMMAND CONFIGURATION, DATA   ;
;       PORT LATCHES ALL SET                                ;
;***********************************************************
;
              DSTAT:
07E3 C0E0             PUSH    ACC             ;SAVE ACC
07E5 D290             SETB    DREAD           ;SET DISPLAY FOR READ P1.0 R/W
07E7 C291             CLR     DDAT            ;SLCT DISP COMM PORT P1.1 R/S
              DLP3:
07E9 C082             PUSH    DPL
```

```
07EB C083              PUSH    DPH
07ED 904000            MOV     DPTR,#LCDAD       ;SET LCD ADDRESS POINTER
07F0 E0                MOVX    A,@DPTR           ;MOVE TO LCD BUFFER
07F1 D083              POP     DPH
07F3 D082              POP     DPL
07F5 20E7F1            JB      ACC.7,DLP3        ;LOOP IF STILL BUSY
07F8 C290              CLR     DREAD             ;SET DISPLAY FOR WRITE
07FA D0E0              POP     ACC               ;RESTORE ACC

07FC 22                RET

;****************************************************************
;          DCURSON - TURNS ON THE LCD CURSOR                     ;
;****************************************************************
;
                DCURSON:
07FD C0E0              PUSH    ACC
07FF 740F              MOV     A,#0FH
0801 1207D1            LCALL   DCSEND
0804 D0E0              POP     ACC
0806 22                RET

;****************************************************************
;          DCURSOFF - TURNS OFF THE LCD CURSOR                   ;
;****************************************************************
;
                DCURSOFF:
0807 C0E0              PUSH    ACC
0809 740C              MOV     A,#0CH
080B 1207D1            LCALL   DCSEND
080E D0E0              POP     ACC 0810 22                RET

;****************************************************************
;      DINIT INITIALIZE THE DISPLAY :-                           ;
;         8 BIT, 1/16 DUTY, 5X7 DOTS,DISPLAY ON, CURSOR OFF,     ;
;         CURSOR BLINK OFF, CLEAR DISPLAY, HOME CURSOR,          ;
;         CURSOR INCREMENT, NO DISPLAY SHIFT                     ;
;****************************************************************

DINIT:
0811 C290              CLR     DREAD
0813 C291              CLR     DDAT
0815 755006            MOV     LOOPCNT,#06H      ;# OF BYTES TO SEND
0818 901016            MOV     DPTR,#SDINIT      ;LCD INITIALIZAION STRING
081B 751500            MOV     TEMPPTR,#00H      ;INITIAL OFFSET IN BYTES

DINIT1:
081E E515              MOV     A,TEMPPTR         ;LOAD OFFSET
0820 93                MOVC    A,@A+DPTR         ;LOAD DATA FROM POINTER
0821 0515              INC     TEMPPTR           ;POINT TO NEXT
0823 1207D1            LCALL   DCSEND            ;SEND AS COMMAND BYTE
0826 D550F5            DJNZ    LOOPCNT,DINIT1    ;CONTINUE UNTIL ALL SENT
0829 C250              CLR     DCOMFLG           ;SET FLAG TO DATA BYTES 082B 22                RET

;****************************************************************
;          DELAY - RETURNS AFTER DELCNT * 25mS                   ;
;****************************************************************
;
                DELAY:                           ;SET TIMER TO 16-BITS
082C 758B00            MOV     TL1,#00
082F 758DEA            MOV     TH1,#234
0832 C28F              CLR     TF1
0834 D28E              SETB    TR1               ;ENABLE THE TIMER

DELAYLOOP:
0836 308FFD            JNB     TF1,DELAYLOOP     ;LOOP UNTIL TIMER OVERFLOWS
0839 C28F              CLR     TF1               ;CLEAR TIMER0 INTERRUPT
083B C28E              CLR     TR1               ;STOP TIMER0
083D D51BEC            DJNZ    DELCNT,DELAY
0840 22                RET

;****************************************************************
;          BEEP  DELAY - RETURNS                                 ;
;****************************************************************
;
                DELAY1:                          ;SET TIMER TO 16-BITS
0841 758DFF            MOV     TH1,#255
0844 758BE6            MOV     TL1,#230
0847 C28F              CLR     TF1
0849 D28E              SETB    TR1               ;ENABLE THE TIMER
```

```
                   DELAY1LOOP:
084B 308FFD            JNB      TF1,DELAY1LOOP    ;LOOP UNTIL TIMER OVERFLOWS
084E C28F              CLR      TF1               ;CLEAR TIMER0 INTERRUPT
0850 C28E              CLR      TR1               ;STOP TIMER0
0852 22                RET

;******************************************************************
;DELAYBLINK - RETURNS AFTER DELCNT.* 25mS
;             CHECKS BUTTONS EACH 25 MS AND RETURNS IF PRESSED
;******************************************************************
;
                   DELAYBLINK:                    ;SET TIMER TO 16-BITS
0853 758B00            MOV      TL1,#00           ;ZERO THE TIMER
0856 758DEA            MOV      TH1,#234
0859 C28F              CLR      TF1
085B D28E              SETB     TR1               ;ENABLE THE TIMER

DELAYLOOPBL:

085D 309510            JNB      PLUS,DLYBL1       ;'+' PRESSED STOP TIMER
0860 30960D            JNB      MINUS,DLYBL1      ;'-' PRESSED STOP TIMER
0863 30970A            JNB      SELECT,DLYBL1     ;'S' PRESSED STOP TIMER
0866 308FF4            JNB      TF1,DELAYLOOPBL   ;LOOP UNTIL TIMER OVERFLOWS
0869 C28F              CLR      TF1               ;CLEAR TIMER0 INTERRUPT
086B C28E              CLR      TR1               ;STOP TIMER0
086D D51BE3            DJNZ     DELCNT,DELAYBLINK

0870 C28E          DLYBL1: CLR   TR1              ;STOP TIMER0
0872 C28F              CLR      TF1               ;CLEAR TIMER0 INTERRUPT
0874 22                RET

;******************************************************************
;        CONTROLINIT - INITIALIZE COMPUTER CONTROLLED DEVICES     ;
;        TO A SAFE STATUS UPON POWERUP AND RESET.                 ;
;                                                                 ;
;******************************************************************

CONTROLINIT:
0875 752000            MOV      RELCONT,#00H      ;CLEAR RELAY CONTROL
0878 E520              MOV      A,RELCONT         ;LOAD CONTROL BYTE
087A 901000            MOV      DPTR,#LATCH       ;PNT TO LATCH CHIP
087D F0                MOVX     @DPTR,A           ;SEND SAFE SETTINGS
087E 22                RET

;**************
;DIVIDE BY TWO
;**************
                   DIVIDE:
087F E53D              MOV      A,FRQL            ;LOAD THE LOW BYTE
0881 13                RRC      A                 ;DIVIDE BY TWO WITH CARRY
0882 F53D              MOV      FRQL,A            ;SAVE VALUE
0884 E53C              MOV      A,FRQH            ;LOAD THE HIGH BYTE
0886 C3                CLR      C                 ;MAKE SURE CARRY IS CLEARED
0887 13                RRC      A                 ;ROTATE WITH CARRY
0888 F53C              MOV      FRQH,A            ;SAVE VALUE
088A 5006              JNC      SKIP
088C E53D              MOV      A,FRQL            ;IF CARRY TOOK PLACE THEN MODIFY LOW BYTE
088E 4480              ORL      A,#80H            ;FILL FAR LEFT BIT WITH A 1 DUE TO A CARRY
0890 F53D              MOV      FRQL,A

SKIP:
0892 22                RET
                   ;***********
                   ;COMPLEMENT
                   ;***********
                   COMPLEMENT:
0893 E53D              MOV      A,FRQL            ;GET LOW BYTE
0895 F4                CPL      A                 ;COMPLEMENT COUNTER
0896 F53D              MOV      FRQL,A            ;RESTORE VALUE
0898 E53C              MOV      A,FRQH            ;GET HIGH BYTE
089A F4                CPL      A                 ;COMPLEMENT
089B F53C              MOV      FRQH,A            ;RESTORE COUNTER
089D 22                RET

;******************************************************************
;        INITIALIZE ZEROCROSS INTERVAL AND INTERRUPT
;        NET POWER SUPPLY                         ;
;******************************************************************

CHARGER:
                   INITIAL:

089E C2A8              CLR         EX0            ;CLEAR ALL FLAGS
```

```
08A0 C28E              CLR      TR1
08A2 758911            MOV      TMOD,#11H
08A5 758D00            MOV      TH1,#00           ;CLEAR TIMERS
08A8 758B00            MOV      TL1,#00
              INIT0:
08AB 20B2FD            JB       POLAR,INIT0       ;FIND POSTIVE

INIT1:
08AE 30B2FD            JNB      POLAR,INIT1       ;FIND NEGITIVE

INIT2:                              ;WAIT FOR POSITIVE
08B1 20B2FD            JB       POLAR,INIT2       ;FIND POSITIVE
                                                  ;START TIMERS
08B4 D28E              SETB     TR1               ;TIME POSITIVE HALF OF WAVE

INIT3:
08B6 30B2FD            JNB      POLAR,INIT3       ;WAIT FOR NEGITIVE
08B9 C28E              CLR      TR1               ;STOP TIMER1
              INIT4:
08BB 20B2FD            JB       POLAR,INIT4       ;WAIT FOR A POSITIVE

08BE 858B3B            MOV      P2COUNTL,TL1      ;SAVE THE TIMERS
08C1 858D3A            MOV      P2COUNTH,TH1

08C4 C3                CLR      C
08C5 E53B              MOV      A,P2COUNTL
08C7 945A              SUBB     A,#90
08C9 F539              MOV      P1COUNTL,A
08CB 853A38            MOV      P1COUNTH,P2COUNTH
08CE 5002              JNC      INIT5
08D0 1538              DEC      P1COUNTH
              INIT5:                              ;CALCULATE POS INTERVALS
08D2 85383C            MOV      FRQH,P1COUNTH     ;LOAD DIVIDE WORK
08D5 85393D            MOV      FRQL,P1COUNTL
08D8 12087F            LCALL    DIVIDE
08DB 853D39            MOV      P1COUNTL,FRQL     ;SAVE 1/2 POS WAVE
08DE 853C38            MOV      P1COUNTH,FRQH
08E1 85383C            MOV      FRQH,P1COUNTH     ;LOAD WORK
08E4 85393D            MOV      FRQL,P1COUNTL
08E7 120893            LCALL    COMPLEMENT
08EA 853D39            MOV      P1COUNTL,FRQL
08ED 853C38            MOV      P1COUNTH,FRQH
08F0 85393B            MOV      P2COUNTL,P1COUNTL
08F3 85383A            MOV      P2COUNTH,P1COUNTH
              FINCYCLE:

08F6 C3                CLR      C
08F7 C259              CLR      VOLTBIT
08F9 C209              CLR      ZPOSBIT

08FB 753E27            MOV      TARGETSET,#39
08FE 753F2D            MOV      SAFECAP,#45
0901 7551FF            MOV      ZCOUNT1,#255
0904 755264            MOV      ZCOUNT2,#100

0907 758160            MOV      SP,#SPINT         ;INIT THE STACK POINTER
              FINEND:
090A 30B2FD            JNB      POLAR,FINEND      ;WAIT FOR NEGATIVE TO START
090D D2A8              SETB     EX0
090F D2AF              SETB     EA
              FINDTOP:

;
;****************************************************************
;     MAINLOOP FOREGROUND ROUTINE
;****************************************************************
;
              FOREGROUND:

0911 300913            JNB      ZPOSBIT,FGNEG     ;DO ONLY AFTER POS CHARGE
                       ;;LCALL  READADC
                       ;;JNZ    FGNEG             ;JUMP IF NEG ZERO
0914 30B210            JNB      POLAR,FGNEG
0917 12093C            LCALL    ADJPOS            ;COMPARE ADC TO TARGET
091A C209              CLR      ZPOSBIT           ;CLEAR ZERO CROSS BIT
091C 1209AF            LCALL    BATTCHRG1
091F 7551FF            MOV      ZCOUNT1,#255
0922 755264            MOV      ZCOUNT2,#100
0925 D2A8              SETB     EX0
              FGNEG:

FGTIMEOUT:
0927 1209A2            LCALL    BUTTONTEST        ;TEST MENU BUTTONS
```

```
092A D551E4              DJNZ     ZCOUNT1,FOREGROUND
092D 7551FF              MOV      ZCOUNT1,#255
0930 D552DE              DJNZ     ZCOUNT2,FOREGROUND

;******************
                ;ZERO CROSS TIMEOUT
                ;******************
0933 120AAA              LCALL    POWOFF
0936 758160              MOV      SP,#SPINT        ;INIT THE STACK POINTER
0939 0200EF              LJMP     MAIN3

;
                ;*****************************
                ;ADJUST TIMER INTERVAL
                ;TO CORRECT ADC VALUE TO TARGET
                ;*****************************
                ADJPOS:
093C 853B3D              MOV      FRQL,P2COUNTL
093F 853A3C              MOV      FRQH,P2COUNTH
0942 E55C                MOV      A,ADCVALUE2
0944 12094E              LCALL    ADJTIMER
0947 853D3B              MOV      P2COUNTL,FRQL
094A 853C3A              MOV      P2COUNTH,FRQH 094D 22                  RET

ADJTIMER:
094E C3                  CLR      C
094F E55C                MOV      A,ADCVALUE2
0951 953E                SUBB     A,TARGETSET
                ADJTIMER2:
0953 604C                JZ       ADJEND2          ;IF ZERO JUMP END
0955 5026                JNC      ADJMIN           ;JUMP IF ADC HIGH
0957 C3                  CLR      C
0958 94FD                SUBB     A,#0FDH          ;COMPARE TO 3
095A 5007                JNC      ADJFINE
095C C3                  CLR      C
095D E53D                MOV      A,FRQL           ;GROSS PLUS
095F 2408                ADD      A,#08H
0961 2168                AJMP     ADJ2

ADJFINE:                           ;FINE PLUS
0963 C3                  CLR      C
0964 E53D                MOV      A,FRQL
0966 2401                ADD      A,#01H

ADJ2:
0968 F53D                MOV      FRQL,A
096A 5035                JNC      ADJEND
096C C3                  CLR      C
096D E53C                MOV      A,FRQH
096F 2401                ADD      A,#01             ;INCREMENT
0971 F53C                MOV      FRQH,A
0973 502C                JNC      ADJEND            ;INTERVAL OVERFLOWS
0975 753CFF              MOV      FRQH,#0FFH        ;REPLACE HIGH VALUE FOR FRQH
0978 753DFF              MOV      FRQL,#0FFH        ;REPLACE HIGH VALUE FOR FRQL
097B 21A1                AJMP     ADJEND

ADJMIN:
097D C3                  CLR      C
097E 9403                SUBB     A,#03
0980 4006                JC       ADJMIN2
                ADJMIN5:
0982 E53D                MOV      A,FRQL
0984 9408                SUBB     A,#08H             ;GROSS MINUS
0986 218D                AJMP     ADJMIN3

ADJMIN2:                             ;FINE MINUS
0988 C3                  CLR      C
0989 E53D                MOV      A,FRQL
098B 9401                SUBB     A,#01H

ADJMIN3:
098D F53D                MOV      FRQL,A
098F 5010                JNC      ADJEND
0991 C3                  CLR      C
0992 E53C                MOV      A,FRQH
0994 9401                SUBB     A,#01              ;SUBTRACT ONE
0996 F53C                MOV      FRQH,A
```

```
0998 B4FF06            CJNE    A,#0FFH,ADJEND      .
099B 753C00            MOV     FRQH,#00            ;REPLACE;LOW VALUE FOR FRQH
099E 753D00            MOV     FRQL,#00            ;REPLACE VALUE FOR FRQL

ADJEND:

ADJEND2:
09A1 22                RET

;******************
                ;BUTTON MENU ROUTINE
                ;******************
                BUTTONTEST:
09A2 309201            JNB     MENU,BUTM           ;MENU
09A5 22                RET

BUTM:                              ;GROSS PLUS
09A6 120AAA            LCALL   POWOFF
09A9 758160            MOV     SP,#SPINT           ;INIT THE STACK POINTER
09AC 020068            LJMP    MAIN                ;GO TO RESTART PROGRAM

;*************
                ;LOAD CHARGE
                ;*************
                BATTCHRG1:
09AF D51BFD            DJNZ    DELCNT,BATTCHRG1
09B2 C0E0              PUSH    ACC
09B4 C082              PUSH    DPL
09B6 C083              PUSH    DPH
09B8 D207              SETB    BATCHRG
09BA 1209C9                    LCALL   LATCHCTL
09BD C207                      CLR     BATCHRG
09BF 1209C9                    LCALL   LATCHCTL
09C2 D083              POP     DPH
09C4 D082              POP     DPL
09C6 D0E0              POP     ACC
09C8 22                RET

;*************
                ;LATCH CONTROL
                ;*************
                LATCHCTL:
09C9 E520              MOV     A,RELCONT           ;SEND THE RELAY CONTROL BYTE
09CB 901000            MOV     DPTR,#LATCH
09CE F0                MOVX    @DPTR,A

09CF 00                NOP
09D0 00                NOP
09D1 00                NOP
09D2 00                NOP
09D3 00                NOP
09D4 00                NOP
09D5 00                NOP

09D6 22                RET

;****************************************************
                ;****************************************************
                ;       ZEROCROSS INTERRUPT SETS TIMER
                ;****************************************************
                ;****************************************************
                ZEROINT:
                ;
09D7 C0E0              PUSH    ACC
09D9 C082              PUSH    DPL
09DB C083              PUSH    DPH
09DD C2A8              CLR     EX0                 ;TURN OFF ZERO CROSS
09DF 85398B            MOV     TL1,P1COUNTL        ;SET TIMER1 FOR TOP OF SINE WAVE
09E2 85388D            MOV     TH1,P1COUNTH
09E5 C20A              CLR     TIMER1FLAG          ;FIRST TIMER1 INTERRUPT
09E7 C28F              CLR     TF1                 .
09E9 D2BB              SETB    PT1                 ;SET TIMER1 PRIORITY BIT
09EB D2AB              SETB    ET1                 ;SET TIMER1 INTERRUPT
09ED D28E              SETB    TR1                 ;TIMER1 GO
09EF D083              POP     DPH
09F1 D082              POP     DPL
09F3 D0E0              POP     ACC
```

```
09F5 D2AF              SETB    EA              ;ENABLE ALL INTERRUPTS
09F7 32                RETI

;************************
                ;TIMER 1 INTERRUPT ONE
                ;************************
                T1INTERRUPT:
09F8 C0E0              PUSH    ACC
09FA C082              PUSH    DPL
09FC C083              PUSH    DPH
09FE C2AB              CLR     ET1             ;CLEAR TIMER1 INTERRUPT
0A00 C28E              CLR     TR1             ;TIMER1 OFF
0A02 C28F              CLR     TF1             ;CLEAR TIMER1 OVERFLOW
0A04 200A21            JB      TIMER1FLAG,T1INT2 ;IF SECOND INTERRUPT
0A07 853B8B            MOV     TL1,P2COUNTL    ;SET TIMER1 SECOND INTERRUPT
0A0A 853A8D            MOV     TH1,P2COUNTH
0A0D D20A              SETB    TIMER1FLAG      ;SET FOR SECOND INTERRUPT
0A0F D2BA              SETB    PX1             ;SET TIMER1 PRIORITY BIT
0A11 D2AB              SETB    ET1             ;SET TIMER1 INTERUPT
0A13 D28E              SETB    TR1             ;TIMER1 ON
0A15 D2AF              SETB    EA              ;ENABLE ALL INTERRUPTS
0A17 120A94            LCALL   READADC
0A1A F55B              MOV     ADCVALUE1,A
0A1C 755C00            MOV     ADCVALUE2,#00
0A1F D083              POP     DPH
0A21 D082              POP     DPL
0A23 D0E0              POP     ACC
0A25 D2AF              SETB    EA
0A27 32                RETI

;********************
                ;TIMER 1 INTERRUPT TWO
                ;********************
                T1INT2:
0A28 D209              SETB    ZPOSBIT
0A2A 120A94            LCALL   READADC
0A2D F55C              MOV     ADCVALUE2,A     ;SAVE ADC READING
0A2F D083              POP     DPH
0A31 D082              POP     DPL
0A33 D0E0              POP     ACC
0A35 85838D            MOV     TH1,DPH         ;TEMP SAVE AREA
0A38 85828B            MOV     TL1,DPL
0A3B 900A4B            MOV     DPTR,#INTREAD   ;CHANGE RETURN TO COMMON READ
0A3E C082              PUSH    DPL
0A40 C083              PUSH    DPH
0A42 858D83            MOV     DPH,TH1
0A45 858B82            MOV     DPL,TL1
0A48 D2AF              SETB    EA
0A4A 32                RETI

;****************************************************************
                ;COMMON READ ADC, TEST SLOPE,AND TEST GOOD CAP
                ;
                ;THE SECOND TIMER INTERRUPTS MODIFY THE STACK TO RETURN
                ;TO INTREAD.  INTREAD WILL THEN RETURN TO THE FOREGROUND TASK
                ;INTERRUPTED BY THE TIMER.  THIS ALLOWS INTREAD TO BE INTERRUPTED BY
                ;ZERO CROSS.
                ;****************************************************************
                INTREAD:
0A4B C0E0              PUSH    ACC
0A4D C082              PUSH    DPL
0A4F C02C              PUSH    ,DPH
0A51 925A              MOV     WBIT,C
0A53 C259              CLR     VOLTBIT         ;CLEAR BAD VOLT BIT
0A55 E53E              MOV     A,TARGETSET
0A57 600C              JZ      INTNOSLOPE      ;IF TARGETSET ZERO
0A59 E55C              MOV     A,ADCVALUE2
0A5B 6008              JZ      INTNOSLOPE
0A5D B55B03            CJNE    A,ADCVALUE1,INT2 ;COMPARE TO FIRST READING
0A60 020A65            LJMP    INTNOSLOPE      ;IF THE SAME THEN BACK COUNTERS

INT2:
0A63 4005              JC      INTGOODVOLT     ;GREATER THAN, GOOD

INTNOSLOPE:
0A65 D259              SETB    VOLTBIT         ;SET SLOPE ERROR
0A67 020A80            LJMP    INTRESUME       ;RETURN TO FOREGROUND

INTGOODVOLT:
0A6A C259              CLR     VOLTBIT         ;CLEAR SLOPE ERROR
0A6C C3                CLR     C
0A6D 953F              SUBB    A,SAFECAP       ;CHECK SAFE CAP
0A6F 4005              JC      INTGOODCAP1
                                               ;FAILED SAFE CAP
```

```
0A71 D259                     SETB    VOLTBIT
0A73 020A80                   LJMP    INTRESUME       ;FAILED SAFE CAP

INTGOODCAP1:                          ;VOLTAGE AND SLOPE CORRECT
0A76 E55C                     MOV     A,ADCVALUE2
0A78 C3                       CLR     C
0A79 940A                     SUBB    A,#10
0A7B 4003                     JC      INTRESUME       ;IF LESS 10 DONT CHARGE
0A7D 120A89                   LCALL   CHGPOSCAP       ;POS VOLT CAP CHARGE

INTRESUME:

0A80 D083                     POP     DPH
0A82 D082                     POP     DPL
0A84 D0E0                     POP     ACC
0A86 A25A                     MOV     C,WBIT
0A88 22                       RET

;*****************
                ;CHARGE CAPACITORS
                ;*****************

CHGPOSCAP:
0A89 D206                     SETB    CAPCHRG         ;SET THE CAP BIT
0A8B 1209C9                   LCALL   LATCHCTL
0A8E C206                     CLR     CAPCHRG
0A90 1209C9                   LCALL   LATCHCTL
0A93 22                       RET

;************
                ;ADC READING
                ;************
                READADC:                              ;READ POSITIVE SINE WAVE
0A94 902000                   MOV     DPTR,#ADCAD
0A97 7404                     MOV     A,#VLINE
0A99 F0                       MOVX    @DPTR,A
                ADC1READY:                            ;WAIT
0A9A 3094FD                   JNB     CONVRDY,ADC1READY
0A9D E0                       MOVX    A,@DPTR
0A9E 22                       RET

READADC2:                             ;READ BATERY
0A9F 902000                   MOV     DPTR,#ADCAD
0AA2 7406                     MOV     A,#06H
0AA4 F0                       MOVX    @DPTR,A
                ADC2READY:                            ;WAIT
0AA5 3094FD                   JNB     CONVRDY,ADC2READY
0AA8 E0                       MOVX    A,@DPTR
0AA9 22                       RET

;****************************************************
                ;    POWER INTERRUPTS
                ;****************************************************
                POWOFF:
0AAA C2A8                     CLR     EX0
0AAC C2AF                     CLR     EA
0AAE 7400                     MOV     A,#00H           ;
0AB0 F520                     MOV     RELCONT,A        ;
0AB2 901000                   MOV     DPTR,#LATCH      ;SET ALL RELAYS TO OFF STATUS
0AB5 F0                       MOVX    @DPTR,A
0AB6 120718                   LCALL   BEEP
0AB9 22                       RET

MENURESET:
0ABA C2AF                     CLR     EA               ;CLEAR ALL INTERRUPTS TO RESET
0ABC 120AAA                   LCALL   POWOFF
0ABF 758160                   MOV     SP,#SPINT        ;INIT THE STACK POINTER
0AC2 020068                   LJMP    MAIN

;***************************CAP FAIL ROUTINE ****************

CAPFAIL:
0AC5 C208                     CLR     VOLTOK
0AC7 C2A8                     CLR     EX0
0AC9 22                       RET

;****************************
                ;HEATER VS ENGINE FACTOR * TEMP
                ;MIN 15  MAX 250
                ;****************************
```

```
                SIZEDECODE:
0ACA E54C           MOV    A,HEATFACTOR    ;HEATER VS ENGINE VALUE
0ACC 8543F0         MOV    B,LTIME         ;GET RAMP VALUE
0ACF A4             MUL    AB              ;MULTIPLY
0AD0 F543           MOV    LTIME,A
0AD2 30D205         JNB    OV,SIZE2        ;IF UNDER 16 BIT
0AD5 7543FA         MOV    LTIME,#250      ;MOVE MAX VALUE
0AD8 41EE           AJMP   SIZE4
                SIZE2:
0ADA C3             CLR    C
0ADB 94FA           SUBB   A,#250
0ADD 4005           JC     SIZE3
0ADF 7543FA         MOV    LTIME,#250      ;MAXIUM IS 250(NOT 255)
0AE2 41EE           AJMP   SIZE4
                SIZE3:
0AE4 C3             CLR    C
0AE5 E543           MOV    A,LTIME
0AE7 9408           SUBB   A,#08
0AE9 5003           JNC    SIZE4
0AEB 754308         MOV    LTIME,#08       ;MINIMUM 08 MINUTES
                SIZE4:
0AEE 22             RET                    ;LTIME IS IN MINUTES 0 TO 255

;****************************************************************
; CONTINOP - CONTINUOUS OPERATION, RAMPUP TO STARTING TEMPERATURE
; THEN CONTINUE TO MAINTAIN TEMPERATURE.
; USES STARTHOURS AND STARTMINUTES AS INCREMENTAL COUNTERS
;****************************************************************

CONTINOP:

RAMPUP:
0AEF 205832         JB     MAINTFLG,MAINT
0AF2 C3             CLR    C
0AF3 74CD           MOV    A,#DLN2+13
0AF5 1207D1         LCALL  DCSEND
0AF8 E553           MOV    A,MAINTMIN
0AFA 7003           JNZ    RAMPUP2
0AFC 854356         MOV    LEADT,LTIME     ;SAVE LEAD TIME
                RAMPUP2:
0AFF D253           SETB   COLNFLG
0B01 1206CE         LCALL  BYTETOVALUE
0B04 E556           MOV    A,LEADT         ;SAVE TEMPORARILY
0B06 1206CE         LCALL  BYTETOVALUE
0B09 E556           MOV    A,LEADT
0B0B C3             CLR    C
0B0C 9553           SUBB   A,MAINTMIN      ;IF MAINTMIN COUNT GREATER THAN
0B0E 5007           JNC    RAMPADD
0B10 755300         MOV    MAINTMIN,#00    ;CLEAR MAINTMIN
0B13 D258           SETB   MAINTFLG        ;SET MAINT FLAG
0B15 611D           AJMP   RAMPUPEND
                RAMPADD:
0B17 E553           MOV    A,MAINTMIN      ;ADD 1 TO MAINTMIN COUNT
0B19 2401           ADD    A,#01
0B1B F553           MOV    MAINTMIN,A
                RAMPUPEND:
0B1D 120C20         LCALL  HEATERON        ;TURN ON HEATERS
0B20 1209C9         LCALL  LATCHCTL
0B23 22             RET

;****************************************************************
;MAINTENANCE MODE ONCE RAMPUP OCCURS
;USES 1/10 OF THE LEAD TIME FOR THE NUMBER OF MINUTES IN A 30 MIN CYCLE
;TO BE TURNED ON
;****************************************************************

MAINT:
0B24 D258           SETB   MAINTFLG
0B26 E543           MOV    A,LTIME
0B28 75F005         MOV    B,#05
0B2B 84             DIV    AB
0B2C C3             CLR    C
0B2D F53C           MOV    FRQH,A          ;STORE IT
0B2F C3             CLR    C
0B30 E5F0           MOV    A,B
0B32 9405           SUBB   A,#05           ;TEST FOR ROUNDING
0B34 4002           JC     MAINT2
0B36 053C           INC    FRQH
                MAINT2:                    ;TEST FOR GREATER THAN 25
0B38 E53C           MOV    A,FRQH
0B3A C3             CLR    C
0B3B 9419           SUBB   A,#25
0B3D 4003           JC     MAINT22
```

```
        0B3F 753C19              MOV     FRQH,#25          ;MAX OF 25 MINUTES
                        MAINT22:
        0B42 E543              MOV     A,LTIME
        0B44 600A              JZ      MAINT3            ;ZERO LTIME
        0B46 E53C              MOV     A,FRQH
        0B48 C3                CLR     C
        0B49 940A              SUBB    A,#10
        0B4B 5003              JNC     MAINT3            ;MAINT TIME GREATER THAN 5
        0B4D 753C0A            MOV     FRQH,#10          ;MIN MAINT TIME
                        MAINT3:
        0B50 74CF              MOV     A,#DLN2+15
        0B52 1207D1            LCALL   DCSEND
        0B55 E553              MOV     A,MAINTMIN
        0B57 D254              SETB    SLSHFLG
        0B59 1206CE            LCALL   BYTETOVALUE
        0B5C C3                CLR     C
        0B5D 741E              MOV     A,#30
        0B5F 953C              SUBB    A,FRQH            ;30 - LTIME/5
        0B61 F53C              MOV     FRQH,A            ;SAVE TEMPORARILY
        0B63 E53C              MOV     A,FRQH
        0B65 1206CE            LCALL   BYTETOVALUE
        0B58 E53C              MOV     A,FRQH            ;RESTORE (30 - LTIME/10)
        0B6A C3                CLR     C
        0B6B B55304            CJNE    A,MAINTMIN,MAINTADD ;IF MAINTMIN > 30 - LTIME/10

MAINTHEAT:
        0B6E 120C20            LCALL   HEATERON          ;CYCLE HEATERS ON
        0B71 C3                CLR     C
                        MAINTADD:
        0B72 40FA              JC      MAINTHEAT         ;TURN ON HEATER
        0B74 0553              INC     MAINTMIN
        0B76 E553              MOV     A,MAINTMIN
        0B78 C3                CLR     C
        0B79 941E              SUBB    A,#30
        0B7B 4016              JC      MAINTEND
        0B7D 755300            MOV     MAINTMIN,#00      ;RESET MAINT CYCLE
        0B80 301E10            JNB     MODE,MAINTEND
        0B83 205B0D            JB      MANSTART,MAINTEND ;IF PUP
        0B86 054E              INC     STARTCNT          ;STARTUP MODE ONLY
        0B88 E54E              MOV     A,STARTCNT
        0B8A C3                CLR     C
        0B8B 9402              SUBB    A,#02             ;MAINT MODE FOR 2 CYCLES ONLY
        0B8D 4004              JC      MAINTEND
        0B8F C258              CLR     MAINTFLG          ;CLEAR MAINT FLAG
        0B91 C220              CLR     STARTCONT         ;CLEAR START CONT FLAG
                        MAINTEND:
        0B93 1209C9            LCALL   LATCHCTL
        0B96 22                RET
;*********************************************************************
; LOOK AT CURRENT TIME AND CHECK WHEN TO START.                      ;
;
;*********************************************************************

STARTUPTST:
        0B97 74CC              MOV     A,#DLN2+12        ;DISPLAY LEAD TIME (MINUTES)
        0B99 1207D1            LCALL   DCSEND
        0B9C E543              MOV     A,LTIME
        0B9E 1206CE            LCALL   BYTETOVALUE
        0BA1 7420              MOV     A,#20H
        0BA3 1207BA            LCALL   DSEND
        0BA6 E533              MOV     A,STHOURS         ;FIND 24 HOUR STARTUP TIME
        0BA8 B40C0B            CJNE    A,#12,START0      :12AM = 0   12PM = 12
        0BAB 20E704            JB      ACC.7,START00
        0BAE 7400              MOV     A,#00
        0BB0 61BD              AJMP    START1
                        START00:
        0BB2 740C              MOV     A,#12
        0BB4 61BD              AJMP    START1
                        START0:
        0BB6 30E704            JNB     ACC.7,START1
        0BB9 C2E7              CLR     ACC.7
        0BBB 240C              ADD     A,#12
                        START1:
        0BBD F53C              MOV     FRQH,A            ;SAVE 24 HOUR STARTUP
        0BBF E531              MOV     A,HOURS           ;FIND 24 HOUR CURR TIME
        0BC1 B40C0B            CJNE    A,#12,START10
        0BC4 20E704            JB      ACC.7,START100
        0BC7 2400              ADD     A,#00
        0BC9 61D6              AJMP    START2
                        START100:
        0BCB 740C              MOV     A,#12
        0BCD 61D6              AJMP    START2
                        START10:
        0BCF 30E704            JNB     ACC.7,START2
        0BD2 C2E7              CLR     ACC.7
```

```
0BD4 240C              ADD     A,#12
              START2:
0BD6 F548              MOV     LCDHOURS,A          ;SAVE 24 CURRENT TIME
0BD8 C3                CLR     C
0BD9 E534              MOV     A,STMINUTES         ;FIND NUMBER OF MINUTES BETWEEN
0BDB 9532              SUBB    A,MINUTES           ;STARTUP TIME AND CURRENT TIME
0BDD F549              MOV     LCDMINS,A           ;SAVE NUMBER OF MINUTES (TEMP)
0BDF 500B              JNC     START3              ;IF NO CARRY
0BE1 243C              ADD     A,#60
0BE3 F549              MOV     LCDMINS,A
0BE5 E53C              MOV     A,FRQH
0BE7 C3                CLR     C
0BE8 9401              SUBB    A,#1                ;SUB 1 FORM 24 STARTUP HOURS
0BEA F53C              MOV     FRQH,A
              START3:
0BEC E53C              MOV     A,FRQH              ;24 HOUR STARTUP HOURS
0BEE C3                CLR     C
0BEF 9548              SUBB    A,LCDHOURS          ;SUB 24 STARTUP - 24 CURR HOUR
0BF1 5002              JNC     START4
0BF3 2418              ADD     A,#24
              START4:
0BF5 75F03C            MOV     B,#60
0BF8 A4                MUL     AB                  ;FIND NUMBER OF MINUTES
0BF9 20D223            JB      OV,STARTEND         ;GREATER THAN MAX LEAD TIME
0BFC C3                CLR     C
0BFD 2549              ADD     A,LCDMINS           ;TOTAL MINS STARTUP - CURR
0BFF 401E              JC      STARTEND            ;GREATER THAN MAX LEAD TIME
0C01 F549              MOV     LCDMINS,A           ;SAVE STARTUP - CURR
0C03 1206CE            LCALL   BYTETOVALUE         ;DISPLAY DIFF
0C06 C3                CLR     C
0C07 E549              MOV     A,LCDMINS
0C09 B54302            CJNE    A,LTIME,START5      ;COMPARE MINS TO LTIME
0C0C 8112              AJMP    STARTGOOD
              START5:
0C0E 4002              JC      STARTGOOD
0C10 811F              AJMP    STARTEND
              STARTGOOD:
0C12 755300            MOV     MAINTMIN,#00        ;CLEAR MAINT COUNT
0C15 754E00            MOV     STARTCNT,#00        :CLEAR START CNT
0C18 D220              SETB    STARTCONT           ;SET STARTUP CONTINOP MODE
0C1A 851457            MOV     TRIGTEMP,DIGITEMP   ;SAVE TEMP TABLE POINTER
0C1D C258              CLR     MAINTFLG
              STARTEND:
0C1F 22                RET

;****************************************************************
;                      TURN HEATERS ON
;****************************************************************

HEATERON:
0C20 0554              INC     POWERMIN
0C22 E554              MOV     A,POWERMIN
0C24 B43C05            CJNE    A,#60,HEAT2         ;MINUTES NOT = 60
0C27 0555              INC     POWERHR
0C29 755400            MOV     POWERMIN,#00
              HEAT2:
0C2C E54A              MOV     A,CYCTYPE           ;MOVE CYCLE TYPE
0C2E B4010A            CJNE    A,#01H,CTYPE2       ;IF NOT TYPE 1
0C31 D200              SETB    HEATER1
0C33 120C92            LCALL   HEATAUXON
0C36 120C8C            LCALL   HEATER2ON
0C39 8197              AJMP    HEATEND

0C3B B40220     CTYPE2: CJNE   A,#02H,CTYPE3       ;IF NOT TYPE 2
0C3E E54B              MOV     A,CYCCNT
0C40 B40009             CJNE   A,#00H,CT21         ;NOT CNT 0
0C43 054B              INC     CYCCNT              ;CYCLE COUNT TO 1
0C45 D200              SETB    HEATER1
0C47 120C8C            LCALL   HEATER2ON
0C4A 8197              AJMP    HEATEND
0C4C B40105     CT21:  CJNE    A,#01H,CT22         ;NOT CNT 1
0C4F 054B              INC     CYCCNT              ;CYCLE COUNT TO 2
0C51 201D3E            JB      AUXONBIT,HEATAUXON  IF NO AUX THEN GOTO CT22
0C54 754B00     CT22:  MOV     CYCCNT,#00          ;CYCLE COUNT TO 0
0C57 D200              SETB    HEATER1
0C59 120C8C            LCALL   HEATER2ON
0C5C 8197              AJMP    HEATEND

0C5E E54B       CTYPE3: MOV    A,CYCCNT
0C60 B40007             CJNE   A,#00H,CT31         ;NOT CNT 0
0C63 054B              INC     CYCCNT              ;CYCLE COUNT TO 1
0C65 120C8C            LCALL   HEATER2ON
0C68 8197              AJMP    HEATEND
```

```
                CT31:
0C6A B40106             CJNE    A,#01H,CT32             ;NOT CNT 1
0C6D 054B               INC     CYCCNT                  ;CYCLE COUNT TO 2
0C6F D200               SETB    HEATER1
0C71 8197               AJMP    HEATEND
                CT32:
0C73 B40207             CJNE    A,#02H,CT33             ;NOT CNT 2
0C76 054B               INC     CYCCNT                  ;CYCLE COUNT TO 3
0C78 120C8C             LCALL   HEATER2ON
0C7B 8197               AJMP    HEATEND
                CT33:
0C7D B40305             CJNE    A,#03H,CT34             ;NOT CNT 3
0C80 054B               INC     CYCCNT                  ;CYCLE COUNT TO 4
0C82 201D0D             JB      AUXONBIT,HEATAUXON      ;IF NO ZUX THEN GOTO CT34
                CT34:
0C85 754B00             MOV     CYCCNT,#00H             ;CYCLE COUNT TO 0
0C88 D200               SETB    HEATER1
0C8A 8197               AJMP    HEATEND

HEATER2ON:
0C8C 301F08             JNB     HTRNUM,HEATEND
0C8F D201               SETB    HEATER2
0C91 22                 RET

HEATAUXON:
0C92 301D02             JNB     AUXONBIT,HEATEND
0C95 D202               SETB    AUX1

HEATEND:
0C97 22                 RET

;*****************************************************************
;       TEMPDISPLAY USES A/D CONVERTER IN1 TO MONITOR CURRENT;
;       TEMPERATURE FROM ALASKA QUARTZ SYSTEMS THERMOCOUPLE  ;
;           P/N 1C1501                                        ;
;*****************************************************************

TEMPGET:
0C98 7403               MOV     A,#TEMPPROBE    ;SPECIFY TEMP PROBE (IN1)
0C9A 902000             MOV     DPTR,#ADCAD     ;LOAD A/D CONVERTERS' ADDRESS
0C9D F0                 MOVX    @DPTR,A         ;REQUEST CONVERSION
0C9E 74C5               MOV     A,#DLN2+5       ;CURSOR POSITION
0CA0 1207D1             LCALL   DCSEND          ;POSITION CURSOR

TEMPCNV:
0CA3 3094FD             JNB     CONVRDY,TEMPCNV ;WAIT FOR E.O.C.
0CA6 E0                 MOVX    A,@DPTR         ;LOAD DIGITAL VALUE
0CA7 120CB0             LCALL   TEMPFIND
0CAA 7404               MOV     A,#4            ;OFFSET TO LTIME BYTE IN $
0CAC 93                 MOVC    A,@A+DPTR       ;LOAD LEAD TIME
0CAD F543               MOV     LTIME,A         ;STORE FOR DISPLAYING
0CAF 22                 RET
                TEMPFIND:
0CB0 F514               MOV     DIGITEMP,A      ;STORE IN RAM
0CB2 7515FF             MOV     TEMPPTR,#0FFH   ;ZERO THE OFFSET INTO TABLE

TEMPNEXT:
0CB5 9011B4             MOV     DPTR,#TEMPTABLE ;POINT TO TEMP LOOK-UP TABLE
0CB8 0515               INC     TEMPPTR         ;NEXT ENTRY
0CBA E515               MOV     A,TEMPPTR
0CBC 75F006             MOV     B,#06           ;TABLE ENTRY SIZE
0CBF A4                 MUL     AB
0CC0 C3                 CLR     C               ;ADD LOW TABLE ENTRY ADDRESS
0CC1 2582               ADD     A,DPL
0CC3 F582               MOV     DPL,A
0CC5 E583               MOV     A,DPH           ;ADD WITH CARRY HIGH ADDRESS
0CC7 5001               JNC     TEMPT2
0CC9 04                 INC     A
                TEMPT2:
0CCA 25F0               ADD     A,B
0CCC F583               MOV     DPH,A
0CCE 7400               MOV     A,#00
0CD0 93                 MOVC    A,@A+DPTR       ;LOAD TEMP TABLE VALUE
0CD1 C3                 CLR     C               ;
0CD2 9514               SUBB    A,DIGITEMP      ;(TABLE TEMP) - (CURR TEMP)
0CD4 6002               JZ      TEMPFOUND
0CD6 50DD               JNC     TEMPNEXT        ;NEXT ENTRY

TEMPFOUND:
0CD8 C3                 CLR     C
0CD9 A3                 INC     DPTR            ;MOVE PTR TO # OF CHARS
0CDA C083               PUSH    DPH             ;STORE CURRENT DATA PTR
0CDC C082               PUSH    DPL             ;
```

```
0CDE C250              CLR     DCOMFLG          ;DATA NOT COMMANDS
0CE0 120794            LCALL   DSTRING          ;SEND TEMPERATURE TO LCD
0CE3 74DF              MOV     A,#0DFH          ;SEND DEG MARK
0CE5 1207D1            LCALL   DCSEND
0CE8 120807            LCALL   DCURSOFF         ;TURN OFF CURSOR
0CEB E514              MOV     A,DIGITEMP
0CED C3                CLR     C
0CEE 9558              SUBB    A,LOWTEMP
0CF0 4003              JC      TEMPF2
0CF2 851458            MOV     LOWTEMP,DIGITEMP ;SAVE LOWEST TEMP
                TEMPF2:
0CF5 D082              POP     DPL              ;RESTORE DPTR
0CF7 D083              POP     DPH              ;
0CF9 22                RET

;****************************************************************
;       GROUND FAULT DETECTION
;       THIS MODULE WILL DETECT POLARITY OF LINE IN AND DISPLAY
;       THE CONDITION IF THE LINE
;****************************************************************

GRNDTEST:

GRNDMENU:

0CFA 7400              MOV     A,#00H           ;CLEAR THE STATUS BYTE
0CFC F522              MOV     GFSTATUS,A
0CFE 902000            MOV     DPTR,#ADCAD      ;POINT TO ADC
0D01 120D13            LCALL   LINE0            ;Preform A/D 8-channel test
0D04 120D28            LCALL   LINE1            ;CHECK EACH LINE
0D07 120D3D            LCALL   LINE2
0D0A E522              MOV     A,GFSTATUS
0D0C 753515            MOV     OFFSET,#15H      ;START WITH THIS OFFSET = 21
0D0F 120D6C            LCALL   SHOWMSG
0D12 22                RET
;****************************************************************
;The voltage converter loops through the analog line and runs;
;a conversion. AtoD address starts at 2000H
;Looks for voltage on any of the three lines. Program will
;time out if no voltage is found.
;****************************************************************
;
                LINE0:

0D13 120D52            LCALL   SETTIMER
                TIMRUN0:

0D16 7400              MOV     A,#00H           ;LINE CONTROL VALUE FOR INPUT
0D18 120D5E            LCALL   SCANVOLT
0D1B 120D64            LCALL   CHECKVAL
0D1E 308FF5            JNB     TF1,TIMRUN0      ;WAIT FOR TIMER TO RUN OUT
0D21 C28E              CLR     TR1              ;TURN OFF TIMER
0D23 4002              JC      LEAVE0           ;CHECK TO SEE IF TIME OUT OCCURED OR A HIGH
                                                ;WAS FOUND
0D25 D210              SETB    COMBIT0          ;SET BIT IF HIGH WAS FOUND
                LEAVE0:
0D27 22                RET
;****************************************************************

LINE1:
0D28 120D52            LCALL   SETTIMER

TIMRUN1:
0D2B 7401              MOV     A,#01H           ;LINE CONTROL VALUE FOR INPUT 1
0D2D 120D5E            LCALL   SCANVOLT
0D30 120D64            LCALL   CHECKVAL
0D33 308FF5            JNB     TF1,TIMRUN1
0D36 C28E              CLR     TR1
0D38 4002              JC      LEAVE1
0D3A D211              SETB    COMBIT1

LEAVE1:
0D3C 22                RET

;****************************************************************
                LINE2:
0D3D 120D52            LCALL   SETTIMER
                TIMRUN2:

0D40 7402              MOV     A,#02H           ;LINE CONTROL VALUE FOR INPUT 2
0D42 120D5E            LCALL   SCANVOLT
0D45 120D64            LCALL   CHECKVAL
0D48 308FF5            JNB     TF1,TIMRUN2
0D4B C28E              CLR     TR1
0D4D 4002              JC      LEAVE2
```

```
0D4F D212              SETB    COMBIT2

LEAVE2:
0D51 22                RET

;*****************************************************************

SETTIMER:
0D52 C28F              CLR     TF1               ;CLEAR TIMER1 OVERFLOW BIT
0D54 C3                CLR     C                 ;CLEAR THE CARRY BIT
0D55 758BFB            MOV     TL1,#0FBH         ;SET TIMER COUNTERS
0D58 758DF0            MOV     TH1,#0F0H
0D5B D28E              SETB    TR1               ;TURN ON TIMER
0D5D 22         RET

;*****************************************************************

SCANVOLT:
0D5E F0                MOVX    @DPTR,A           ;SEND BIT OUT

GOBACK:
0D5F 3094FD            JNB     CONVRDY,GOBACK    ;WAIT FOR CONVERSION
0D62 E0                MOVX    A,@DPTR           ;GET THE ADC CONVERSION
0D63 22                RET

;*****************************************************************

CHECKVAL:
0D64 B49900            CJNE    A,#VOLTVAL,NOTEQ  ;SEE IF IT EQUALS A VALUE

NOTEQ:
0D67 4002              JC      LESSTHAN
0D69 D28F              SETB    TF1               ;FOUND HIGH, NOW EXIT

LESSTHAN:
0D6B 22                RET

SHOWMSG:                          ;DISPLAY ERROR MESSAGE
0D6C E522              MOV     A,GFSTATUS
0D6E 7005              JNZ     CONTINUE          ;CHECK TO SEE IF STATUS IS A ZERO
0D70 9011A5            MOV     DPTR,#MSG0        ;THEN SEND MESSAGE ZERO
0D73 A1AA              AJMP    FOUNDIT

CONTINUE:
0D75 C3                CLR     C
0D76 9401              SUBB    A,#01             ;SEE IF ITS A 1
0D78 7008              JNZ     CONTINUE1
0D7A 90114B            MOV     DPTR,#UNKWN
0D7D 752206            MOV     GFSTATUS,#06
0D80 A1AA              AJMP    FOUNDIT

CONTINUE1:
0D82 E522              MOV     A,GFSTATUS        ;RESTORE STATUS
0D84 C3                CLR     C
0D85 9407              SUBB    A,#07
0D87 7005              JNZ     CONTINUE3
0D89 90114B            MOV     DPTR,#UNKWN
0D8C A1AA              AJMP    FOUNDIT

CONTINUE3:
0D8E 90115A            MOV     DPTR,#MSG6        ;MOVE THE POINTER TO THE THE 1ST MESSAGE
0D91 7406              MOV     A,#06H            ;START WITH THIS COUNTER

NEXT:
0D93 B52202            CJNE    A,GFSTATUS,GONEXT
0D96 A1AA              AJMP    FOUNDIT

GONEXT:
0D98 14                DEC     A                 ;DECREMENT THE STARTING COUNTER
0D99 C0E0              PUSH    ACC               ;SAVE VALUE
0D9B C3                CLR     C
0D9C E582              MOV     A,DPL
0D9E 2535              ADD     A,OFFSET          ;ADD OFFSET TO THE LOW BYTE OF DATA PTR
0DA0 F582              MOV     DPL,A             ;RESTORE THE LOW BYTE
0DA2 5002              JNC     NCARRY            ;IF A CARRY IS REQUIRED THEN
0DA4 0583              INC     DPH               ;INCREMENT THE HIGH BYTE

NCARRY:
0DA6 D0E0              POP     ACC               ;GET THE VALUE BACK
0DA8 A193              AJMP    NEXT              ;GO BACK TO THE BEGINNING

FOUNDIT:
```

```
ODAA 12076D              LCALL   DLINE1
ODAD 22                  RET
;****************************************************************
;                WATCHDOG SET MODULE
;        SETS UP A 6 MIN WATCHDOG TIMER FOR MENU CONTROL. IF
;        THE MENU IS NOT UPDATED THEN AFTER SIX MINUTES THE
;        TERMINATE THE MENU ROUTINE AND GO INTO THE RUN ROUTINE
;****************************************************************
              WATCHER:
ODAE 75373C              MOV     WATCHOUT,#60
ODB1 7536FA              MOV     WATCHIN,#250
ODB4 758C00              MOV     TH0,#00H
ODB7 758A00              MOV     TL0,#00H
ODBA C2A8                CLR     EX0
ODBC C2AA                CLR     EX1
ODBE D28C                SETB    TR0
ODC0 D2A9                SETB    ET0
ODC2 D2AF                SETB    EA
ODC4 22                  RET
;****************************************************************
;                INTERRUPT ONE MODULE                            ;
;****************************************************************

SERVICE1:
ODC5 7400                MOV     A,#00H              ;
ODC7 F520                MOV     RELCONT,A           ;
ODC9 901000              MOV     DPTR,#LATCH         ;SET ALL RELAY TO OFF STATUS
ODCC F0                  MOVX    @DPTR,A             ;
ODCD 758160              MOV     SP,#SPINT           ;REINITIALIZE STACK POINTER

PRELIM:
ODD0 901044              MOV     DPTR,#LEADST
ODD3 201E03              JB      MODE,PRINTIT
ODD6 901052              MOV     DPTR,#CONTOPST

PRINTIT:
ODD9 120774              LCALL   DLINE2

PRELIM1:
ODDC 120CFA              LCALL   GRNDTEST
ODDF 120644              LCALL   READCLOCK           ;SEND UPDATED TIME TO LCD
ODE2 748E                MOV     A,#DLN1+14
ODE4 1204BD              LCALL   LCDTIME
ODE7 754300              MOV     LTIME,#00
ODEA 120C98              LCALL   TEMPGET             ;GET TEMPERATURE
ODED 120ACA              LCALL   SIZEDECODE          ;CALC LEAD TIME
ODF0 209203              JB      MENU,NOTRESET5
ODF3 020ABA              LJMP    MENURESET

NOTRESET5:
ODF6 E522                MOV     A,GFSTATUS          ;CHECK GROUND STATUS
ODF8 C3                  CLR     C                   ;THIS IS LINE OK
ODF9 9406                SUBB    A,#06
ODFB 70DF                JNZ     PRELIM1             ;JUMP BACK IF GROUND PROBLEM
                                                     ;FALL THROUGH IF GOOD
ODFD 120A9F              LCALL   READADC2            ;READ BATTERY VOLTAGE
OE00 F55A                MOV     BATVOLTH,A          ;SAVE
OE02 301E08              JNB     MODE,CONTOPERATE
OE05 202005              JB      STARTCONT,CONTOPERATE ;STARTUP CONTIN MODE
OE08 120B97              LCALL   STARTUPTST          ;UPDATE HEATER CONTROL
OE0B C110                AJMP    NOTCONT

CONTOPERATE:
OE0D 120AEF              LCALL   CONTINOP

NOTCONT:
OE10 758160              MOV     SP,#SPINT
OE13 90093E              MOV     DPTR,#CHARGER       ;LOAD ADD. OF TOP OF SUBR.
OE16 C082                PUSH    DPL
OE18 C083                PUSH    DPH
                         ;;;SETB  EA
OE1A 32                  RETI                        ;GO BACK TO BATTERY CHARGING
;
;****************************************************************
;                WATCHDOG TIMER
;****************************************************************
;
              WATCHDOG:
OE1B C2AF                CLR     EA
OE1D C28D                CLR     TF0
OE1F C28C                CLR     TR0
OE21 758A00              MOV     TL0,#00H            ;SET LOW TIMER FOR MAX
OE24 758C00              MOV     TH0,#00H            ;SET HIGH TIMER FOR MAX COUNT
```

```
0E27 D53617        DJNZ    WATCHIN,NOBARK   ;
0E2A 7536FA        MOV     WATCHIN,#250
0E2D D53711        DJNZ    WATCHOUT,NOBARK ;TIME LEFT
0E30 753600        MOV     WATCHIN,#00H     ;CLEAR INNER LOOP COUNTER
0E33 758160        MOV     SP,#SPINT
0E36 9000E8        MOV     DPTR,#MAIN2      ;
0E39 C082          PUSH    DPL              ;LOAD ADDRESS OF END OF MENU
0E3B C083          PUSH    DPH              ;
0E3D 75A800        MOV     IE,#00H          ;CLEAR INTERRUPTS
0E40 32            RETI

NOBARK:
0E41 D28C          SETB    TR0
0E43 D2AF          SETB    EA
0E45 32            RETI

;***************************************************************;
             ;                   STRING STORAGE                              ;
             ;***************************************************************;

1010               ORG     1010H
1010 00 00 00  CLOCKSTR:    DB    00H,00H,00H,134,00H,0FFH;  CLK STRING
-1013 86 00 FF
1016 38 0F 38  SDINIT:      DB    38H,0FH,38H,01H,38H,06H ; DISPLAY INIT
-1019 01 38 06

101C 0C 41 52  INTRO1M:     DB    12,'ARCTIC PACK'
-101F 43 54 49 43 20 50 41 43 4B
1028 15 4C 4C  INTRO2M:     DB    21,'LLR TECHNOLOGIES V1.'
-102B 52 20 54 45 43 48 4E 4F 4C 4F
-1035 47 49 45 53 20 56 31 2E
103D 02 20     CLEARLN:     DB    2,' '
103F 04 20 54  TEMPLABEL:   DB    4,' TMP'
-1042 4D 50
1044 0E 20 54  LEADST:      DB    14,' TMP     ST>'
-1047 4D 50 20 20 20 20 20 20 53 54
-1051 3E
1052 0D 20 54  CONTOPST:    DB    13,' TMP    CNT'
-1055 4D 50 20 20 20 20 20 43 4E 54
105F 0D 4D 41  MANUALMSG:   DB    13,'MANUAL START'
-1062 4E 55 41 4C 20 53 54 41 52 54
106C 0D 4D 41  MANUALMSG2:  DB    13,'MANUAL TEST '
-106F 4E 55 41 4C 20 54 45 53 54 20
             ;---------------------------------------------------------------
             ;                   CLOCKSET MESSAGES
             ;---------------------------------------------------------------
1079 0E 43 55  CLKSET1:     DB    14,'CURRENT TIME>'
-107C 52 52 45 4E 54 20 54 49 4D 45
-1086 3E
1087 13 43 48  CLKSET2:     DB    19,'CHANGE  +,- SET S'
-108A 41 4E 47 45 20 20 2B 2C 2D 20
-1094 20 53 45 54 20 53
             ;---------------------------------------------------------------
             ;                   ENGINE SIZE SETTINGS MESSAGES
             ;---------------------------------------------------------------
109A 0C 45 4E  ENG1A:       DB    12,'ENGINE SIZE'
-109D 47 49 4E 45 20 53 49 5A 45
10A6 53 4D 4C  SIZER:       DB    'SML','MED','LRG','XLG'
-10A9 4D 45 44 4C 52 47 58 4C 47
10B2 13 43 48  SIZER2:      DB    19,'CHANGE  +,- SET S'
-10B5 41 4E 47 45 20 20 2B 2C 2D 20
-10BF 20 53 45 54 20 53
             ;
             ;---------------------------------------------------------------
             ;                   HEATERS  MESSAGES
             ;---------------------------------------------------------------
10C5 0B 4F 4E  ONEHEATER:   DB    11,'ONE HEATER'
-10C8 45 20 48 45 41 54 45 52
10D0 0C 54 57  TWOHEATER:   DB    12,'TWO HEATERS'
-10D3 4F 20 48 45 41 54 45 52 53
10DC 0D 48 45  HEAT1A:      DB    13,'HEATER1 SIZE'
-10DF 41 54 45 52 31 20 53 49 5A 45
10E9 0D 48 45  HEAT2A:      DB    13,'HEATER2 SIZE'
-10EC 41 54 45 52 32 20 53 49 5A 45
             ;---------------------------------------------------------------
             ;                   AUX MESSAGES
             ;---------------------------------------------------------------
10F6 0E 4E 4F  AUXOFFMSG:   DB    14,'NO AUX HEATER'
-10F9 20 41 55 58 20 48 45 41 54 45
-1103 52
1104 0B 41 55  AUXONMSG:    DB    11,'AUX HEATER'
-1107 58 20 48 45 41 54 45 52
110F 09 41 55  AUXSIZEMSG:  DB    9,'AUX SIZE'
-1112 58 20 53 49 5A 45
```

```
                        ;----------------------------------------------------------------
                        ;               OPERATION TYPE MESSAGES
                        ;----------------------------------------------------------------
 1118 10 43 4F          CONTIN:         DB      16,'CONTINUOUS MODE'
-111B 4E 54 49 4E 55 4F 55 53 20 4D
-1125 4F 44 45
 1128 0B 53 54          TIMEMODE:       DB      11,'START TIME'
-112B 41 52 54 20 54 49 4D 45
 1133 0E 53 54          STMSET1:        DB      14,'START   TIME>'
-1136 41 52 54 20 20 20 54 49 4D 45
-1140 3E

;----------------------------------------------------------------
                        ;               RUN TIME MESSAGES
                        ;----------------------------------------------------------------
 1141 0A 41 44          ADCMSG:         DB      10,'ADC FAULT'
-1144 43 20 46 41 55 4C 54
                        ;----------------------------------------------------------------;
                        ;               GROUND FAULT MESSAGES (MUST BE LENGTH 15)
                        ;----------------------------------------------------------------
 114B 0F 20 55          UNKWN:          DB      15,' UNKNOWN CON. '
-114E 4E 4B 4E 4F 57 4E 20 43 4F 4E
-1158 2E 20
 115A 0F 20 41          MSG6:           DB      15,' AC GOOD       '
-115D 43 20 47 4F 4F 44 20 20 20 20
-1167 20 20
 1169 0F 20 48          MSG5:           DB      15,' HOT/GRND REV '
-116C 4F 54 2F 47 52 4E 44 20 52 45
-1176 56 20
 1178 0F 20 4F          MSG4:           DB      15,' OPEN NEUTRAL '
-117B 50 45 4E 20 4E 45 55 54 52 41
-1185 4C 20
 1187 0F 20 48          MSG3:           DB      15,' HOT/NEUT. REV'
-118A 4F 54 2F 4E 45 55 54 2E 20 52
-1194 45 56
 1196 0F 20 4F          MSG2:           DB      15,' OPEN GROUND  '
-1199 50 45 4E 20 47 52 4F 55 4E 44
-11A3 20 20
 11A5 0F 20 4F          MSG0:           DB      15,' OPEN HOT     '
-11A8 50 45 4E 20 48 4F 54 20 20 20
-11B2 20 20

;----------------------------------------------------------------;
                        ;               TEMPERATURE PROBE LOOK-UP TABLE                  ;
                        ;               LEAD TIME IS HEATER FACTOR * TEMP FACTOR         ;
                        ;----------------------------------------------------------------;
 11B4 F4 04 2D          TEMPTABLE:      DB      244,4,'-40',20
-11B7 34 30 14
 11BA F2 04 2D                          DB      242,4,'-38',20
-11BD 33 38 14
 11C0 F0 04 2D                          DB      240,4,'-35',19
-11C3 33 35 13
 11C6 EE 04 2D                          DB      238,4,'-32',18
-11C9 33 32 12
 11CC EC 04 2D                          DB      236,4,'-30',18
-11CF 33 30 12
 11D2 EA 04 2D                          DB      234,4,'-27',17
-11D5 32 37 11
 11D8 E8 04 2D                          DB      232,4,'-25',16
-11DB 32 35 10
 11DE E6 04 2D                          DB      230,4;'-22',16
-11E1 32 32 10
 11E4 E4 04 2D                          DB      228,4,'-20',15
-11E7 32 30 0F
 11EA E2 04 2D                          DB      226,4,'-18',15
-11ED 31 38 0F
 11F0 E0 04 2D                          DB      224,4,'-16',14
-11F3 31 36 0E
 11F6 DE 04 2D                          DB      222,4,'-14',14
-11F9 31 34 0E
 11FC DC 04 2D                          DB      220,4,'-11',13
-11FF 31 31 0D
 1202 DA 04 2D                          DB      218,4,'- 9',12
-1205 20 39 0C
 1208 D8 04 2D                          DB      216,4,'- 7',12
-120B 20 37 0C
 120E D6 04 2D                          DB      214,4,'- 5',11
-1211 20 35 0B
 1214 D4 04 2D                          DB      212,4,'- 3',11
-1217 20 33 0B
 121A D2 04 2D                          DB      210,4,'- 2',11
-121D 20 32 0B
 1220 D0 04 20                          DB      208,4,' 0',10
-1223 20 30 0A
 1226 CE 04 20                          DB      206,4,' 2',10
```

```
-1229 20 32 0A
 122C CC 04 20          DB      204,4,'  3',9
-122F 20 33 09
 1232 CA 04 20          DB      202,4,'  5',9
-1235 20 35 09
 1238 C8 04 20          DB      200,4,'  7',8
-123B 20 37 08
 123E C6 04 20          DB      198,4,'  8',8
-1241 20 38 08
 1244 C4 04 20          DB      196,4,'  9',8
-1247 20 39 08
 124A C2 04 20          DB      194,4,' 10',8
-124D 31 30 08
 1250 C0 04 20          DB      192,4,' 11',7
-1253 31 31 07
 1256 BE 04 20          DB      190,4,' 12',7
-1259 31 32 07
 125C BC 04 20          DB      188,4,' 13',7
-125F 31 33 07
 1262 BA 04 20          DB      186,4,' 14',7
-1265 31 34 07
 1268 B8 04 20          DB      184,4,' 15',6
-126B 31 35 06
 126E B6 04 20          DB      182,4,' 16',6
-1271 31 36 06
 1274 B4 04 20          DB      180,4,' 17',6
-1277 31 37 06
 127A B2 04 20          DB      178,4,' 18',6
-127D 31 38 06
 1280 B0 04 20          DB      176,4,' 19',5
-1283 31 39 05
 1286 AE 04 20          DB      174,4,' 20',5
-1289 32 30 05
 128C AC 04 20          DB      172,4,' 21',5
-128F 32 31 05
 1292 AA 04 20          DB      170,4,' 22',5
-1295 32 32 05
 1298 A8 04 20          DB      168,4,' 23',4
-129B 32 33 04
 129E A6 04 20          DB      166,4,' 24',4
-12A1 32 34 04
 12A4 A4 04 20          DB      164,4,' 25',4
-12A7 32 35 04
 12AA A2 04 20          DB      162,4,' 27',3
-12AD 32 37 03
 12B0 A0 04 20          DB      160,4,' 28',3
-12B3 32 38 03
 12B6 9E 04 20          DB      158,4,' 29',3
-12B9 32 39 03
 12BC 9A 04 20          DB      154,4,' 31',2
-12BF 33 31 02
 12C2 98 04 20          DB      152,4,' 32',2
-12C5 33 32 02
 12C8 96 04 20          DB      150,4,' 33',2
-12CB 33 33 02
 12CE 92 04 20          DB      146,4,' 35',1
-12D1 33 35 01
 12D4 8E 04 20          DB      142,4,' 37',1
-12D7 33 37 01
 12DA 8A 04 20          DB      138,4,' 39',1
-12DD 33 39 01
 12E0 86 04 20          DB      134,4,' 41',0
-12E3 34 31 00
 12E6 82 04 20          DB      130,4,' 44',0
-12E9 34 34 00
 12EC 7E 04 20          DB      126,4,' 46',0
-12EF 34 36 00
 12F2 7A 04 20          DB      122,4,' 48',0
-12F5 34 38 00
 12F8 76 04 20          DB      118,4,' 50',0
-12FB 35 30 00
 12FE 72 04 20          DB      114,4,' 53',0
-1301 35 33 00
 1304 6E 04 20          DB      110,4,' 55',0
-1307 35 35 00
 130A 6A 04 20          DB      106,4,' 57',0
-130D 35 37 00
 1310 66 04 20          DB      102,4,' 60',0
-1313 36 30 00
 1316 62 04 20          DB      98,4,' 63',0
-1319 36 33 00
 131C 5E 04 20          DB      94,4,' 65',0
-131F 36 35 00
 1322 5A 04 20          DB      90,4,' 68',0
```

```
-1325 36 38 00
 1328 56 04 20              DB       86,4,' 71',0
-132B 37 31 00
 132E 52 04 20              DB       82,4,' 73',0
-1331 37 33 00
 1334 4E 04 20              DB       78,4,' 76',0
-1337 37 36 00
 133A 4A 04 20              DB       74,4,' 79',0
-133D 37 39 00
 1340 46 04 20              DB       70,4,' 82',0
-1343 38 32 00
 1346 42 04 20              DB       66,4,' 85',0
-1349 38 35 00
 134C 3E 04 20              DB       62,4,' 88',0
-134F 38 38 00
 1352 3A 04 20              DB       58,4,' 92',0
-1355 39 32 00
 1358 00 04 48              DB       0,4,'HOT',0
-135B 4F 54 00

;*******************************************
              ;     HEATER VS ENGINE TABLE
              ;     HEATR SMALL MED LARGE X-LARGE ACROSS
              ;     ENGINE SMALL MED LARGE X-LARGE DOWN
              ;*******************************************
                            MULTIPLIER:
 135E 09 06 05              DB       09,06,05,03
-1361 03
 1362 0B 08 06              DB       11,08,06,04
-1365 04
 1366 0F 0A 07              DB       15,10,07,05
-1369 05
 136A 18 0E 0C              DB       24,14,12,07
-136D 07

0000          END

;%T   Symbol Name           Type Value

ACHOUR. . . . . . . . . . . . . I 005D
ACMINUTE. . . . . . . . . . . . I 005E
ADC1READY . . . . . . . . . . . L 0A9A
ADC2READY . . . . . . . . . . . L 0AA5
ADCAD . . . . . . . . . . . . . I 2000
ADCMSG. . . . . . . . . . . . . L 1141
ADCONT. . . . . . . . . . . . . I 001A
ADCVALUE1 . . . . . . . . . . . I 005B
ADCVALUE2 . . . . . . . . . . . I 005C
ADJ2. . . . . . . . . . . . . . L 0968
ADJEND. . . . . . . . . . . . . L 09A1
ADJEND2 . . . . . . . . . . . . L 09A1
ADJFINE . . . . . . . . . . . . L 0963
ADJMIN. . . . . . . . . . . . . L 097D
ADJMIN2 . . . . . . . . . . . . L 0988
ADJMIN3 . . . . . . . . . . . . L 098D
ADJMIN5 . . . . . . . . . . . . L 0982
ADJPOS. . . . . . . . . . . . . L 093C
ADJTIMER. . . . . . . . . . . . L 094E
ADJTIMER2 . . . . . . . . . . . L 0953
AMPM1 . . . . . . . . . . . . . L 04E6
AMPMFLG . . . . . . . . . . . . B 0057
AMTOPM. . . . . . . . . . . . . L 060C
AUX1. . . . . . . . . . . . . . B 0002
AUXMENU . . . . . . . . . . . . L 02D8
AUXOFF. . . . . . . . . . . . . L 02DD
AUXOFF2 . . . . . . . . . . . . L 02EC
AUXOFFMSG . . . . . . . . . . . L 10F6
AUXOFFX . . . . . . . . . . . . L 02E0
AUXON . . . . . . . . . . . . . L 02FD
AUXON2. . . . . . . . . . . . . L 030C
AUXONBIT. . . . . . . . . . . . B 001D
AUXONMSG. . . . . . . . . . . . L 1104
AUXONX. . . . . . . . . . . . . L 0300
AUXSIZEMSG. . . . . . . . . . . L 110F
BATCHRG . . . . . . . . . . . . B 0007
BATTCHRG1 . . . . . . . . . . . L 09AF
BATVOLTH. . . . . . . . . . . . I 005A
BATVOLTL. . . . . . . . . . . . I 0059
BEEP. . . . . . . . . . . . . . L 0718
BEEPBEEP. . . . . . . . . . . . L 0736
BEEPBUTTON. . . . . . . . . . . L 072C
BEEPER. . . . . . . . . . . . . B 0093
BEEPX . . . . . . . . . . . . . L 070D
```

```
BITCOUNT. . . . . . . . . . . . . I 0013
BP2A. . . . . . . . . . . . . . . L 071D
BP3 . . . . . . . . . . . . . . . L 0729
BUTM. . . . . . . . . . . . . . . L 09A6
BUTTONTEST. . . . . . . . . . . . L 09A2
BYTE10. . . . . . . . . . . . . . L 06DD
BYTE100 . . . . . . . . . . . . . L 06DA
BYTETOVALUE . . . . . . . . . . . L 06CE
CAPCHRG . . . . . . . . . . . . . B 0006
CAPFAIL . . . . . . . . . . . . . L 0AC5
CHANGEEND . . . . . . . . . . . . L 0549
CHARGER . . . . . . . . . . . . . L 089E
CHCKSEL . . . . . . . . . . . . . L 04B9
CHECKVAL. . . . . . . . . . . . . L 0D64
CHGPOSCAP . . . . . . . . . . . . L 0A89
CHOCE . . . . . . . . . . . . . . L 048A
CHRGSTAT. . . . . . . . . . . . . B 0056
CLEAR . . . . . . . . . . . . . . U 0000
CLEARLN . . . . . . . . . . . . . L 103D
CLKHOURS. . . . . . . . . . . . . I 8001
CLKINIT0. . . . . . . . . . . . . L 069A
CLKINIT1. . . . . . . . . . . . . L 06A1
CLKINIT2. . . . . . . . . . . . . L 06BA
CLKINT. . . . . . . . . . . . . . B 00B3
CLKMINS . . . . . . . . . . . . . I 8002
CLKSECS . . . . . . . . . . . . . I 8003
CLKSET1 . . . . . . . . . . . . . L 1079
CLKSET2 . . . . . . . . . . . . . L 1087
CLOCK . . . . . . . . . . . . . . I 8000
CLOCKAMPM . . . . . . . . . . . . L 04D8
CLOCKINIT . . . . . . . . . . . . L 067E
CLOCKLED. . . . . . . . . . . . . B 0094
CLOCKSET. . . . . . . . . . . . . L 04EA
CLOCKSTR. . . . . . . . . . . . . L 1010
CLRLATCH. . . . . . . . . . . . . I 0000
COLNFLG . . . . . . . . . . . . . B 0053
COLON . . . . . . . . . . . . . . I 000A
COMBIT0 . . . . . . . . . . . . . B 0010
COMBIT1 . . . . . . . . . . . . . B 0011
COMBIT2 . . . . . . . . . . . . . B 0012
COMGRND . . . . . . . . . . . . . I 0000
COMMAND . . . . . . . . . . . . . I 8011
COMPLEMENT. . . . . . . . . . . . L 0893
CONTIN. . . . . . . . . . . . . . L 1118
CONTINOP. . . . . . . . . . . . . L 0AEF
CONTINUE. . . . . . . . . . . . . L 0D75
CONTINUE1 . . . . . . . . . . . . L 0D82
CONTINUE3 . . . . . . . . . . . . L 0D8E
CONTOPERATE . . . . . . . . . . . L 0E0D
CONTOPST. . . . . . . . . . . . . L 1052
CONTROLINIT . . . . . . . . . . . L 0875
CONVRDY . . . . . . . . . . . . . B 0094
COUNT . . . . . . . . . . . . . . I 001C
CT21. . . . . . . . . . . . . . . L 0C4C
CT22. . . . . . . . . . . . . . . L 0C54
CT31. . . . . . . . . . . . . . . L 0C6A
CT32. . . . . . . . . . . . . . . L 0C73
CT33. . . . . . . . . . . . . . . L 0C7D
CT34. . . . . . . . . . . . . . . L 0C85
CTYPE2. . . . . . . . . . . . . . L 0C3B
CTYPE3. . . . . . . . . . . . . . L 0C5E
CYC1. . . . . . . . . . . . . . . L 03FE
CYC2. . . . . . . . . . . . . . . L 0408
CYC3. . . . . . . . . . . . . . . L 0412
CYCCNT. . . . . . . . . . . . . . I 004B
CYCEND. . . . . . . . . . . . . . L 03F3
CYCSIZE . . . . . . . . . . . . . L 03F4
CYCTYPE . . . . . . . . . . . . . I 004A
DASCII. . . . . . . . . . . . . . L 07B8
DCOMFLG . . . . . . . . . . . . . B 0050
DCSEND. . . . . . . . . . . . . . L 07D1
DCURSOFF. . . . . . . . . . . . . L 0807
DCURSON . . . . . . . . . . . . . L 07FD
DDAT. . . . . . . . . . . . . . . B 0091
DELAY . . . . . . . . . . . . . . L 082C
DELAY1. . . . . . . . . . . . . . L 0841
DELAY1LOOP. . . . . . . . . . . . L 084B
DELAYBLINK. . . . . . . . . . . . L 0853
DELAYLOOP . . . . . . . . . . . . L 0836
DELAYLOOPBL . . . . . . . . . . . L 085D
DELCNT. . . . . . . . . . . . . . I 001B
DGETC . . . . . . . . . . . . . . L 07AB
DIGITEMP. . . . . . . . . . . . . I 0014
DINIT . . . . . . . . . . . . . . L 0811
```

```
DINIT1. . . . . . . . . . . . . . L 081E
DIVIDE. . . . . . . . . . . . . . L 087F
DLBL1 . . . . . . . . . . . . . . L 0779
DLBL2 . . . . . . . . . . . . . . L 0793
DLBL3 . . . . . . . . . . . . . . L 07B2
DLBL4 . . . . . . . . . . . . . . L 07B5
DLINE1. . . . . . . . . . . . . . L 076D
DLINE2. . . . . . . . . . . . . . L 0774
DLN1. . . . . . . . . . . . . . . I 0080
DLN2. . . . . . . . . . . . . . . I 00C0
DLP1. . . . . . . . . . . . . . . L 078D
DLP2. . . . . . . . . . . . . . . L 079F
DLP3. . . . . . . . . . . . . . . L 07E9
DLYBL1. . . . . . . . . . . . . . L 0870
DRAMFLG . . . . . . . . . . . . . B 0051
DREAD . . . . . . . . . . . . . . B 0090
DSEND . . . . . . . . . . . . . . L 07BA
DSLEN . . . . . . . . . . . . . . I 0010
DSPC. . . . . . . . . . . . . . . I 0012
DSPTR . . . . . . . . . . . . . . I 0011
DSTAT . . . . . . . . . . . . . . L 07E3
DSTRING . . . . . . . . . . . . . L 0794
DWIDTH. . . . . . . . . . . . . . I 0014
ENG1A . . . . . . . . . . . . . . L 109A
ENGINE. . . . . . . . . . . . . . L 041F
ENGINESIZE. . . . . . . . . . . . L 021E
FCYCTST1. . . . . . . . . . . . . L 03B6
FCYCTST2. . . . . . . . . . . . . L 03D4
FCYCTYPE. . . . . . . . . . . . . L 03A6
FGNEG . . . . . . . . . . . . . . L 0927
FGTIMEOUT . . . . . . . . . . . . L 0927
FHEATFACTOR . . . . . . . . . . . L 0419
FINCYCLE. . . . . . . . . . . . . L 08F6
FINDTOP . . . . . . . . . . . . . L 0911
FINEND. . . . . . . . . . . . . . L 090A
FOREGROUND. . . . . . . . . . . . L 0911
FOUNDIT . . . . . . . . . . . . . L 0DAA
FRQH. . . . . . . . . . . . . . . I 003C
FRQL. . . . . . . . . . . . . . . I 003D
FTYPE1. . . . . . . . . . . . . . L 03DB
FTYPE2. . . . . . . . . . . . . . L 03E3
FTYPE3. . . . . . . . . . . . . . L 03EB
GPSTATUS. . . . . . . . . . . . . I 0022
GOBACK. . . . . . . . . . . . . . L 0D5F
GONEXT. . . . . . . . . . . . . . L 0D98
GRNDMENU. . . . . . . . . . . . . L 0CFA
GRNDTEST. . . . . . . . . . . . . L 0CFA
HEAT1A. . . . . . . . . . . . . . L 10DC
HEAT2 . . . . . . . . . . . . . . L 0C2C
HEAT2A. . . . . . . . . . . . . . L 10E9
HEATAUXON . . . . . . . . . . . . L 0C92
HEATEND . . . . . . . . . . . . . L 0C97
HEATER1 . . . . . . . . . . . . . B 0000
HEATER2 . . . . . . . . . . . . . B 0001
HEATER2ON . . . . . . . . . . . . L 0C8C
HEATERON. . . . . . . . . . . . . L 0C20
HEATERONE . . . . . . . . . . . . L 028D
HEATERTWO . . . . . . . . . . . . L 02AF
HEATFACTOR. . . . . . . . . . . . I 004C
HONE. . . . . . . . . . . . . . . L 0241
HONE2 . . . . . . . . . . . . . . L 0250
HONEX . . . . . . . . . . . . . . L 0244
HOTCOM. . . . . . . . . . . . . . I 0002
HOTGRND . . . . . . . . . . . . . I 0001
HOURS . . . . . . . . . . . . . . I 0031
HRMASK. . . . . . . . . . . . . . I 000F
HTRNUM. . . . . . . . . . . . . . B 001F
HTWO. . . . . . . . . . . . . . . L 0261
HTWO2 . . . . . . . . . . . . . . L 0270
HTWOX . . . . . . . . . . . . . . L 0264
HUNDS . . . . . . . . . . . . . . I 0030
IF. . . . . . . . . . . . . . . . U 0000
INIT0 . . . . . . . . . . . . . . L 08AB
INIT1 . . . . . . . . . . . . . . L 08AE
INIT2 . . . . . . . . . . . . . . L 08B1
INIT3 . . . . . . . . . . . . . . L 08B6
INIT4 . . . . . . . . . . . . . . L 08BB
INIT5 . . . . . . . . . . . . . . L 08D2
INITIAL . . . . . . . . . . . . . L 089E
INT2. . . . . . . . . . . . . . . L 0A63
INTGOODCAP1 . . . . . . . . . . . L 0A76
INTGOODVOLT . . . . . . . . . . . L 0A6A
INTNOSLOPE. . . . . . . . . . . . L 0A65
INTREAD . . . . . . . . . . . . . L 0A4B
```

```
INTRESUME . . . . . . . . . . . . L 0A80
INTRO . . . . . . . . . . . . . . L 020B
INTRO1M . . . . . . . . . . . . . L 101C
INTRO2M . . . . . . . . . . . . . L 1028
LATCH . . . . . . . . . . . . . . I 1000
LATCHCTL. . . . . . . . . . . . . L 09C9
LCDAD . . . . . . . . . . . . . . I 4000
LCDBIT. . . . . . . . . . . . . . B 000B
LCDHOURS. . . . . . . . . . . . . I 0048
LCDMINS . . . . . . . . . . . . . I 0049
LCDTIME . . . . . . . . . . . . . L 04BD
LEADST. . . . . . . . . . . . . . L 1044
LEADT . . . . . . . . . . . . . . I 0056
LEAVE0. . . . . . . . . . . . . . L 0D27
LEAVE1. . . . . . . . . . . . . . L 0D3C
LEAVE2. . . . . . . . . . . . . . L 0D51
LESSTHAN. . . . . . . . . . . . . L 0D6B
LINE0 . . . . . . . . . . . . . . L 0D13
LINE1 . . . . . . . . . . . . . . L 0D28
LINE2 . . . . . . . . . . . . . . L 0D3D
LOOPCNT . . . . . . . . . . . . . I 0050
LOWTEMP . . . . . . . . . . . . . I 0058
LTIME . . . . . . . . . . . . . . I 0043
LTIMEHRS. . . . . . . . . . . . . I 0044
LTIMEMN . . . . . . . . . . . . . I 0045
LVALID4 . . . . . . . . . . . . . L 06EB
LVALID5 . . . . . . . . . . . . . L 06FB
LVALID6 . . . . . . . . . . . . . L 0703
LVALID7 . . . . . . . . . . . . . L 0706
MAIN. . . . . . . . . . . . . . . L 0068
MAIN1 . . . . . . . . . . . . . . L 00C5
MAIN2 . . . . . . . . . . . . . . L 00E8
MAIN3 . . . . . . . . . . . . . . L 00EF
MAINT . . . . . . . . . . . . . . L 0B24
MAINT2. . . . . . . . . . . . . . L 0B38
MAINT22 . . . . . . . . . . . . . L 0B42
MAINT3. . . . . . . . . . . . . . L 0B50
MAINTADD. . . . . . . . . . . . . L 0B72
MAINTEND. . . . . . . . . . . . . L 0B93
MAINTFLG. . . . . . . . . . . . . B 0058
MAINTHEAT . . . . . . . . . . . . L 0B6E
MAINTMIN. . . . . . . . . . . . . I 0053
MANSTART. . . . . . . . . . . . . B 005B
MANUALMSG . . . . . . . . . . . . L 105F
MANUALMSG2. . . . . . . . . . . . L 106C
MENU. . . . . . . . . . . . . . . B 0092
MENU4 . . . . . . . . . . . . . . L 0102
MENU5 . . . . . . . . . . . . . . L 0148
MENULOOP. . . . . . . . . . . . . L 01EA
MENURESET . . . . . . . . . . . . L 0ABA
MENUX . . . . . . . . . . . . . . L 014B
MENUX2. . . . . . . . . . . . . . L 0168
MENUX3. . . . . . . . . . . . . . L 0191
MENUX4. . . . . . . . . . . . . . L 01A3
MENUX5. . . . . . . . . . . . . . L 01B8
MENUX6. . . . . . . . . . . . . . L 01BA
MENUXM. . . . . . . . . . . . . . L 01B5
MINUP . . . . . . . . . . . . . . L 05E5
MINUS . . . . . . . . . . . . . . B 0096
MINUTES . . . . . . . . . . . . . I 0032
MODE. . . . . . . . . . . . . . . B 001E
MSG0. . . . . . . . . . . . . . . L 11A5
MSG2. . . . . . . . . . . . . . . L 1196
MSG3. . . . . . . . . . . . . . . L 1187
MSG4. . . . . . . . . . . . . . . L 1178
MSG5. . . . . . . . . . . . . . . L 1169
MSG6. . . . . . . . . . . . . . . L 115A
MULTIPLIER. . . . . . . . . . . . L 135E
NCARRY. . . . . . . . . . . . . . L 0DA6
NEXT. . . . . . . . . . . . . . . L 0D93
NEXTCHAR. . . . . . . . . . . . . L 0471
NEXTCHOCE . . . . . . . . . . . . L 0460
NOBARK. . . . . . . . . . . . . . L 0E41
NOINDEX . . . . . . . . . . . . . L 0431
NOTCONT . . . . . . . . . . . . . L 0E10
NOTEQ . . . . . . . . . . . . . . L 0D67
NOTOV . . . . . . . . . . . . . . L 0453
NOTRESET5 . . . . . . . . . . . . L 0DF6
NOTSIXTY. . . . . . . . . . . . . L 05D3
NOTWO . . . . . . . . . . . . . . L 02D7
NUMBER. . . . . . . . . . . . . . U 0000
OFFSET. . . . . . . . . . . . . . I 0035
ONEHEATER . . . . . . . . . . . . L 10C5
ONEORTWO. . . . . . . . . . . . . L 023C
```

```
P1COUNTH. . . . . . . . . . . . . . I 0038
P1COUNTL. . . . . . . . . . . . . . I 0039
P2COUNTH. . . . . . . . . . . . . . I 003A
P2COUNTL. . . . . . . . . . . . . . I 003B
PLUS. . . . . . . . . . . . . . . . B 0095
PM. . . . . . . . . . . . . . . . . L 04E4
PNT . . . . . . . . . . . . . . . . U 0000
POLAR . . . . . . . . . . . . . . . B 00B2
POWERHR . . . . . . . . . . . . . . I 0055
POWERMIN. . . . . . . . . . . . . . I 0054
POWOFF. . . . . . . . . . . . . . . L 0AAA
PRELIM. . . . . . . . . . . . . . . L 0DD0
PRELIM1 . . . . . . . . . . . . . . L 0DDC
PRINTIT . . . . . . . . . . . . . . L 0DD9
RAMPADD . . . . . . . . . . . . . . L 0B17
RAMPUP. . . . . . . . . . . . . . . L 0AEF
RAMPUP2 . . . . . . . . . . . . . . L 0AFF
RAMPUPEND . . . . . . . . . . . . . L 0B1D
RCONT . . . . . . . . . . . . . . . L 0357
RCONT2. . . . . . . . . . . . . . . L 0366
RCONTX. . . . . . . . . . . . . . . L 035A
READADC . . . . . . . . . . . . . . L 0A94
READADC2. . . . . . . . . . . . . . L 0A9F
READCLOCK . . . . . . . . . . . . . L 0644
RELCONT . . . . . . . . . . . . . . I 0020
RSTART. . . . . . . . . . . . . . . L 0377
RSTART2 . . . . . . . . . . . . . . L 0386
RSTARTX . . . . . . . . . . . . . . L 037A
RUNOPTION . . . . . . . . . . . . . L 0352
SAFECAP . . . . . . . . . . . . . . I 003F
SCANVOLT. . . . . . . . . . . . . . L 0D5E
SDINIT. . . . . . . . . . . . . . . L 1016
SELECT. . . . . . . . . . . . . . . B 0097
SERVICE1. . . . . . . . . . . . . . L 0DC5
SETAUXOFF . . . . . . . . . . . . . L 031D
SETAUXON. . . . . . . . . . . . . . L 0323
SETMODE1. . . . . . . . . . . . . . L 0397
SETMODE2. . . . . . . . . . . . . . L 039D
SETNUM1 . . . . . . . . . . . . . . L 0281
SETNUM2 . . . . . . . . . . . . . . L 0287
SETTIMER. . . . . . . . . . . . . . L 0D52
SHOWMSG . . . . . . . . . . . . . . L 0D6C
SIZE2 . . . . . . . . . . . . . . . L 0ADA
SIZE3 . . . . . . . . . . . . . . . L 0AE4
SIZE4 . . . . . . . . . . . . . . . L 0AEE
SIZECONT. . . . . . . . . . . . . . I 004D
SIZEDECODE. . . . . . . . . . . . . L 0ACA
SIZEMINUS . . . . . . . . . . . . . L 04AA
SIZEPLUS. . . . . . . . . . . . . . L 049B
SIZER . . . . . . . . . . . . . . . L 10A6
SIZER2. . . . . . . . . . . . . . . L 10B2
SIZESELECT. . . . . . . . . . . . . L 0456
SKIP. . . . . . . . . . . . . . . . L 0892
SLASH . . . . . . . . . . . . . . . I FFFF
SLSHFLG . . . . . . . . . . . . . . B 0054
SPACE . . . . . . . . . . . . . . . I FFF0
SPACFLG . . . . . . . . . . . . . . B 0052
SPINT . . . . . . . . . . . . . . . I 0060
SSAMEND . . . . . . . . . . . . . . L 061A
SSAMPM. . . . . . . . . . . . . . . L 05F0
SSBLINK1. . . . . . . . . . . . . . L 0587
SSBLINK2. . . . . . . . . . . . . . L 0599
SSHOUR. . . . . . . . . . . . . . . L 050C
SSHOUREND . . . . . . . . . . . . . L 0528
SSLCDTIME . . . . . . . . . . . . . L 056F
SSLCDTIME2. . . . . . . . . . . . . L 057B
SSMINEND. . . . . . . . . . . . . . L 05EC
SSMINUSH. . . . . . . . . . . . . . L 0550
SSMINUSH2 . . . . . . . . . . . . . L 055C
SSMINUSH3 . . . . . . . . . . . . . L 0561
SSMINUSH4 . . . . . . . . . . . . . L 0568
SSMINUSM. . . . . . . . . . . . . . L 05DA
SSMINUTE. . . . . . . . . . . . . . L 05AB
SSPLUSH . . . . . . . . . . . . . . L 052C
SSPLUSH2. . . . . . . . . . . . . . L 0538
SSPLUSH3. . . . . . . . . . . . . . L 053D
SSPLUSH4. . . . . . . . . . . . . . L 0544
SSPLUSM . . . . . . . . . . . . . . L 05C7
START0. . . . . . . . . . . . . . . L 0BB6
START00 . . . . . . . . . . . . . . L 0BB2
START1. . . . . . . . . . . . . . . L 0BBD
START10 . . . . . . . . . . . . . . L 0BCF
START100. . . . . . . . . . . . . . L 0BCB
START2. . . . . . . . . . . . . . . L 0BD6
```

```
STARTS3. . . . . . . . . . . . . . . L 0BEC
START4. . . . . . . . . . . . . . . L 0BF5
START5. . . . . . . . . . . . . . . L 0C0E
STARTCNT. . . . . . . . . . . . . I 004E
STARTCONT . . . . . . . . . . . . B 0020
STARTDEVICE . . . . . . . . . . . L 061E
STARTEND. . . . . . . . . . . . . L 0C1F
STARTGOOD . . . . . . . . . . . . L 0C12
STARTUP . . . . . . . . . . . . . I 00FF
STARTUPTST. . . . . . . . . . . . L 0B97
STATUS. . . . . . . . . . . . . . I 8010
STHOURS . . . . . . . . . . . . . I 0033
STIMESET. . . . . . . . . . . . . L 061F
STMINUTES . . . . . . . . . . . . I 0034
STMSET1 . . . . . . . . . . . . . L 1133
T1INT2. . . . . . . . . . . . . . L 0A28
T1INTERRUPT . . . . . . . . . . . L 09F8
TARGETSET . . . . . . . . . . . . I 003E
TDPH. . . . . . . . . . . . . . . I 0017
TDPL. . . . . . . . . . . . . . . I 0016
TEMPCNV . . . . . . . . . . . . . L 0CA3
TEMPF2. . . . . . . . . . . . . . L 0CF5
TEMPFIND. . . . . . . . . . . . . L 0CB0
TEMPFOUND . . . . . . . . . . . . L 0CD8
TEMPGET . . . . . . . . . . . . . L 0C98
TEMPLABEL . . . . . . . . . . . . L 103F
TEMPNEXT. . . . . . . . . . . . . L 0CB5
TEMPPROBE . . . . . . . . . . . . I 0003
TEMPPTR . . . . . . . . . . . . . I 0015
TEMPT2. . . . . . . . . . . . . . L 0CCA
TEMPTABLE . . . . . . . . . . . . L 11B4
TIMEMODE. . . . . . . . . . . . . L 1128
TIMER1FLAG. . . . . . . . . . . . B 000A
TIMRUN0 . . . . . . . . . . . . . L 0D16
TIMRUN1 . . . . . . . . . . . . . L 0D2B
TIMRUN2 . . . . . . . . . . . . . L 0D40
TRIGTEMP. . . . . . . . . . . . . I 0057
TWOHEATER . . . . . . . . . . . . L 10D0
UNKWN . . . . . . . . . . . . . . L 114B
UPDATE. . . . . . . . . . . . . . U 0000
UPDATECLOCK . . . . . . . . . . . L 065F
VLINE . . . . . . . . . . . . . . I 0004
VLINESTRHUNS. . . . . . . . . . . I 0040
VLINESTRONES. . . . . . . . . . . I 0042
VLINESTRTENS. . . . . . . . . . . I 0041
VOLTBIT . . . . . . . . . . . . . B 0059
VOLTOK. . . . . . . . . . . . . . B 0008
VOLTVAL . . . . . . . . . . . . . I 0099
WATCHDOG. . . . . . . . . . . . . L 0E1B
WATCHER . . . . . . . . . . . . . L 0DAE
WATCHIN . . . . . . . . . . . . . I 0036
WATCHOUT. . . . . . . . . . . . . I 0037
WBIT. . . . . . . . . . . . . . . B 005A
ZCOUNT1 . . . . . . . . . . . . . I 0051
ZCOUNT2 . . . . . . . . . . . . . I 0052
ZEROINT . . . . . . . . . . . . . L 09D7
ZPOSBIT . . . . . . . . . . . . . B 0009

;%Z

00 Errors  (0000)

;****************************************************************;
        ;        © COPYRIGHT  1992, 1993   LLR TECHNOLOGIES INC,
        ;        All Rights Reserved
        ;****************************************************************;
``` h:\llrt\001\pa\llrt-001.pat

What is claimed is:

1. A control system for heating or cooling an engine prior to start-up, comprising:

a temperature sensor to sense the temperature of an engine whose temperature is to be controlled;

an input device for receiving input data including an expected start time, the size of the engine, and a rating of a heating or cooling device; and a computer, operatively connected to the temperature sensor and the input device, programmed to utilize the input data and the temperature of the engine to calculate an activation time at which the heating or cooling device should initiate a change in the existing temperature of the engine to provide the engine with a predetermined temperature at the expected start time, and to provide an initiation signal at the activation time.

2. The system of claim 1, wherein the temperature sensor comprises a device for measuring ambient temperature, thereby approximating the temperature of the engine.

3. The system of claim 1, wherein the temperature sensor comprises a device, positioned proximate to the engine, for directly measuring the temperature of the engine.

4. The system of claim 3, further including an ambient temperature sensor for measuring ambient temperature.

5. The system of claim 4, wherein the computer is additionally programmed to utilize the measured ambient temperature in calculating the activation time.

6. The system of claim 1, wherein the engine further comprises one or more components of a motor vehicle.

7. The system of claim 1, wherein the input data further includes the maximum current capacity of a power supply.

8. The system of claim 1, further including one or more heating or cooling devices operatively connected to the system for receiving the initiation signal and commencing heating or cooling of the engine in response thereto.

9. The system of claim 8, additionally including at least one of the following components, responsive to the initiation signal: a battery heater, a transmission heater, a fuel warmer, and a vehicle interior heater.

10. The system of claim 1, wherein the system further includes a battery charger.

11. The system of claim 10, wherein the battery charger comprises a trickle charge unit that receives a.c. electrical power and provides a d.c. voltage for charging a battery, in response to commands issued by a computer.

12. The system of claim 3, wherein the computer is programmed to provide a maintenance signal when the temperature of the engine reaches a selected level.

13. The system of claim 12, further including one or more heating or cooling devices operatively connected to the system for commencing heating or cooling of the engine in response to the initiation signal, and for performing diminished heating or cooling of the engine in response to the maintenance signal.

14. The system of claim 1, further comprising a display for displaying messages generated by the computer.

15. The system of claim 1, wherein the computer is electrically connected to building wiring, and wherein the input device comprises a remote unit electrically connected to the building wiring for interactively exchanging data with the computer over the building wiring.

16. A heating system for preheating an engine under frigid conditions, comprising:
 a heater for selectively heating an engine in response to an initiation signal;
 a temperature sensor to sense the temperature of the engine;
 an input device for receiving input data including an expected start time, the size of the engine, and a rating of the heater; and
 a computer programmed to utilize the input data and the temperature of the engine to calculate an activation time at which the heater should initiate heating of the engine to provide the engine with a predetermined temperature at the expected start time, and to provide the initiation signal to the heater at the activation time.

17. The system of claim 16, wherein the computer is additionally programmed to provide a maintenance signal at the expected start time.

18. The system of claim 17, wherein the heater reduces the heat applied to the engine in response to the maintenance signal.

19. The system of claim 16, wherein the temperature sensor comprises a device for measuring ambient temperature, to approximate the temperature of the engine.

20. The system of claim 16, wherein the temperature sensor comprises a device, coupled to the engine, for measuring the temperature of the engine directly.

21. The system of claim 20, wherein the computer is additionally programmed to provide a maintenance signal when the temperature of the engine reaches the predetermined temperature.

22. The system of claim 21, wherein the heater reduces the heat applied to the engine in response to the maintenance signal.

23. A method of changing the temperature of an engine, comprising the steps of:
 (a) receiving data including a measured temperature of an engine whose temperature is to be changed, an expected start time, the size of the engine, and ratings of one or more heating or cooling devices to be used;
 (b) in response to the received data, determining an activation time at which the heating or cooling devices should initiate a change in the existing temperature of the engine to provide the engine with a predetermined temperature at the expected start time; and
 (c) selectively applying electrical power to the heating or cooling devices at the activation time.

24. The method of claim 23, wherein the received data further includes a maximum current capacity of a power supply to be used to provide the heating or cooling device with electrical power.

25. The method of claim 24, wherein step (c) comprises steps of:
 establishing a multiplexing schedule based upon the power supply's maximum current capacity and the ratings of the heating or cooling devices; and
 selectively applying electrical power to the heating or cooling devices at the activation time in accordance with the multiplexing schedule, to avoid exceeding the power supply's maximum current capacity.

26. The method of claim 23, wherein the activation time is selected so that the heating or cooling devices are operated for the minimum time needed to provide the engine with the predetermined temperature at the start time.

27. The method of claim 23, further including a step of selectively supplying electrical power to the heating or cooling devices after the expected start time to substantially maintain the engine at the predetermined temperature.

28. The method of claim 27, wherein maintenance of the temperature of the engine ceases upon a predetermined event.

29. The method of claim 28, wherein the predetermined event comprises expiration of a predetermined period of time.

30. The method of claim 23, wherein the step of selectively applying electrical power to the heating or cooling devices comprises the step of selectively connecting the heating or cooling devices to a power supply.

31. The method of claim 30, further comprising the step of monitoring the amplitude or phase of the power supply.

32. The method of claim 30, wherein the power supply comprises an alternating current power supply.

33. The method of claim 23, further comprising the steps of determining whether the temperature of the engine reaches the predetermined temperature prior to the expected start time, and, if so, reducing the application of power to the heating or cooling devices to substantially maintain the engine at the predetermined temperature.

34. A method of heating a vehicle engine, comprising the steps of:
 (a) receiving input data including engine temperature, an expected start time, ratings for one or more engine heaters, and engine size;
 (b) based upon the received input data, determining an activation time at which heating of the engine should be initiated to provide the engine with a desired temperature at the expected start time, and providing one or more representative output signals; and
 (c) selectively applying electrical power to the one or more engine heaters in response to the output signals.

35. The method of claim 34, wherein, if multiple engine heaters are used, the application of power in step (c) is selectively multiplexed among the heaters to avoid excessive power consumption.

36. The method of claim 34, further comprising a step of selectively supplying electrical power to the heaters after the expected start time to substantially maintain the engine at the desired temperature.

37. The system of claim 1, wherein the engine comprises a gasoline powered engine.

38. The system of claim 1, wherein the engine comprises an engine powered by diesel fuel.

39. The system of claim 1, wherein the temperature sensor includes a detachable connector to facilitate operation of the temperature sensor with different engines at different times.

40. The method of claim 23, wherein the engine comprises a gasoline powered engine.

41. The method of claim 23, wherein the engine comprises an engine powered by diesel fuel.

42. The method of claim 23, further comprising a step of selectively applying power at the activation time to at least one of the following components associated with the engine: a battery, a transmission, a fuel supply, and a vehicle interior.

* * * * *

UNITED STATES PATENT AND TRADEMARK OFFICE
CERTIFICATE OF CORRECTION

PATENT NO. : 5,285,963
DATED : FEBRUARY 15, 1994
INVENTOR(S) : THOMAS L. WAKEFIELD; GEORGE R. PLUNKETT

It is certified that error appears in the above-indentified patent and that said Letters Patent is hereby corrected as shown below:

Col. 10, line 30, "illuminate" should read --illuminated--;

Col. 14, line 37, "clockcalendar" should read --clock-calendar--;

Col. 15, line 16, "Whether" should read --whether--.

Signed and Sealed this

Twelfth Day of July, 1994

Attest:

BRUCE LEHMAN

*Attesting Officer*       *Commissioner of Patents and Trademarks*